United States Patent
Patel

(10) Patent No.: US 6,396,542 B1
(45) Date of Patent: May 28, 2002

(54) TV RECEIVER HAVING KINESCOPE WITH 16:9 ASPECT RATIO SCREEN AND DOT PITCH FOR 480 LINES PER FRAME RESOLUTION

(75) Inventor: Chandrakant B. Patel, Hopewell, NJ (US)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/691,664

(22) Filed: Aug. 2, 1996

Related U.S. Application Data
(60) Provisional application No. 60/003,101, filed on Sep. 1, 1995.

(51) Int. Cl.[7] ............................ H04N 11/00; H04N 5/46
(52) U.S. Cl. ...................... 348/445; 348/446; 348/556; 348/558
(58) Field of Search .................................. 348/556, 558, 348/445, 446, 21, 725, 704, 913, 604, 739, 805

(56) References Cited

U.S. PATENT DOCUMENTS

| | | | | |
|---|---|---|---|---|
| 5,006,926 A | * | 4/1991 | Jsinberg | 358/12 |
| 5,049,992 A | | 9/1991 | Citta et al. | 358/140 |
| 5,159,438 A | | 10/1992 | Rabii | 358/12 |
| 5,442,403 A | * | 8/1995 | Yasumato et al. | 348/458 |
| 5,485,217 A | | 1/1996 | Park | 348/445 |
| 5,497,198 A | * | 3/1996 | Kim | 348/445 |
| 5,519,446 A | | 5/1996 | Lee | 348/556 |
| 5,631,710 A | * | 5/1997 | Kamagawa et al. | 348/555 |
| 5,638,485 A | * | 6/1997 | Kobayashi | 386/123 |

* cited by examiner

Primary Examiner—Victor R. Kostak
(74) Attorney, Agent, or Firm—Sughrue Mion, PLLC

(57) ABSTRACT

A television receiver receives HDTV video signals and scan converts them to a lower line scanning rate with field-to-field interlace. This scan conversion is done to conserve the power consumption by the magnetic deflection system for the kinescope, which has a display screen with a 16:9 aspect ratio and a dot pitch for displaying a 480 scan line frame. The receiver receives scan converts NTSC video signals using time compression circuitry to present them in variants of letter-box form in which the images fill the full height of the display screen, but not its full width.

63 Claims, 13 Drawing Sheets

TV RECEIVER HAVING KINESCOPE WITH 16:9 ASPECT RATIO SCREEN AND DOT PITCH FOR 480 LINES PER FRAME RESOLUTION

This is a complete application filed under 35 U.S.C. 111(a) claiming, pursuant to 35 U.S.C. 119(e)(1), benefit of the filing date of provisional application Ser. No. 60/003,101 filed Sep. 1, 1995, pursuant to 35 U.S.C. 111(b).

RELATED APPLICATIONS

The inventor has also filed, with another, the U.S. patent applications listed below, incorporated by reference herein, which relate to television receivers for high-definition television (HDTV) signals.

Ser. No. 08/216,936 filed Mar. 24, 1994 and entitled RAPID-UPDATE ADAPTIVE CHANNEL-EQUALIZATION FILTERING FOR DIGITAL RADIO RECEIVERS, SUCH AS HDTV RECEIVERS Ser. No. 08/237,896 filed May 4, 1994 and entitled DIGITAL VSB DETECTOR WITH BANDPASS PHASE TRACKER, AS FOR INCLUSION IN AN HDTV RECEIVER Ser. No. 08/243,480 filed May 19, 1994 and entitled DIGITAL VSB DETECTOR WITH BANDPASS PHASE TRACKER USING RADER FILTERS, AS FOR USE IN AN HDTV RECEIVER Ser. No. 08/247,753 filed May 23, 1994 and entitled DIGITAL VSB DETECTOR WITH FINAL I-F CARRIER AT SUBMULTIPLE OF SYMBOL RATE, AS FOR HDTV RECEIVER Ser. No. 08/266,753 filed Jun. 28, 1994 and entitled RADIO RECEIVER FOR RECEIVING BOTH VSB AND QAM DIGITAL HDTV SIGNALS Ser. No. 08/266,751 filed Jun. 28, 1994 and entitled HDTV SIGNAL RECEIVER WITH IMAGINARY-SAMPLE-PRESENCE DETECTOR FOR QAM/VSB MODE SELECTION Ser. No. 08/573,454 filed Dec. 15, 1995 and entitled AUTOMATIC GAIN CONTROL OF RADIO RECEIVER FOR RECEIVING DIGITAL HIGH-DEFINITION TELEVISION SIGNALS Ser. No. 08/577,489 filed Dec. 22, 1995 and entitled DIGITAL VSB DETECTOR WITH BANDPASS PHASE TRACKER USING NG FILTERS, AS FOR USE IN AN HDTV RECEIVER Ser. No. 08/614,471 filed Mar. 12, 1996 and entitled RADIO RECEIVERS FOR RECEIVING BOTH VSB AND QAM DIGITAL HDTV SIGNALS These applications are commonly assigned to Samsung Electronics Company, Limited, pursuant to employee invention agreements entered into prior to the making of the inventions disclosed herein and in those applications.

BACKGROUND OF THE INVENTION

This invention relates to television receivers for high-definition television HDTV) signals.

In a television receiver the greater the number of scan lines in a given frame time (33.3 mS in the U.S. and 40 mS in Europe), the greater the power consumption involved in the magnetic deflection system for the kinescope. In large-screen television receivers for receiving television signals broadcast in accordance with current standards (such as the NTSC standard), so as to use field-to-field line-interlace, an approximation to progressive scan is made by time-compressing the scan lines to half duration and inserting intermediate scan lines generated by interpolation. This procedure doubles the number of scan lines per frame, thereby doubling horizontal and vertical sweep rates and increasing the power consumption of the magnetic deflection system for the kinescope by a factor of four.

High-definition television radio-frequency (RF) signals currently proposed for adoption as a future standard for broadcasting television in the United States are descriptive of digital data. The digital data detected from the HDTV RF signals are descriptions of successive image fields coded essentially in accordance with the MPEG-2 Standard, which descriptions are decoded to recover the raster-scanned video signals. The raster scanning will include a larger number of scan lines than the current NTSC television broadcast standard and may be progressive in nature, rather than line-interlaced as in the current NTSC television broadcast standard. Currently, proposals for 720 progressively scanned scan lines of television image per 60 Hz frame and for 1080 line-interlaced scan lines of television image per 30 Hz frame are being considered. A number of inactive lines must be included in each frame to allow for vertical retrace, so there are totals of about 787.5 lines in the progressively scanned HDTV signal and of about 1125 lines in the line-interlaced HDTV signal. The concerns of the systems designers have been primarily directed to the problems of keeping transmission bandwidth requirements within prescribed limits.

The current standard for HDTV television broadcasting in the UHF television band uses 8-level vestigial sideband (VSB) amplitude modulation of a suppressed-carrier located 310 kHz from the edge of the 6 MHz-wide television channel, and a pilot carrier accompanies the vestigial sideband. Cablecast practice for HDTV television broadcasting is expected to use 16- or 32-state QAM of a mid-channel suppressed carrier, however, with no accompanying pilot carrier. The format for the digital data descriptive of the HDTV display is expected to be the same in cablecast practice as in HDTV broadcasting, or substantially so. The digital data are transmitted in packets, header information in certain of the packets identifying those packets of data that are descriptive of the video portions of a received HDTV program. The digital data are not directly descriptive of the raster scanning of image frames and a digital HDTV receiver generally includes a plurality of dual-ported frame-store display buffer memories, each with a random-access port used for updating the stored image therein and each with a serial output port from which selected lines of data can be read in a shift register operation. Since the luminance signal has more lines per field and has more pixels per scan line than the color-difference signals, the descriptions of the color-difference signals are advantageously stored in dual-ported frame-store buffer memories which are separate from those that store the descriptions of the luminance signals and which are addressed less frequently. During each display field, the ones of these frame-store display buffer memories used for storing descriptions of the current display field in terms of luminance and color-difference video signals supply these descriptions in raster-scan order from their serial output ports.

With the digital standard for broadcasting television in the United States being largely worked out, the time is at hand for considering the problems associated with the commercial production of receivers. Receivers that are capable of receiving transmissions whether in accordance with the former NTSC standard, in accordance with the new digital HDTV broadcast standard, or in accordance with the digital HDTV cablecast practice are desirable. For each individual manufacturer, there are substantial economies associated with the use of similar components across its entire television receiver line. Preferably, a small-screen bottom-of-the-line television receiver with detachable side speakers will use the same digital processing circuitry and buffer memory to generate high-definition luminance and chrominance signals that are used by a top-of-the-line television receiver using a full-wall display unit and a surround-sound speaker system.

When HDTV broadcasts are made, it is likely that some people will desire to receive these broadcasts on small-screen television receivers, some of which will be of portable battery-powered type. The primary interest will be to be able to view video programs transmitted in 16:9 width-to-height ratio. In these small-screen television receivers, the improved spatial and temporal resolution afforded by HDTV transmission will be of no importance at normal viewing distances. Indeed, in kinescopes that use color mask apertures screens, the limitations on smallness of apertures may limit available spatial resolution to less than that broadcast. On the other hand, there is a significant increase in the power consumption in the magnetic deflection system for the kinescope responsive to the faster sweep rates. Since the major portion of the TV receiver power consumption is consumed by the kinescope deflection system, high sweep rates are very disadvantageous in a small-screen TV receiver that is battery-powered. A heavy battery is required if more than a few minutes of viewing time are to be provided before the battery needs to be recharged.

A kinescope which displays a 480-active-scan-line frame with field interlace and with a 16:9 aspect ratio will require nearly twice the deflection power of a kinescope of the same screen height which displays a 480-active-scan-line frame with field interlace and with a 4:3 aspect ratio. The additional power is required for sweeping through the one-third longer scan line in the same scan line period. The deflection angle is related to magnetic field strength and thus to the current in the deflection coils; and the rate of change in the current through the deflection coils depends on the voltage applied thereto. While the horizontal deflection coils are normally resonated to recover energy stored therein, there are $I^2R$ losses in the resistance of the deflection coil windings and more significantly there are losses in the deflection amplifiers used to drive the deflection coils which latter losses are related to the square of the driving voltages.

A kinescope which displays a 480-active-scan-line frame scanned in one-thirtieth second with field interlace and with a 16:9 aspect ratio will consume about one-fifth the power of a kinescope of the same screen height which displays a 1080-active-scan-line frame scanned in one-thirtieth second with field interlace and with a 9:16 aspect ratio, however. Not only are horizontal deflection power requirements about one-fifth; so are vertical deflection power requirements. A kinescope which displays a 480-active-scan-line frame scanned in one-thirtieth second with field interlace and with a 16:9 aspect ratio will consume about one-36th the power of a kinescope of the same screen size which displays a 720-active-scan-line progressively scanned (i.e. without field interlace) frame in one-sixtieth second with a 16:9 aspect ratio. Not only are horizontal deflection power requirements about one-36th; so are vertical deflection power requirements. The energy stored in the vertical deflection coils customarily is not recovered by resonating them, owing to the low resonant frequency, so the decrease in vertical deflection power requirement with fewer scan lines is substantial.

A kinescope which displays a 480-active-scan-line frame with a 16:9 aspect ratio and with field interlace in one-thirtieth second will consume a quarter of the deflection power of a kinescope which displays a 480-active-scan-line frame with a 16:9 aspect ratio progressively scanned (i.e. without field interlace) in one-sixtieth second, so the use of field interlace is very desirable in a portable HDTV receiver. In U.S. Pat. No. 5,049,992 issued Sep. 17, 1991 and entitled HDTV SYSTEM WITH RECEIVERS OPERABLE AT DIFFERENT LEVELS OF RESOLUTION Citta et alii describe scan conversion of a 720-active-scan-line frame with a 16:9 aspect ratio progressively scanned in one-sixtieth second to a 480-active-scan-line frame with a 16:9 aspect ratio progressively scanned in one-sixtieth second. Additional measures have to be taken during scan conversion to provide for field interlace, in order to display a 480-active-scan-line frame in one-thirtieth second without excessive flicker owing to motion in the television images.

Conversion of progressive scan video signals of a given frame rate to line-interlaced video signals of a field rate equal to that given frame rate is known per se in the television art. In some television cameras using charge-coupled-device (CCD) images of the field transfer type, the video signals from the cameras are progressive-scan in nature, with 60 (or 50) Hz frame rates, and are converted to line-interlaced video signals by lowpass line-comb filtering with staggered spatial phasing on successive 60 (or 50) Hz frames to generate 60 (or 50) Hz fields of scan lines at halved sweep rates. The lowpass line-comb filtering provides vertical aperture correction that reduces scanning artifacts. In all embodiments of the invention herein described scan conversion is done, not at the television transmitter, but rather at the television receiver.

In certain embodiments of the invention scan conversion to reduce the number of horizontal scan lines per frame and to provide field interlace is done within a television receiver with smaller-size screen, but with the same aspect ratio as the large-size screen of an ordinary HDTV receiver. This scan conversion enables the portable HDTV receiver to use digital processing circuitry similar to that in an ordinary HDTV receiver, while at the same time reducing the sweep rates required in the electromagnetic deflection of the kinescope, thus to conserve power. Display buffer memory similar to that in an ordinary HDTV receiver can be used, with the scan converter including additional buffer memory after the ordinary HDTV receiver display memory. In certain embodiments of the invention this additional buffer memory is reduced to as little as four scan lines of samples for each of the three video signals required to provide a basis for generating a color display. In other embodiments of the invention the need for additional buffer memory is avoided by modifying the display buffer memory from that in an ordinary HDTV receiver, the modification being a banked structuring of the display memory that permits concurrently reading a plurality of scan lines of samples of each video signal to the weighted summation circuitry used for scan conversion.

Even in TV receivers that are powered from the electric mains, there is a desire to keep power consumption low; and, indeed, there is a possibility of limits being placed on the power consumed by home appliances at some future time, in order to contain the costs of power plant construction and maintenance. The use of more than 480 active lines in a kinescope display has other problems besides the increase in power required for deflection. As the number of active lines goes up, the size of the scanning dot must go down in order to utilize the increased display resolution made available.

Accordingly, color mask costs go up; and display brightness tends to be reduced, particularly in corners of the screen.

In certain embodiments of the invention scan conversion to reduce the number of horizontal scan lines per frame and to provide field interlace is done within a television receiver having a large-size screen or having a medium-size screen with the same aspect ratio as the large-size screen of an ordinary HDTV receiver. The power consumption associated with deflection is advantageously reduced, but the principal commercial advantage is that dot size can be larger so the display can be made brighter. The brighter display can be better viewed in high ambient light conditions, such as on a porch or in a sun room, for example.

A further aspect of the invention is the scan conversion of NTSC video signals using time compression circuitry to present them in variants of letter-box form in which the images fill the full height of the display screen, but not its full width. It has been proposed to use kinescopes with a compromise aspect ratio between 4:3 and 16:9 width-to-height ratio with NTSC and HDTV signals substantially overscanning the display screen. The inventor believes the commercially correct way to display television images is on a display screen with 16:9 aspect ratio, designed for the new medium that is to supplant the old. The missing "sides" of the NTSC display on the display screen with 16:9 aspect ratio makes clear the deficiencies of the old television transmission medium and provides better incentive for transmitter and receiver owners to invest in new equipment. Pix-in-pix displays can be at the side of the NTSC display, and the time compression of each line of NTSC signal can be reduced during the NTSC transmission of widescreen movies.

SUMMARY OF THE INVENTION

The various aspects of the invention relate to a television receiver including a kinescope having a display screen with a 9:16 aspect ratio, having phosphors arranged on the back of said display screen with a dot pitch for displaying a 480 scan line frame, and having at least one electron gun for projecting a respective electron beam on the back of said display screen. The kinescope can be of the type having respective electron guns for launching respective electron beams to respectively excite red phosphors, blue phosphors and green phosphors to luminescence. But certain kinescopes for small receivers have only a single electron gun. There is a respective kinescope drive amplifier for each electron gun and deflection circuitry for scanning each electron beam across the back of the display screen of each kinescope used. The scanning is done in a raster scanning pattern with a 9:16 aspect ratio having substantially 240 active lines per field of a two-field frame with the scan lines of the two fields being interlaced with each other.

In one aspect of the invention there is a tuner capable of receiving normal-definition television signals; normal-definition television signal detection circuitry for detecting the raster-scanned video signals contained in the modulation of the normal-definition television signals received by said tuner; horizontal and vertical sync separators for separating normal-definition horizontal and vertical synchronizing pulses from video signals detected by the normal-definition television signal detector; and time compression circuitry for time compressing the normal-definition video signals detected by the normal-definition television signal detection circuitry to generate a respective time-compressed normal-definition video signal for application to each kinescope drive amplifier. The normal-definition horizontal synchronizing pulses are applied to the deflection circuitry to control the beginning of horizontal scanning of the display screen in accordance with the raster scanning pattern; and the normal-definition vertical synchronizing pulses are applied to the deflection circuitry to control the beginning of vertical scanning of the display screen in accordance with the raster scanning pattern.

In another aspect of the invention there is a tuner for receiving high-definition television signals; high-definition television signal decoder circuitry for decoding the raster-scanned video signals digitally encoded in the modulation of the digital high-definition television signals, for providing high-definition-television horizontal synchronizing pulses, and for providing high-definition-television vertical synchronizing pulses for application to said deflection circuitry to control the beginning of vertical scanning in said raster scanning pattern; pulse rate divider circuitry for dividing the rate of said high-definition-television horizontal synchronizing pulses to generate rate-divided high-definition-television horizontal synchronizing pulses occurring at substantially the same rate as normal-definition horizontal synchronizing pulses; and scan converter circuitry responsive to the video signals decoded by the high-definition television signal decoder circuitry to generate a respective scan-converted video signal for application to each kinescope drive amplifier. The rate-divided high-definition horizontal synchronizing pulses are applied to the deflection circuitry to control the beginning of horizontal scanning of the display screen in accordance with the raster scanning pattern; and the high-definition vertical synchronizing pulses are applied to the deflection circuitry to control the beginning of vertical scanning of the display screen in accordance with the raster scanning pattern. Preferably, the high-definition television signal decoder circuitry is of a type that provides indications as to which of a plurality of digital television standards a received high-definition television signal was transmitted in accordance with; and a respective set of vertical scan conversion filters for each of the plurality of digital television standards is included in the high-definition-television scan converter circuitry. A respective set of horizontal decimation filters for each of the plurality of digital television standards can be cascaded before each set of vertical scan conversion filters to reduce the number of samples that need be stored in memory associated with the vertical scan conversion filters.

Figure 1:
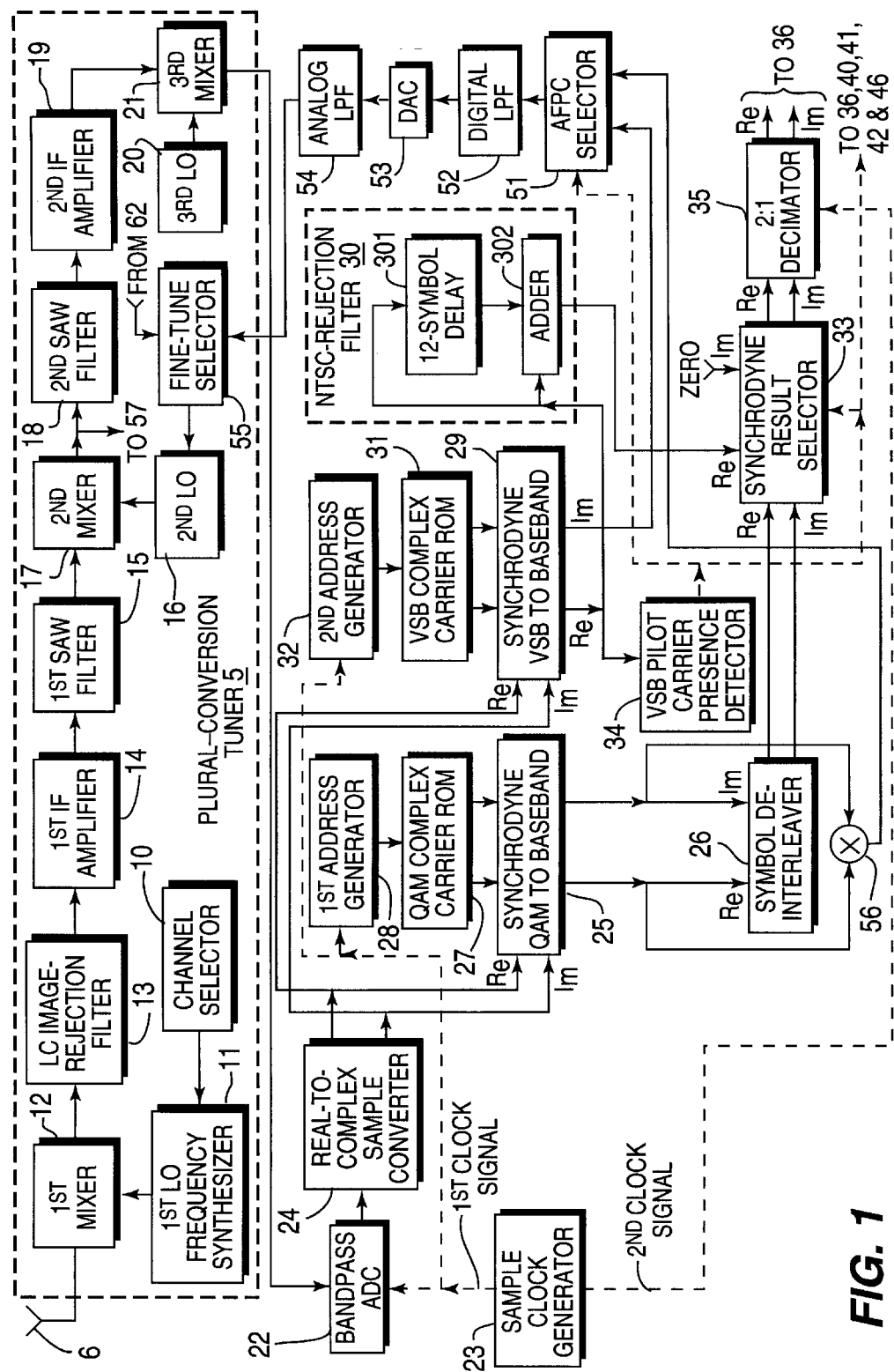
FIG. 1 is a block schematic diagram of initial portions of a digital HDTV signal radio receiver disclosed in U.S. patent application Ser. No. 08/266,753, which initial portions include circuitry for detecting symbols in an HDTV signal of QAM type, circuitry for detecting symbols in an HDTV signal of VSB type, and an amplitude equalizer for symbols selected from the circuitry for detecting symbols in an HDTV signal of QAM type and the circuitry for detecting symbols in an HDTV signal of VSB type.

As one skilled in the art of digital circuit design will appreciate, shimming delays will have to be provided at various points in the connections of the circuitry shown in the drawing, in order that proper timing of the operations of the circuitry will be assured. Connections that carry only clocking or control signals are dashed in certain of the figures, better to distinguish these connections from those connections carrying information-bearing signals.

DETAILED DESCRIPTION

FIG. 1 shows a tuner 5 comprising elements 11–21 that selects one of a plurality of channels at different locations in the frequency band in which analog NTSC television signals or digital HDTV signals are transmitted and that performs plural frequency conversion of the selected channel to a final intermediate-frequency signal in a final intermediate-frequency band. FIG. 1 shows a broadcast receiving antenna 6 arranged to capture the digital HDTV signals for the tuner 5. Alternatively, the tuner 5 can be connected for receiving digital HDTV signals from a narrowcast receiving antenna or from a cablecast transmission system.

More particularly, in the tuner 5 shown in FIG. 1, a channel selector 10 designed for operation by a human being determines the frequency of first local oscillations that a frequency synthesizer 11, which functions as a first local oscillator, furnishes to a first mixer 12 for heterodyning with digital HDTV signals received from the antenna 6 or from an alternative source of such signals. The first mixer 12 upconverts the received signals in the selected channel to prescribed first intermediate frequencies (e. g., with 920 MHz carrier), and an LC filter 13 is used to reject the unwanted image frequencies that accompany the upconversion result supplied from the first mixer 12. The first intermediate-frequency signal resulting from the upconversion, supplied as the filter 13 response, is applied as the input signal to a first intermediate-frequency amplifier 14, which supplies amplified first IF signal for driving a first surface-acoustic-wave (SAW) filter 15. The upconversion to the rather high-frequency first intermediate frequencies facilitates the SAW filter 15 having a large number of poles and zeroes. Second local oscillations from a second local oscillator 16 are supplied to a second mixer 17 for heterodyning with the response of the first SAW filter 15, to generate a second intermediate frequency signal (e. g., with 46.69 MHz carrier for an HDTV signal or a 45.75 MHz carrier for an NTSC signal). The output signal from the second mixer 17 is supplied to the portions of the radio receiver used for detecting NTSC video and audio signals as will be described further on in this specification with reference to FIGS. 3 and 4 of the drawing.

The remainder of FIG. 1 shows portions of the radio receiver used for detecting HDTV signals. The output signal from the second mixer 17 is supplied in FIG. 1 to a second SAW filter 18, which is used for rejecting the unwanted image frequencies that accompany the second intermediate frequencies in the downconversion result supplied from the second mixer 17 during HDTV reception. During the period of transition from NTSC television transmissions to digital television transmissions, the second SAW filter 18 will usually include traps for sound and video carriers of adjacent-channel NTSC television transmissions. The second IF signal supplied as the response of the second SAW filter 18 is applied as input signal to a second intermediate-frequency amplifier 19, which generates an amplified second IF signal response to its input signal. Oscillations from a third local oscillator 20 are heterodyned with the amplified second IF signal response in a third mixer 21 to generate a third intermediate-frequency signal response.

This third IF signal response is the final intermediate-frequency output signal of the tuner 5, which is supplied to a subsequent analog-to-digital converter (ADC) 22 for digitization. This final IF signal occupies a frequency band 6 MHz wide, the lowest frequency of which is above zero frequency. The lowpass analog filtering of the third mixer 21 response done in the ADC 22, as a preliminary step in analog-to-digital conversion, suppresses the image frequencies of the third intermediate frequencies; and the second SAW filter 18 has already restricted the bandwidth of the third intermediate-frequency signals presented to the ADC 22 to be digitized. So, the ADC 22 functions as a bandpass analog-to-digital converter. Sampling of the lowpass analog filter response in the ADC 22 is done responsive to pulses in a first clock signal supplied from a sample clock generator 23, as the next step in analog-to-digital conversion.

The sample clock generator 23 preferably includes a crystal oscillator capable of frequency control over a relatively narrow range for generating cissoidal oscillations at a multiple of symbol rate. A symmetrical clipper or limiter generates a square-wave response to these cissoidal oscillations to generate the first clock signal, which the ADC 22 uses to time the sampling of the final IF signal after filtering to limit bandwidth. The frequency of the cissoidal generated by the crystal oscillator in the sample, clock generator 23 can be determined by an automatic frequency and phase control (AFPC) signal developed in response to symbol frequency components of the received HDTV signal, for example, as will be described in detail further on in this specification. The pulses in the first clock signal recur at a 21.08 megasamples-per-second rate, twice the 10.54 megasymbols-per-second symbol rate for VSB signals and four times the 5.27 megasymbols-per-second symbol rate for QAM signals. The ADC 22 supplies real digital responses of 10-bit or so resolution to the samples of the band-limited final IF signal, which digital responses are converted to complex digital samples by the circuitry 24. Various ways to construct the circuitry 24 are specifically described in the above-referenced U.S. patent application Ser. No. 08/266,753. If the frequency band 6 MHz wide occupied by the final IF signal has a lowest frequency of at least a megaHertz or so, it is possible to keep the number of taps in a Hilbert transformation filter within the circuitry 24 reasonably small and thus keep the latency time of the filter reasonably short. Placing the final IF signal so its mid-frequency is above 5.27 MHz reduces the number of 21.08 megasamples-per-second rate samples in the QAM carrier to less than four, which undesirably reduces the uniformity of synchrodyne response supplied for symbol decoding.

In the FIG. 1 receiver circuitry the complex digital samples of final IF signal supplied from the circuitry 24 are applied to circuitry 25 for synchrodyning the QAM signal to baseband to supply to a symbol de-interleaver 26, in parallel, a stream of real samples and a stream of imaginary samples descriptive of the complex-amplitude-modulation modulating signal. The QAM synchrodyning circuitry 25 receives complex-number digital descriptions of two phasings of the QAM carrier, as translated to final intermediate frequency and in quadrature relationship with each other, from read-only memory 27. The ROM 27, which comprises sine and cosine look-up tables for QAM carrier frequency, is addressed by a first address generator 28. The first address generator 28 includes an address counter (not explicitly shown in FIG. 1) for counting the recurrent clock pulses in the first clock signal generated by the sample clock generator 23. The resulting address count is augmented by a symbol phase correction term generated by QAM de-rotator circuitry, thereby to generate the addressing for the ROM 27. The QAM synchrodyne circuitry 25, the first address generator 28, and the operation of each are explained in greater detail in the above-referenced U.S. patent application Ser. No. 08/266,753.

In the FIG. 1 receiver circuitry the complex digital samples of final IF signal supplied from the circuitry 24 are also applied to circuitry 29 for synchrodyning the VSB signal to baseband to supply a stream of real samples descriptive of the vestigial-sideband modulating signal to an NTSC-rejection filter 30, which functions as a symbol de-interleaver for the VSB signal. The VSB synchrodyning circuitry 29 receives complex-number digital descriptions of two phasings of the VSB carrier, as translated to final intermediate frequency and in quadrature relationship with each other, from read-only memory 31. The ROM 31, which comprises sine and cosine look-up tables for VSB carrier frequency, is addressed by a second address generator 32. The second address generator 32 includes an address counter (not explicitly shown in FIG. 1) for counting the recurrent clock pulses in the first clock signal generated by the sample clock generator 23, which address counter in preferred embodiments of the invention is the same address counter used in the first address generator 28. The resulting address count is augmented by a symbol phase correction term generated by symbol phase correction circuitry, thereby to generate the addressing for the ROM 31. The VSB synchrodyne circuitry 29, the second address generator 32, and the operation of each are explained in greater detail in the above-referenced U.S. patent application Ser. No. 08/266,753.

The baseband response of the VSB synchrodyne circuitry 29 is supplied to an NTSC-rejection filter 30 for suppressing co-channel interference from NTSC signals, in which filter 30 the response is applied as input signal to a clocked delay line 301 and as a first summand input signal to a two-input digital adder 302. The clocked delay line 301 supplies a response to its input signal after a delay equal to twelve symbol epochs, which delayed response is applied to the digital adder 302 as its second summand input signal. The clocked delay line 301 and the digital adder 302 in the NTSC-rejection filter 30 cooperate so as to suppress co-channel interference from NTSC signals. The NTSC-rejection filter 30, which is a comb filter, is required as long as NTSC signals are being transmitted over the same channel allocations as digital HDTV signals. The filter 30 suppresses the NTSC luminance carrier and its lower-frequency sidebands containing synchronizing information, very strongly rejects the color subcarrier, suppresses the chrominance sidebands, and suppresses the FM audio carrier. The filter 30 supplies a fifteen-coding-level signal in response to the eight-coding-level signal it receives from the VSB synchrodyne circuitry 29.

A digital-signal multiplexer 33 functions as a synchrodyne result selector that selects as its response either a first or a second one of two complex digital input signals thereto, the selection being controlled by a detector 34 for detecting the zero-frequency term of the real samples from the VSB synchrodyne circuitry 29. When the zero-frequency term has essentially zero energy, indicating the absence of pilot carrier signal that accompanies a VSB signal, the multiplexer 33 selectively responds to its first complex digital input signal, which is the de-interleaved QAM synchrodyne-to-baseband result supplied from the de-interleaver 26. When the zero-frequency term has substantial energy, indicating the presence of pilot carrier signal that accompanies a VSB signal, the multiplexer 33 selectively responds to its second complex digital input signal, the real terms of which are supplied from the NTSC-rejection filter 30 and the imaginary terms of which are all wired arithmetic zero.

The response of the synchrodyne result selection multiplexer 33 is resampled in response to a second clock signal from the sample clock generator 23 in 2:1 decimation circuitry 35, to reduce the sample rate of complex baseband response down to the 10:76 MHz VSB symbol rate, which is twice the 5.38 MHz QAM symbol rate. The 2:1 decimation of the multiplexer 33 response prior to its application as input signal to an amplitude equalizer 36 reduces the hardware requirements on the equalizer. Alternatively, rather than 2:1 decimation circuitry 35 being used after the synchrodyne result selection multiplexer 33, the baseband responses of the QAM synchrodyne circuitry 25 and of the VSB synchrodyne circuitry 29 can each be resampled in response to a second clock signal from the sample clock generator 23 to carry out 2:1 decimation before the synchrodyne result selection multiplexer 33.

Figure 2:
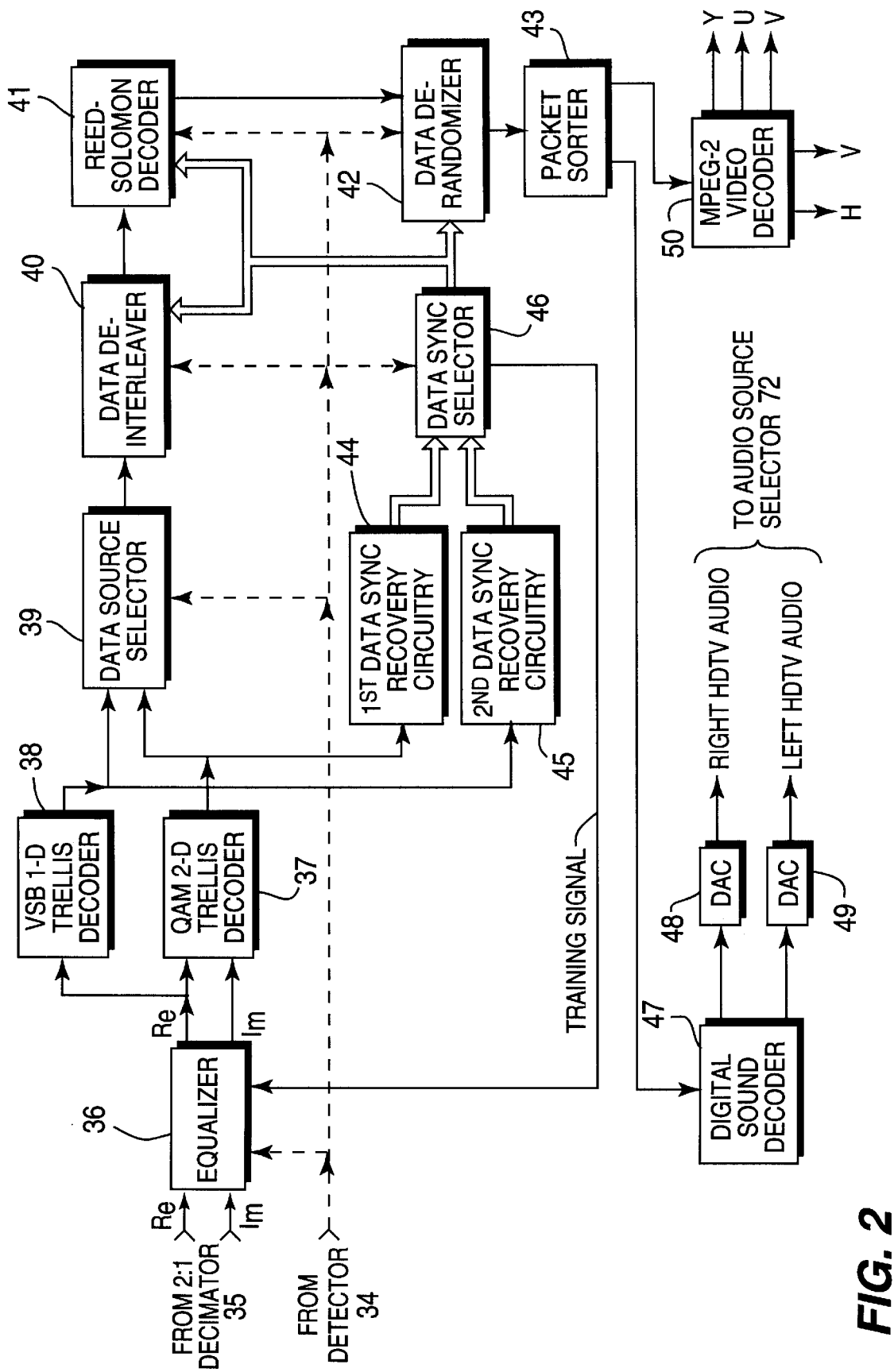
FIG. 2 is a block schematic diagram of the remaining portions not shown in FIG. 1 of the digital HDTV signal radio receiver disclosed in U.S. patent application Ser. No. 08/266,753, which digital HDTV signal radio receiver is included in a television receiver embodying the invention.

FIG. 2 shows the amplitude equalizer 36, which converts a baseband response with an amplitude-versus-frequency characteristic that tends to cause inter-symbol error to a more optimum amplitude-versus-frequency characteristic that minimizes the likelihood of inter-symbol error. The amplitude equalizer 36 can be a suitable one of the monolithic ICs available off-the-shelf for use in equalizers. Such an IC includes a multiple-tap digital filter used for amplitude equalization, the tap weights of which filter are programmable; circuitry for selectively accumulating training signal and temporarily storing the accumulation results; and a microcomputer for comparing the temporarily stored accumulation results with an ideal training signal as known a priori and for calculating updated tap weights of the multiple-tap digital filter used for amplitude equalization. A preferred equalizer design is that described in the above-referenced U.S. patent application Ser. No. 08/216,936.

The response of the amplitude equalizer 36 is applied as input signal to a two-dimensional trellis decoder 37, which performs the symbol decoding that recovers a digital data stream from a QAM-origin signal. The response of the amplitude equalizer 36 is also applied as input signal to a one-dimensional trellis decoder 38, which performs the symbol decoding that recovers a digital data stream from a VSB-origin signal. A digital-signal multiplexer 39 functions as a data source selector that selects as its response either a first or a second one of two digital input signals thereto, the selection being controlled by the detector 34 for detecting the zero-frequency term of the real samples from the VSB synchrodyne circuitry 29. When the zero-frequency term has essentially zero energy, indicating the absence of pilot carrier signal that accompanies a VSB signal, the multiplexer 39 selectively responds to its first digital input signal, selecting as the source of its digital data output the two-dimensional trellis decoder 37 that decodes the symbols received in the QAM signal. When the zero-frequency term has substantial energy, indicating the presence of pilot carrier signal that accompanies a VSB signal, the multiplexer 39 selectively responds to its second digital input signal, selecting as the source of its digital data output the one-dimensional trellis decoder 38 that decodes the symbols received in the VSB signal.

The data selected by the data source selection multiplexer 39 are applied to a data de-interleaver 40 as its input signal, and the de-interleaved data supplied from the data de-interleaver 40 are applied to a Reed-Solomon decoder 41. The data de-interleaver 40 is often constructed within its own monolithic IC and is made so as to respond to the output indications from the pilot carrier presence detector 34 to select the de-interleaving algorithm suitable to the HDTV signal currently being received, whether it be of QAM or VSB type; this is a mere matter of design. The Reed-Solomon decoder 41 is often constructed within its own monolithic IC and is made so as to respond to the output indications from the pilot carrier presence detector 34 to select the appropriate Reed-Solomon decoding algorithm for the HDTV signal currently being received, whether it be of QAM or VSB type; this also is a mere matter of design. Error-corrected data are supplied from the Reed-Solomon decoder 41 to a data de-randomizer 42, which regenerates packets of data for a packet sorter 43. The data de-randomizer 42 is made so as to respond to the output indications from the pilot carrier presence detector 34 to select the appropriate data de-randomizing algorithm for the HDTV signal currently being received, whether it be of QAM or VSB type; this is a mere matter of design, too.

First data synchronization recovery circuitry 44 recovers the data synchronizing information included in the data output of the two-dimensional trellis decoder 37, and second data synchronization recovery circuitry 45 recovers the data synchronizing information included in the data output of the one-dimensional trellis decoder 38. A data sync selector 46 selects between the data synchronizing information as provided by the data sync recovery circuitry 44 and as provided by the data sync recovery circuitry 45, the selection being controlled by the detector 34 for detecting the zero-frequency term of the real samples from the VSB synchrodyne circuitry 29. When the zero-frequency term has essentially zero energy, indicating the absence of pilot carrier signal that accompanies a VSB signal, the data sync selector 46 selects for its output signals the data synchronizing information provided by the data sync recovery circuitry 44. When the zero-frequency term has substantial energy, indicating the presence of pilot carrier signal that accompanies a VSB signal, the data sync selector 46 selects for its output signals the data synchronizing information provided by the data sync recovery circuitry 45.

A VSB HDTV signal comprises a succession of consecutive-in-time data fields each containing 313 consecutive-in-time data lines. Each line of data starts with a line synchronization code group of four symbols having successive values of +S, −S, −S and +S. The value +S is one level below the maximum positive data excursion, and the value −S is one level above the maximum negative data excursion. The lines of data are each of 77.7 microsecond duration, and there are 832 symbols per data line for a symbol rate of about 10 megabits/second. The initial line of each data field is a field synchronization code group that codes a training signal for channel-equalization and multipath suppression procedures. The training signal is a 511-sample pseudo-random sequence (or "PR-sequence") followed by three 63-sample PR sequences. This training signal is transmitted in accordance with a first logic convention in the first line of each odd-numbered data field and in accordance with a second logic convention in the first line of each even-numbered data field, the first and second logic conventions being one's complementary respective to each other. When the data sync selector 46 selects for its output signals the data synchronizing information provided by the data sync recovery circuitry 45, the initial data lines of each data field are selected for application to the amplitude equalizer 36 as training signal. The occurrences of two consecutive 63-sample PR sequences are detected within the data sync recovery circuitry 45 to provide data-field indexing information to the data sync selector 46.

The standards for a QAM HDTV signal are not as well defined at this time as the standards for a VSB HDTV signal. A 32-state QAM signal provides sufficient capacity for a single HDTV signal, without having to resort to compression techniques outside MPEG-2 standards, but commonly some compression techniques outside MPEG-2 standards are employed to encode the single HDTV signal as a 16-state QAM signal. The occurrence of a prescribed 24-bit word is detected by the data sync recovery circuitry 44 to generate data-field indexing information for application to the data sync selector 46. A multiplexer within the data sync selector 46 selects between the data-field indexing information respectively supplied by the data sync recovery circuitry 44 and by the data sync recovery circuitry 45; the data-field indexing information thus selected is supplied to the data de-interleaver 40, the Reed-Solomon decoder 41, and the data de-randomizer 42. At the time this specification is written there is no training signal included in the QAM HDTV signal. Accordingly, the amplitude equalizer 36 is arranged to provide a flat amplitude-versus-frequency characteristic in response to the VSB pilot carrier presence detector 34 indicating the absence of pilot carrier, and the VSB training signal selected by the data sync recovery circuitry 45 is wired through the data sync selector 46 without need for a multiplexer. Also, there is no data line synchronization signal for QAM HDTV transmission, at least not one selected as a standard. The data sync recovery circuitry 44 includes counting circuitry for counting the samples in each data field to generate intra-data-field synchronizing information. This intra-data-field synchronizing information and the intra-data-field synchronizing information (such as data line count) generated by the data sync recovery circuitry 45 are selected between by appropriate multiplexers in the data sync selector 46, for application to the data de-interleaver 40, the Reed-Solomon decoder 41, and the data de-randomizer 42, as required.

The packet sorter 43 sorts packets of data for different applications, responsive to header codes in the successive packets of data. Packets of data descriptive of the audio portions of the HDTV program are applied by the packet sorter 43 to a digital sound decoder 47. The digital sound decoder 47 supplies stereophonic digital sound signals during HDTV reception, which are converted to analog stereophonic sound signals by analog-to-digital converters (DACs) 48 and 49 to provide an HDTV left-channel audio signal and an HDTV right-channel audio signal. Packets of data descriptive of the video portions of the HDTV program are applied by the packet sorter 43 to an MPEG-2 video decoder 50. During HDTV reception the video decoder 50 supplies the horizontal (H) and vertical (V) synchronizing signals for the raster scanning of the display screen of the television receiver. The video decoder 50 also supplies a digital luminance signal (Y) and two digital color difference signals (U, V).

These color difference signals U and V can be I and Q color difference signals, for example, or can be B-Y and RY color difference signals, by way of further example. It will be presumed that the same set color-difference signals are recovered during HDTV and NTSC reception, although this is a matter of convenience rather than necessity. Recovering the same color-difference signals during HDTV and NTSC reception allows the same color matrixing circuitry to be used during HDTV and NTSC reception. If different sets of color-difference signals are recovered during HDTV and NTSC reception, the color matrixing circuitry used during HDTV reception will have to be separate from the color matrixing circuitry used during NTSC reception.

The general nature of the MPEG-2 video decoder 50 is known to one of ordinary skill in the art of digital video compression. The data supplied to the video decoder 50 comprise scalar- and vector-quantized codes of the discrete cosine transforms of selected image frames used for predicting the content of intervening image frames The data supplied to the video decoder 50 comprise scalar- and vector-quantized codes of the discrete cosine transforms of frames of information describing the errors in such predictions. The video decoder 50 accordingly includes a plurality of dual-ported frame-store display buffer memories, each with a random-access port used for updating the stored image therein and each with a serial output port from which selected lines of data can be read in a shift register operation. Since the luminance signal has more lines per field and has more pixels per scan line than the color-difference signals, the descriptions of the color-difference signals are advantageously stored in dual-ported frame-store display buffer memories which are separate from those that store the descriptions of the luminance signals and which are addressed less frequently. During each display field, ones of these frame-store display buffer memories used for storing descriptions of the current display field in terms of luminance and color-difference video signals supply these descriptions in raster-scan order from their serial output ports.

Figure 6:
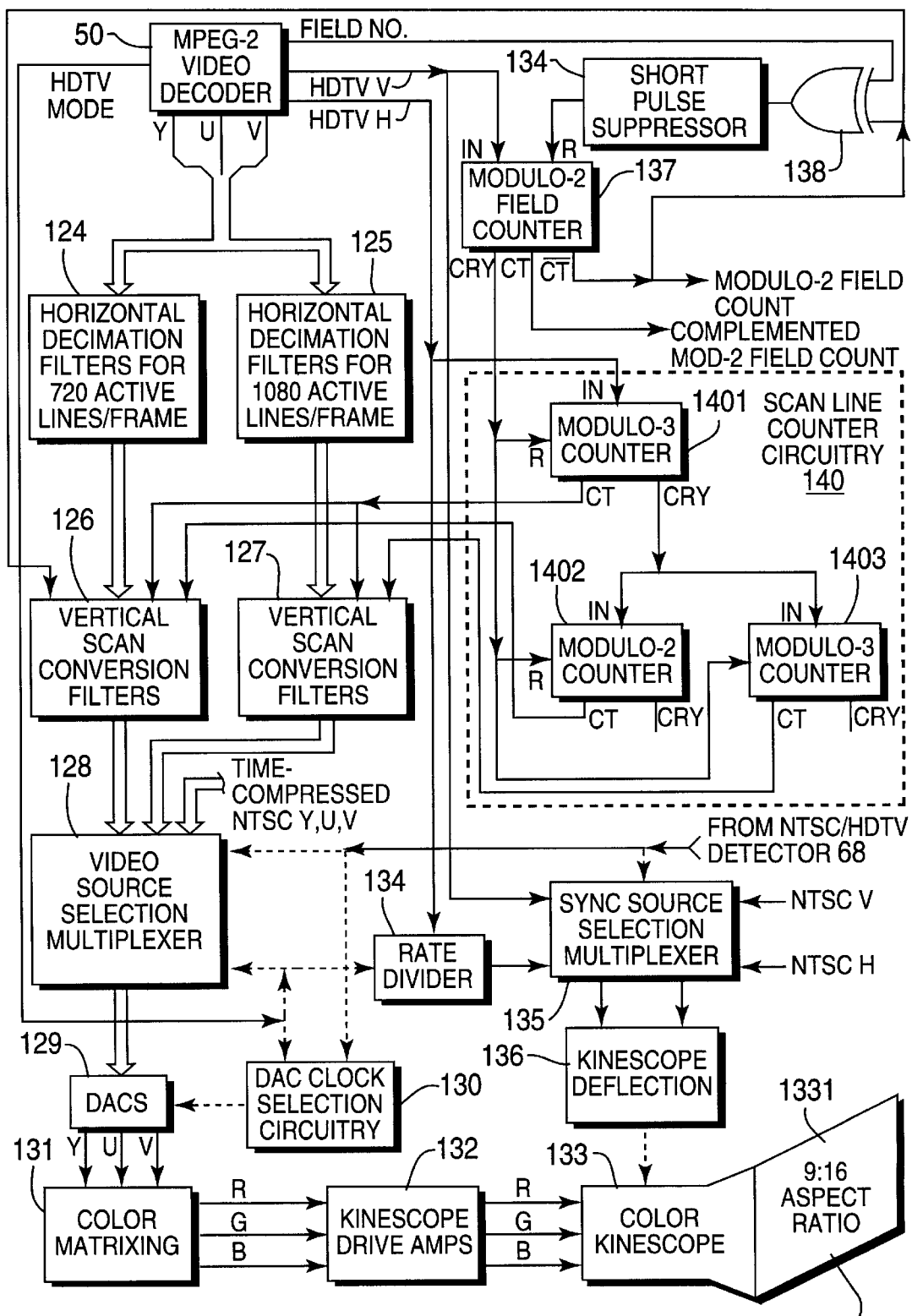
FIG. 6 is a block schematic diagram of circuitry included in a television receiver embodying the invention for processing HDTV video signals from the FIG. 2 portion of an HDTV signal radio receiver to suit them for presentation on a display screen having a 16:9 aspect ratio and a 480 active scan lines per frame dot pitch.

Certain of inventions disclosed herein, described further on in this specification with reference to FIG. 6, concern the processing of video signals as supplied from the selected dual-ported frame-store display buffer memories in the MPEG-2 video decoder 50, so kinescope deflection circuitry for a kinescope receiving these video signals can be of types providing for the raster scanning of the 16:9 aspect-ratio display screen of the kinescope at 525-scan-lines-per-line-interlaced-frame sweep rates. The processing of the video signals is essentially two-dimensional spatial filtering that provides vertical and horizontal aperture correction. To facilitate the scan conversion procedures used in this processing, the MPEG-2 video decoder 50 is designed so that its display buffer memories are scanned during vertical trace intervals with intervening vertical retrace intervals of prescribed duration inserted between the vertical trace intervals in which the display buffer memories are scanned. During these vertical retrace intervals the MPEG-2 video decoder 50 supplies Y samples that have blacker-than-black level or "superblack" level and supplies U and V samples that have zero level.

Referring back to FIG. 1, in order that ROMs 27 and 31 can be used to generate digital complex-number descriptions of the QAM and VSB signal carriers as translated to respective final intermediate frequencies, in response to addressing generated by counting first clock signals, provision must be made to lock the one those final intermediate frequencies that is the carrier of the currently received HDTV signal to a submultiple of a multiple of the first clock signal frequency. That is, those final intermediate frequencies must be in whole number ratios with the first clock signal frequency. An automatic phase and frequency control (AFPC) signal is developed in the digital circuitry following the analog-to-digital converter 22 and is used to control the frequency and phase of one of the local oscillators 11, 16 and 20 in the tuner. Using a fixed-frequency third local oscillator 20, and controlling the frequency and phase of the oscillations the second local oscillator 16 provides, is preferred in that alignment of the second IF signal with the second SAW filter 18 can be readily assured. The second SAW filter 18 usually contains traps for adjacent-channel signal components, in which case proper alignment of the second IF signal between these traps is important for preserving its integrity. The symbol clocking is made to exhibit a high degree of frequency stability. By locking the carrier of the final intermediate-frequency (IF) signal in frequency and phase to a submultiple of a multiple of the symbol clock frequency, the AFPC for correcting frequency and phase error in the carrier as translated to a final intermediate frequency invariably operates to correct dynamic symbol phase error as well, eliminating the need for a separate phase tracker to correct dynamic symbol phase error.

FIG. 1 denominates a digital multiplexer 51 as "AFPC selector". The multiplexer 51 responds to the pilot carrier presence detector 34 indicating that a pilot carrier is included in the currently received HDTV signal for selecting, as an input signal for a digital lowpass filter 52, the imaginary output signal of the baseband response of the VSB synchrodyne circuitry 29. The response of lowpass filter 52 is a digital AFPC signal supplied as input signal to a digital-to-analog converter (DAC) 53. The output signal from the DAC 53 is an analog AFPC signal, which is subjected to further lowpass filtering in an analog lowpass filter 54. The response of the filter 54 is supplied as an input to fine-tuning selection circuitry 55 in the tuner 5. During HDTV reception the fine-tuning selection circuitry 55 applies the response of the filter 54 to the second local oscillator 16 as its automatic-frequency-and-phase-control (AFPC) signal for controlling the frequency and phase of its oscillations.

The multiplexer 51 responds to the pilot carrier presence detector 34 indicating that a pilot carrier is not included in the currently received HDTV signal for selecting the input signal for the digital lowpass filter 52 from the circuitry for processing a QAM HDTV signal. FIG. 1 shows the product output signal of a digital multiplier 56 being provided for such selection. The digital multiplier 56 multiplies together the real and imaginary output signals of the QAM synchrodyne circuitry 25 to generate an unfiltered digital AFPC signal. The generation of the unfiltered digital AFPC signal is very similar to that in the well-known Costas loop. In the Costas loop the AFPC signal is used to control the frequency and phase of the digital local oscillations used for synchrodyning received signals to baseband. The FIG. 1 arrangement departs from this procedure, the AFPC signal being used instead to control the frequency and phase of the analog oscillations generated by the second local oscillator 16 during HDTV reception. This regulates the frequency and phase of the final IF signal supplied to the ADC 22 for digitization and for subsequent synchrodyning to baseband in the digital regime. As is the case with the Costas loop, the multiplier 56 is preferably of especial design in which the real signal is converted to a ternary signal for multiplying the imaginary signal; this simplifies the digital multiplier and improves the pull-in characteristics of the AFPC loop.

Although not explicitly shown in FIGS. 1 and 2, preferably circuitry is provided to sense when there is co-channel interference from NTSC signal, to by-pass the filter 30 with alternative symbol de-interleaving apparatus when no co-channel interference from NTSC signal is sensed, and to adjust symbol decoding ranges in the one-dimensional trellis decoder 38 in accordance with the number of coding levels to be expected. There is less likelihood of the occurrence of erroneous decisions as to symbol identity when eight coding levels have to be discerned than when fifteen coding levels have to be discerned.

The digital HDTV receiver shown in FIGS. 1 and 2 is representative of a wide number of possible designs. While the inventor prefers that a digital HDTV receiver digitize a final IF signal, as one of ordinary skill in the art of digital communication receiver design knows, alternative designs are possible in which synchrodyning of HDTV signals to baseband is done in the analog regime prior to analog-to-digital conversion.

Figure 3:
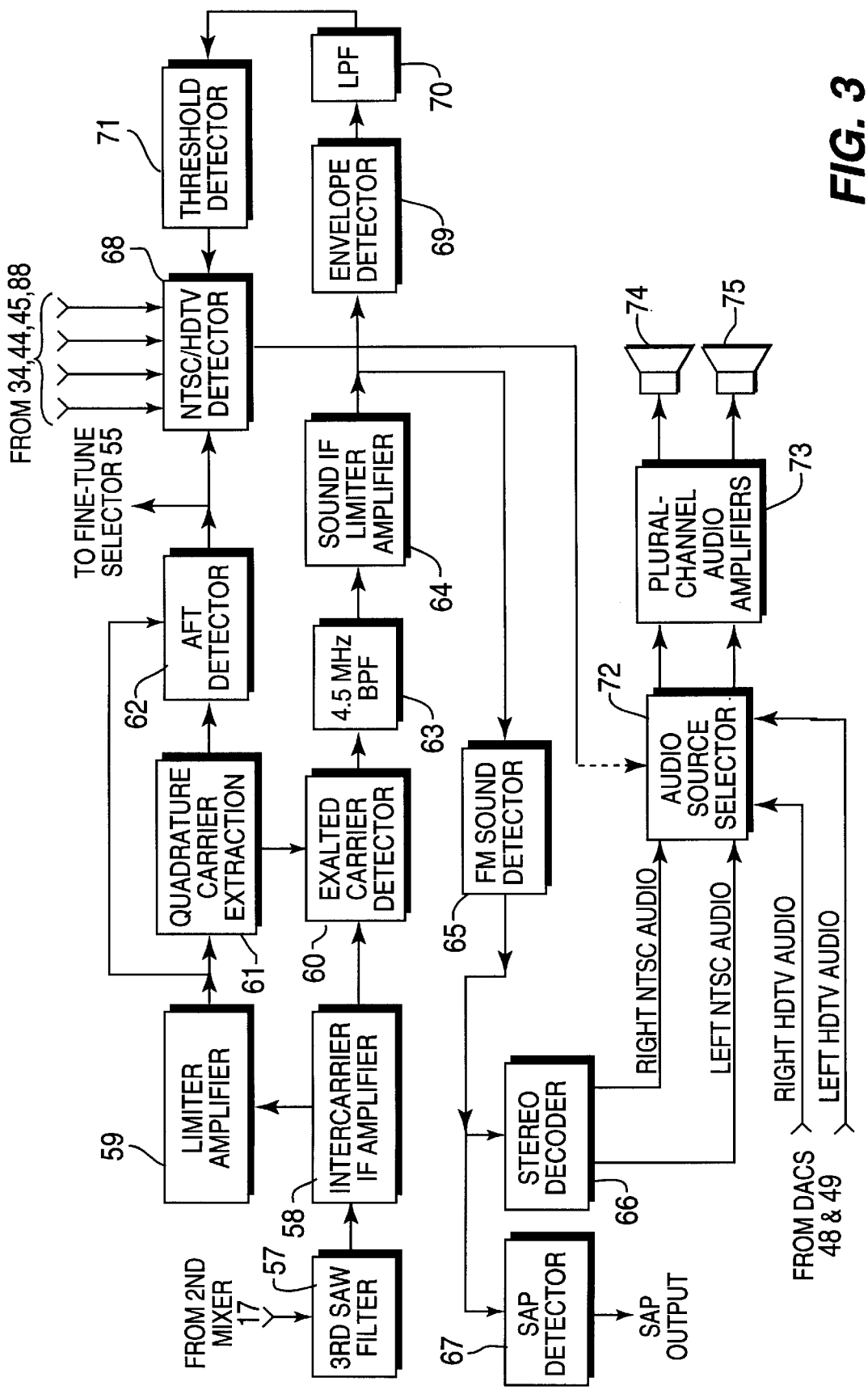
FIG. 3 is a block schematic diagram of portions of an NTSC signal radio receiver used to develop automatic fine-tuning (AFT) signals and to recover NTSC left-channel and NTSC right-channel audio signals, which portions of an NTSC signal radio receiver are included in a television receiver embodying the invention.
Figure 4:
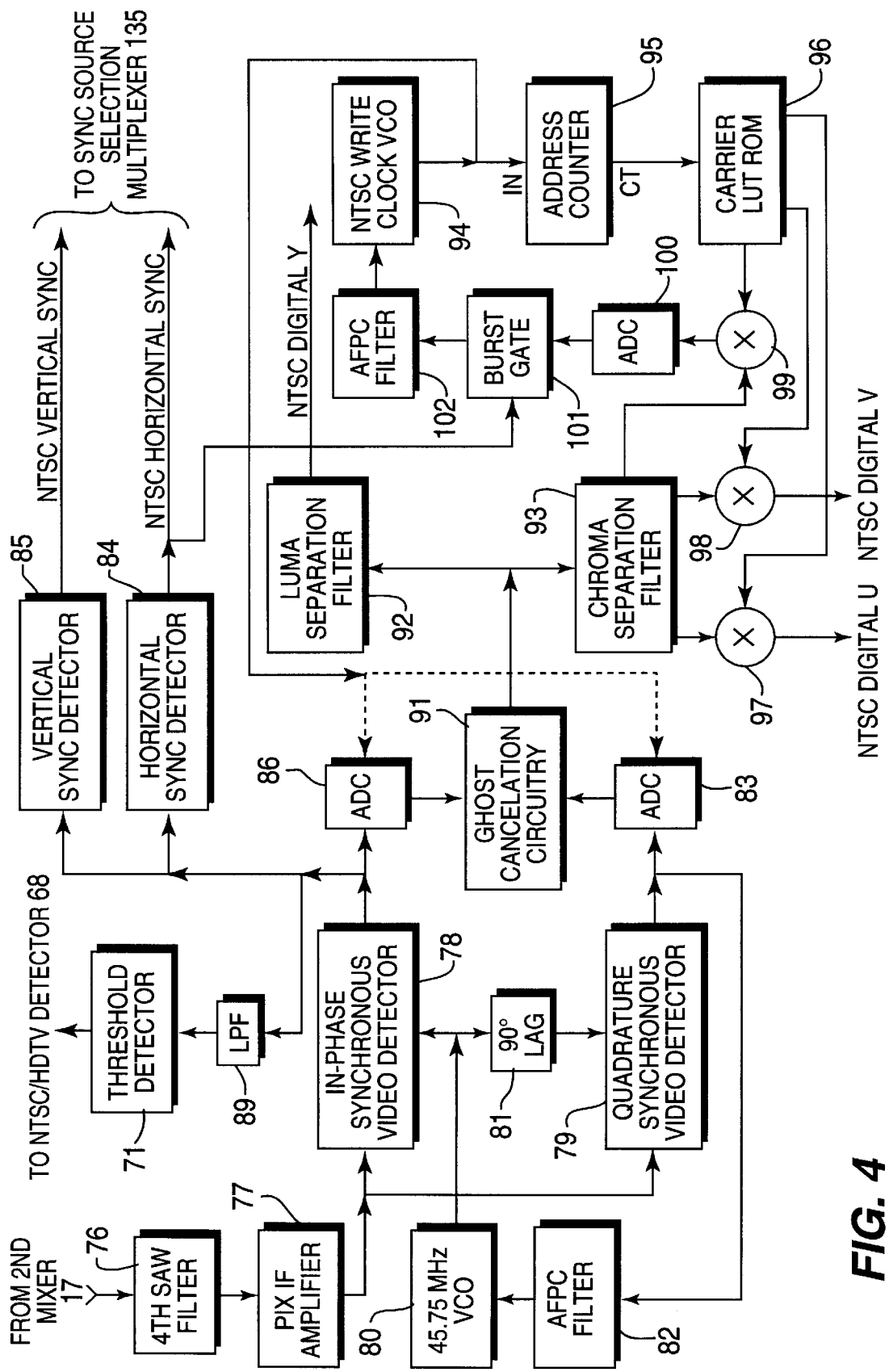
FIG. 4 is a block schematic diagram of portions of an NTSC signal radio receiver used to recover NTSC video signals and included in a television receiver embodying the invention.

FIG. 3 shows a portion of the television receiver used for receiving analog television signals transmitted according to the standard developed received by the National Television Standards Committee (NTSC). The derivation of the automatic-fine-tuning (AFT) signal supplied to the fine-tuning selection circuitry 55 in the tuner 5 of FIG. 1 during NTSC signal reception and the recovery of audio during NTSC signal reception is done in the FIG. 3 portion of the television receiver. A further portion of the television receiver used for receiving analog television signals transmitted according to the NTSC standard, which further portion is shown in FIG. 4, recovers video signals during NTSC signal reception.

In the FIG. 3 portion of the television receiver a third SAW filter 57 selects the NTSC signal for developing AFT signal and recovering audio-carrier modulation signal, receiving its input signal from the second mixer 17 in the digital HDTV signal radio receiver tuner 5 of FIG. 1. The SAW filter 57 preferably has a double-humped response with humps at the 45.75 MHz video carrier frequency and at the 41.25 MHz audio carrier frequency. The saddle between the humps reduces the response to the image of the adjacent-channel sound carrier, second harmonic distortion of which can interfere with intercarrier sound when there is a very strong adjacent-channel NTSC signal. The SAW filter 57 response is applied as input signal to an intercarrier intermediate frequency (IF) amplifier 58, which supplies its amplified response to a limiter 59 and to an exalted carrier detector 60. In less expensive TV receivers, the intercarrier IF amplifier 58 can receive the response of the FIG. 1 second SAW filter 18 as its input signal, so the third SAW filter 57 need not be used.

The limited intermediate-frequency signal from the limiter 59 is supplied to a quadrature-phase carrier extraction filter 61 that selects the video carrier component of the limited signal and phase shifts it 90° if it is at 45.75 MHz. The quadrature-phase carrier extraction filter 61 phase shifts the selected video carrier component of the limited signal more or less than 90° if it departs from 45.75 MHz frequency in one sense or the other. The quadrature-phase carrier extraction filter 61 supplies the phase-shifted video carrier component it selects to an automatic-fine-tuning detector 62 for synchronous detection in accordance with the limited intermediate-frequency signal supplied to the AFT detector 62 from the limiter 59. The AFT signal developed by the AFT detector 62 is supplied to the fine-tuning selection circuitry 55 in the tuner 5 of FIG. 1. During the reception of an NTSC signal the fine-tuning selection circuitry 55 uses the AFT signal developed by the AFT detector 62 as AFPC signal for the second local oscillator 16. Accordingly, during the reception of an NTSC signal, the AFT signal developed by the AFT detector 62 controls the frequency of the oscillations of the second local oscillator 16.

The quadrature-phase carrier extraction filter 61 also supplies the phase-shifted video carrier component it selects as an exalted carrier to the exalted carrier detector 60. The exalted carrier detector 60 generates 4.5 MHz intercarrier response that is selected by a 4.5 MHz bandpass filter 63 as input signal for a sound intermediate-frequency limiter amplifier 64. The sound IF limiter amplifier 64 supplies amplified and limited sound IF signal to an FM sound detector 65 that detects the frequency modulation of the NTSC audio carrier. The FM sound detector 65 supplies this reproduced audio-carrier modulation signal to a stereophonic decoder 66. In response the stereophonic decoder 66 supplies an NTSC left-channel audio signal and an NTSC right-channel audio signal. The FM sound detector 65 also supplies the reproduced audio-carrier modulation signal to a sound auxiliary program (SAP) detector 67.

An NTSC-or-HDTV detector 68 responds to at least selected ones of: output indications from the pilot carrier presence detector 34 shown in FIG. 1, output indications from the first data sync recovery circuitry 44 shown in FIG. 2, output indications from the second data sync recovery circuitry 45 shown in FIG. 2, and a keyed AGC signal developed in the FIG. 4 portion of the television receiver during NTSC signal reception. If the output indications from the pilot carrier presence detector 34 indicate that a VSB pilot carrier is present, this is a quite reliable indication of the reception of an HDTV transmission. The reception of a VSB HDTV transmission can be confirmed by indications from the first data sync recovery circuitry 44 that data synchronization information is being received. These confirming indications can, by way of preferred example, be generated by threshold detecting the response of an IIR lowpass digital filter providing a "lossy" integration of the response of a matching filter for the line synchronization code group of four symbols having successive values of +S, −S, −S and +S. Responsive to the FIG. 1 pilot carrier presence detector 34 indicating that a VSB pilot carrier is present and to the FIG. 2 first data sync recovery circuitry 44 indicating that a VSB HDTV transmission is indeed being received, the FIG. 3 NTSC-or-HDTV detector 68 unconditionally generates an indication that television reception is of an HDTV signal.

The NTSC-or-HDTV detector 68 should also provide an indication that television reception is of an HDTV signal when a QAM HDTV signal is being received. QAM HDTV signals presumably will not be accompanied by a pilot signal, so the NTSC-or-HDTV detector 68 must generate this indication responsive to output indications from the FIG. 2 second data sync recovery circuitry 45. The second data sync recovery circuitry 45 can generate such output indications by threshold detecting the response of an IIR lowpass digital filter providing a "lossy" integration of the response of a matching filter for the line synchronization code group used in the QAM signal.

The NTSC-or-HDTV detector 68 conditionally generates an indication that television reception is of an NTSC signal if the keyed AGC signal from the FIG. 4 portion of the receiver is of such a level as to indicate that NTSC horizontal sync pulses of substantial level are being detected. NTSC horizontal sync pulses of substantial level may be detected in the presence of strong co-channel interference accompanying an HDTV transmission, however. The NTSC rejection filter 30 may be able to satisfactorily reject the co-channel interference to provide HDTV reception. If the indications supplied to the NTSC-or-HDTV detector 68 are that an HDTV transmission is being received, this will forestall the NTSC-or-HDTV detector 68 generating an indication that television reception is of an NTSC signal. The reception of NTSC transmissions can be confirmed by a detecting the level of sound IF signal from the sound IF limiter amplifier 64 with an envelope detector 69, lowpass filtering the envelope detector 69 response with a several-line-time-constant lowpass filter 70, and threshold detecting the result with an analog comparator within a threshold detector 71. If sustained substantial NTSC audio carrier is present, this is a confirmation that television reception is of an NTSC signal. Determination of whether NTSC video carrier is present can provide further confirmation that television reception is of an NTSC signal.

The NTSC-or-HDTV detector 68 can be simply constructed from a few logic gates arranged to carry out the foregoing decision procedures. Output signal from the NTSC-or-HDTV detector 68 can be single-bit in nature, with one bit sense indicating that an NTSC signal is being received and the other bit sense indicating that an HDTV signal is being received. Preferably, the output signal includes an additional bit, with one bit sense indicating that an NTSC signal or an HDTV signal has been definitely determined to be received and the other bit sense indicating that there is no definite determination of the reception of an NTSC signal or an HDTV signal. This can be arranged for by designs that require the different conditions on the input signals supplied to the NTSC-or-HDTV detector 68 be present for specified intervals of time before changes in the detector 68 output signal are made.

The output signal of the NTSC-or-HDTV detector 68 controls the fine-tuning selection circuitry 55 in the tuner 5 of FIG. 1. During the reception of an NTSC signal the fine-tuning selection circuitry 55 in the tuner 5 of FIG. 1 uses the AFT signal developed by the AFT detector 62 as AFPC signal for the second local oscillator 16. During the reception of an HDTV signal the fine-tuning selection circuitry 55 uses the response of the FIG. 1 lowpass filter 54 as AFPC signal for the second local oscillator 16.

The output signal of the NTSC-or-HDTV detector 68 in FIG. 3 also controls audio source selection circuitry 72. Responsive to a first bit of the NTSC-or-HDTV detector 68 output signal indicating that an NTSC signal is being received and to no further bit of NTSC-or-HDTV detector 68 output signal indicating that there is no definite determination of the reception of an NTSC signal or an HDTV signal, the audio source selection circuitry 72 selects the NTSC left-channel and NTSC right-channel audio signals for application to a plural-channel audio amplifier 73 that drives a plurality of loudspeakers 74, 75. Responsive to the first bit of the NTSC-or-HDTV detector 68 output signal indicating that an HDTV signal is being received and to no further bit of NTSC-or-HDTV detector 68 output signal indicating that there is no definite determination of the reception of an NTSC signal or an HDTV signal, the audio source selection circuitry 72 selects the HDTV left-channel and HDTV right-channel audio signals supplied from the FIG. 2 DACs 48 and 49 for application to the plural-channel audio amplifier 73 that drives the plurality of loudspeakers 74, 75. Responsive to a further bit of NTSC-or-HDTV detector 68 output signal indicating that there is no definite determination of the reception of an NTSC signal or an HDTV signal, the audio source selection circuitry 72 selects a–c grounding for application to the plural-channel audio amplifier 73 so the plurality of loudspeakers 74, 75 are dumb.

The output signal of the NTSC-or-HDTV detector 68 in FIG. 3 also controls video source selection circuitry in the FIG. 4 portion of the television receiver and sync source selection circuitry in the FIG. 4 portion of the television receiver, as will be described further on in this specification.

In the FIG. 4 portion of the television receiver a fourth SAW filter 76 selects the NTSC signal from which video-carrier modulation is recovered, receiving its input signal from the second mixer 17 in the digital HDTV signal radio receiver tuner 5 of FIG. 1. Presuming a 45.75 MHz video i-f carrier frequency to be used, SAW filter 76 response includes a relatively deep (>40 dB) trap at the adjacent-channel sound-carrier frequency of 47.25 MHz. This deep trap causes the response to the 45.75 MHz video I-F carrier frequency to be located on a downward slope in frequency response, about 6 dB down. The response to the in-channel sound-carrier frequency of 41.25 MHz is reduced by about 30 dB. The SAW filter 76 exhibits linear-phase response throughout its passband. An example of a SAW filter exhibiting this type of response is the SAF45 MVB80Z manufactured by Murata Manufacturing Co., Ltd., in Erie, Pa.

The SAW filter 76 response is input signal for a picture intermediate-frequency (PIX IF) amplifier 77 that supplies amplified SAW filter 77 response to an in-phase synchronous video detector 78 and to a quadrature-phase synchronous video detector 79. Each of the video detectors 78 and 79 may either be of exalted carrier type or of true synchronous type. A controlled oscillator 80 oscillating with a nominal frequency of 45.75 MHz supplies its oscillations to the in-phase synchronous video detector 78 without phase shift and to the quadrature-phase synchronous video detector 79 with 90° lagging phase shift provided by a shift network 81. The oscillator 80 has automatic frequency and phase control (AFPC) signal supplied thereto from an AFPC filter 82 providing a lowpass response to the output signal of the quadrature-phase synchronous video detector 79. The video detector 79 output signal is also supplied to an analog-to-digital converter (ADC) 83.

The output signal of the in-phase synchronous video detector 78 is supplied to a horizontal sync detector 84, a vertical sync detector 85, an analog-to-digital converter (ADC) 86 and a keyed AGC detector 87. The horizontal sync pulses separated by the horizontal sync detector 84 are also supplied to the keyed AGC detector 86, and the keyed AGC detector 87 is threshold detected by an analog comparator within a threshold detector 88 to determine the presence of NTSC horizontal sync pulses, which determination is supplied to the NTSC-or-HDTV detector 68 in FIG. 3 as a principal indication that an HDTV signal is being received. If the FIG. 3 NTSC-or-HDTV detector 68 is of the type that further confirms that an NTSC signal is being received from a determination of whether NTSC video carrier is present, the in-phase synchronous video detector 78 output signal is supplied to a few-scan-lines-time-constant lowpass filter 89, and the response of the LPF 89 is threshold detected by an analog comparator within a threshold detector 90 to determine the presence of NTSC video carrier in the TV signal received by the tuner 5 of FIG. 1.

The ADCs 83 and 86 digitize the in-phase synchronous video detector 78 response and the quadrature-phase synchronous video detector 79 response, respectively. Ghost cancelation circuitry 91 is used in more expensive television receivers, to deghost the digitized in-phase synchronous video detector response of ADC 86 and the digitized quadrature-phase synchronous video detector response of ADC 83. The digitized in-phase synchronous video detector 78 response from DAC 86 is supplied, preferably after being de-ghosted in the ghost cancelation circuitry 91, as input signal to a digital luma separation filter 92, the response of which filter 92 is NTSC Y (luminance) signal. A digital chroma separation filter 93 receives the same input signal as the digital luma separation filter 92, which has the advantage that many of the filter elements in the two filters can be shared.

Alternatively, the digitized quadrature-phase synchronous video detector 79 response from DAC 83 is supplied, preferably after being de-ghosted in the ghost cancelation circuitry 91, as input signal to the digital chroma separation filter 93. Though the filters 92 and 93 cannot share elements, frequencies up to 750 kHz are absent in the Hilbert-transformed composite video signal that defines the system function of the digitized quadrature-phase synchronous video detector response, so luma-related components are already partially suppressed.

Figure 5:
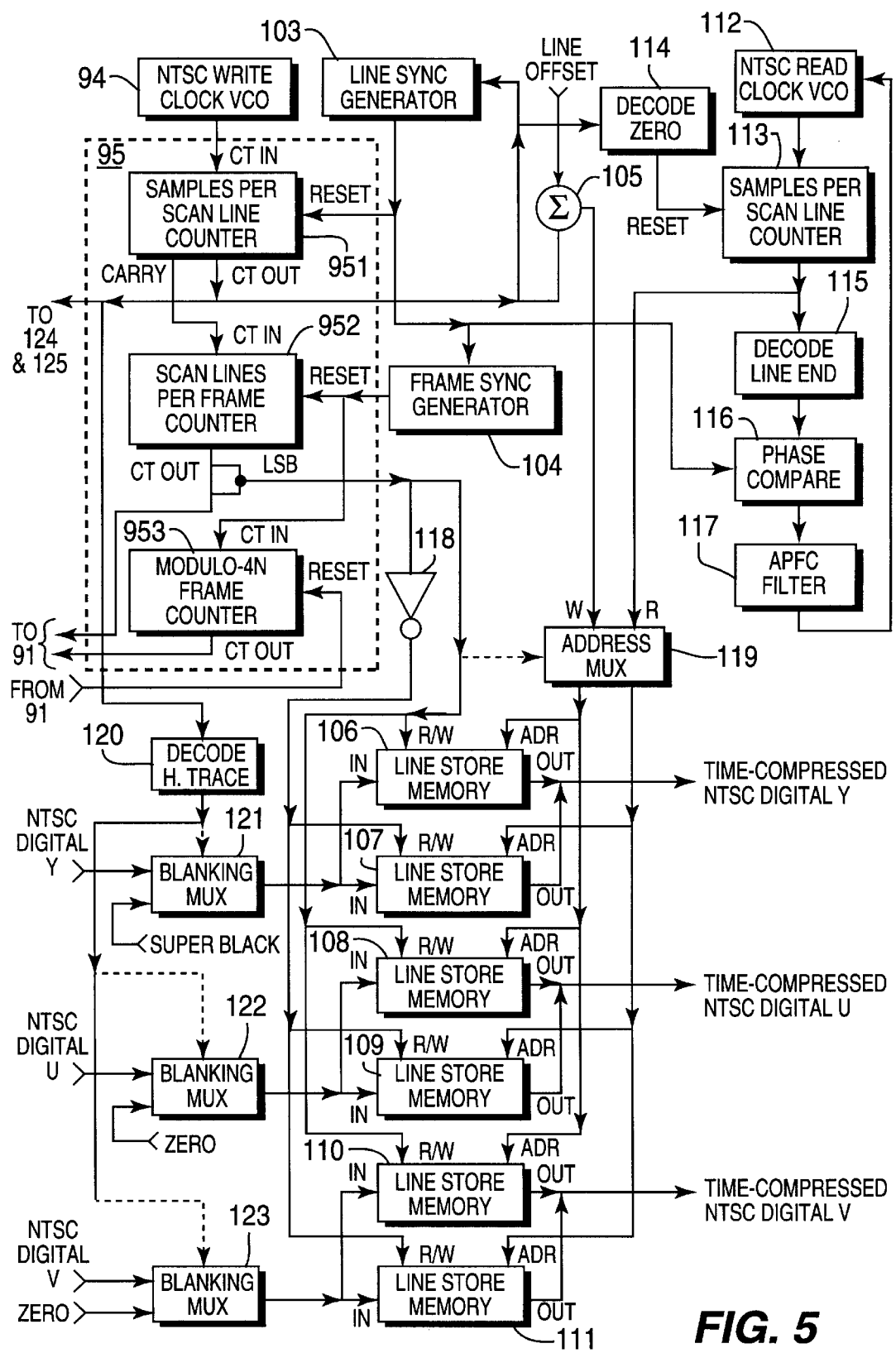
FIG. 5 is a block schematic diagram of circuitry included in a television receiver embodying the invention for processing NTSC video signals from the FIG. 4 portion of an NTSC signal radio receiver to suit them for presentation in a variant of letter-box form on a display screen having a 16:9 aspect ratio and a 480 active scan lines per frame dot pitch.

A controlled oscillator 94 serves as a first clock oscillator, referred to as the "NTSC write clock oscillator" for reasons that will become apparent when FIG. 5 is described, that times the sampling by the ADCs 83 and 86. Preferably, the NTSC write clock oscillator 94 is crystal-controlled, even though its frequency and phase are subject to limited control responsive to a respective automatic-frequency-and-phase control (AFPC) signal. Preferably, the nominal frequency of the NTSC write clock oscillator 94 is an even integer multiple, at least four, of 3.58 MHz. The oscillations from the NTSC write clock oscillator 94 are counted by a binary counter 95, which counts the number of samples in two horizontal scan lines and the less significant bits of the count address a read-only memory (ROM) 96. The ROM 96 supplies samples of sinusoidal 3.58 MHz carrier of any arbitrarily selected first phase, which are supplied to a digital multiplier 97 for multiplication with the chroma separation filter 93 response to synchronously detect a U color difference signal. The ROM 96 also supplies samples of sinusoidal 3.58 MHz carrier of a second phase in quadrature with said first phase, which samples of sinusoidal 3.58 MHz carrier of a third phase are supplied to a digital multiplier 98 for multiplication with the chroma separation filter 93 response to synchronously detect detecting a V color difference signal phase. The ROM 96 further supplies samples of sinusoidal 3.58 MHz carrier of a third phase, which is in quadrature with burst phase, to a digital multiplier 99 for multiplication with the chroma separation filter 93 response. The digital product generated by the digital multiplier 99 is a synchronous detection result that is converted to analog form by a digital-to-analog converter (DAC) 100. Burst gate circuitry 101 responds to horizontal sync pulses separated by the horizontal sync detector 84 to select the portion of the synchronous detection result that occurs during color burst intervals as input signal to an AFPC filter 102 that supplies the write clock oscillator 94 its AFPC signal, thus completing the automatic-frequency-and-phase control loop including besides the oscillator 94 the elements 95, 96 and 99–102.

FIG. 5 shows the circuitry used for accommodating the 4:3 aspect ratio NTSC signal to the 16:9 aspect ratio display screen of the kinescope used in a TV receiver constructed in accordance with the invention. The NTSC write clock oscillator 94 and the counter 95 of FIG. 4 appear in FIG. 5 as well, FIG. 5 showing the counter 95 in greater detail as comprising three sections 951, 952 and 953.

The counter section 951 counts the number of samples per scan line in a 4:3 aspect ratio 525-scan-line frame, receiving count input from the write clock oscillator 94, generates a carry when all the samples in a scan line have been counted, and rolls over the count. A line sync generator 103 determines the beginning of the trace portion of each horizontal scan line at which time the sample count from the counter section 951 is reset to zero count. The line sync detector 103 receives a samples per scan line count from the counter section 951 to be used in generating phase discriminator characteristics (e. g., from a read-only memory addressed by that count). The best accuracy for resetting is obtained by making these determinations after de-ghosting, since ghosting affects the positional accuracy of sync edges. An edge of digitized horizontal sync can be detected by a phase discriminator and an offset added thereto to make a first approximation to the beginning of the trace portion of the scan line. A better approximation detecting one of the edges of the sync porch by a phase discriminator can then be made. The edges of the horizontal sync pulse or of the sync porch or of both may exhibit some line-to-line timing variation, however. So, preferably, a final "minor phase adjustment" of the position within the scan line considered to be the beginning of the trace interval is made with reference to the phase of chroma burst as determined from ADC 100.

The counter section 952 counts number of scan lines per frame, receiving the carries from the counter section 951 as count input. A frame sync generator 104 receives the vertical sync pulses separated by the vertical sync detector 85 and receives the count output from the counter section 951 so it can be determined whether each vertical sync pulse occurs near the middle of a scan line or near the end of a scan line. Responsive to each vertical sync pulse occurring near a prescribed position within a scan line, the frame sync generator 104 generates a pulse for resetting the line count from the counter section 952. The scan line count from the counter section 952 is supplied to the FIG. 4 ghost cancelation circuitry 91 so that the occurrence of the 19th and the 281st scan lines of each frame, which contain ghost cancelation reference (GCR) signals can be detected and the contents of those lines can be grabbed for temporary storage in memory.

The counter section 953 receives the reset signals generated by the frame sync generator 104 as count input and counts the number of successive frames on a modulo-4N basis, N being a small positive integer. The modulo-4N frame count is supplied to the FIG. 4 ghost cancelation circuitry 91 to govern the accumulation of GCR signals grabbed from the 19th and the 281st scan lines of each frame, to be used by a microprocessor in the ghost cancelation circuitry 91 for computing the filtering coefficients of digital filters included in the circuitry 91 for canceling ghosts in the response from that circuitry. That microprocessor resets the frame count in the counter section 953. A detailed explanation of how the ghost cancelation circuitry 91 can be implemented is found in the above-referenced U.S. Pat. No. 5,331,416 issued Jul. 19, 1994 to the inventor and another, entitled METHODS FOR OPERATING GHOST-CANCELATION CIRCUITRY FOR TV RECEIVER OR VIDEO RECORDER, and incorporated herein by reference.

A digital adder 105 adds the sample per scan line count from the counter section 951 supplied thereto as a first addend input signal to a prescribed offset value supplied thereto as a second addend input signal, to generate a sum used in addressing linestore memories 105–110 during writing of portions thereof with NTSC video signal samples, which is the reason that the oscillator 94 is denominated the "NTSC write" clock oscillator. Those portions of the linestore memories 106–111 are read at a higher rate than they are written. A controlled oscillator 112 is the "read" clock oscillator, the oscillations of which are counted by a counter 113. The read clock oscillator 112 oscillates at a frequency in a prescribed ratio with the frequency at which the write clock oscillator 94 oscillates, which prescribed ratio is substantially 4:3, so the counter 113 counts the number of samples per scan line in a 16:9 aspect ratio 525-scan-line frame in which NTSC images appear in a variant of letter-box form. A decoder 114 decodes the sample count from the counter section 951 being zero to reset the counter 113 to zero count. If the line sync generator 103 resets the counter section 951 to zero count, rather than to some offset count, the line sync generator 103 can simultaneously reset the counter 113 to zero count and the decoder 114 can be dispensed with. (Zero count is assumed to be initial count for both write and read addressing.) A decoder 115 decodes the sample count from the counter 113 reaching the final sample count in a line to generate a pulse, which pulse is supplied to a phase comparator 116 for comparison with the reset pulse generated by the line sync generator 103. The phase comparator 116 output signal is supplied a input signal to a lowpass filter 117, the response of which is applied to the read clock oscillator 112 as its automatic frequency and phase control (AFPC) signal. This completes an AFPC loop that includes elements 113 and 115–117 besides the read clock oscillator 112, which AFPC loop functions to lock read clock oscillator 112 frequency in a prescribed ratio with the frequency at which the write clock oscillator 94 oscillates, which prescribed ratio is substantially 4:3.

There are 720 samples per scan line of 4:3-aspect-ratio Y signal in the 480 active line per one-thirtieth second field-interlaced frame standard that has been proposed for digital television. This corresponds to 960 samples per scan line of 16:9-aspect-ratio Y signal, which scales in 1:2 ratio with the 1920 samples per scan line of 16:9-aspect-ratio Y signal in HDTV transmissions having 1080 active lines per 1/30 second frame signal with 2:1 field interlace. The 960 samples per scan line of 16:9-aspect-ratio Y signal scales in 4:3 ratio with the 1280 samples per scan line of 16:9-aspect-ratio Y signal in HDTV transmissions having 720 active lines per 1/60 second progressive-scan frame signal.

The determination of difference in phase between same-frequency submultiples of two different frequency sample clocks to provide automatic frequency and phase control signal to a controlled oscillator generating one of the sample clocks is one way of constructing a pulse rate divider that divides by a ratio that is non-integral, it is noted in passing.

The linestore memories 106, 108 and 110 have the least significant bit of the scan line count from the counter section 952 applied to them as a read/write control signal conditioning them for writing during odd-numbered scan lines in each frame and for reading during even-numbered scan lines in each frame. A NOT gate 118 complements the least significant bit of the scan line count from the counter section 952 for application to the linestore memories 107, 109 and 111 as a read/write control signal conditioning these linestore memories for writing during even-numbered scan lines in each frame and for reading during odd-numbered scan lines in each frame. The connections of the linestore memories 106–111 are shown in FIG. 5 are for linestore memories each having a read output port separate from its write input port, with the read output port being tri-state in nature so its source impedance goes high during writing. However, multiplexer arrangements to permit interleaved writing and reading of linestore memories having common input/output ports can be used instead, which arrangements are familiar to digital circuit designers.

The least significant bit of the sample per line count from the counter section 951 is the control signal for an address multiplexer 119. During odd-numbered scan lines the address multiplexer 119 selects the counter section 951 count output to the linestore memories 106, 108 and 110 as write addressing and the counter 113 count output to the linestore memories 107, 109 and 111 as read addressing. During even-numbered scan lines the address multiplexer 119 selects the counter section 951 count output to the linestore memories 107, 109 and 111 as write addressing and the counter 113 count output to the linestore memories 106, 108 and 110 as read addressing. Reading of each location in the linestore memories 106 and 107 is arranged to be followed by erasure to blacker-than-black level, either immediate or at the close of the scan line being read. Reading of each location in the linestore memories 108–111 is arranged to be followed by erasure to zero arithmetic level, either immediate or at the close of the scan line being read.

A decoder 120 responds to the samples per line count from the counter section 951 to decode the active "trace" portion of each NTSC horizontal scan line. The output signal from the decoder 120 is supplied as a control signal to each of the multiplexers 121, 122 and 123. This control signal is a blanking signal for the digital NTSC Y, U and V signals supplied from the FIG. 4 circuitry to first inputs of the multiplexers 121, 122 and 123. The multiplexer 121 receives blacker-than-black level or "superblack" level as its second input, and the multiplexers 122 and 123 receive arithmetic zero as their respective second inputs. When the decoder 120 indicates that the active "trace" portion of each horizontal scan line of NTSC is currently being received, the multiplexer 121 selects Y signal from the FIG. 4 digital luma separation filter for application as write input signal to the linestore memories 106 and 107. Accordingly, that Y signal is temporarily stored in the one of the linestore memories 106 and 107 selected for writing. During a portion of this time Y signal from the preceding scan line is being read from the other of the linestore memories 106 and 107 selected for reading. When the decoder 120 indicates that the non-active "retrace" portion of each horizontal scan line of NTSC is currently being received, the multiplexer 121 selects super-black level for application as write input signal to the linestore memories 106 and 107. Accordingly, there is no change in what is temporarily stored in the linestore memories 106 and 107.

When the decoder 120 indicates that the active "trace" portion of each horizontal scan line of NTSC is currently being received, the multiplexer 122 selects the U signal from the FIG. 4 digital multiplier 97 for application as write input signal to the linestore memories 108 and 109. So, that U signal is temporarily stored in the one of the linestore memories 108 and 109 selected for writing. During a portion of this time U signal from the preceding scan line is being read from the other of the linestore memories 108 and 109 selected for reading. When the decoder 120 indicates that the non-active "retrace" portion of each horizontal scan line of NTSC is currently being received, the multiplexer 122 selects zero level to be applied as write input signal to the linestore memories 108 and 109 for temporary storage in the one of them selected for writing. So, there is no change in what is temporarily stored in the linestore memories 108 and 109.

When the decoder 120 indicates that the active "trace" portion of each horizontal scan line of NTSC is currently being received, the multiplexer 123 selects the V signal from the FIG. 4 digital multiplier 98 to be applied as write input signal to the linestore memories 110 and 111. So, that V signal is temporarily stored in the one of the linestore memories 110 and 111 selected for writing. During a portion of this time V signal from the preceding scan line is being read from the other of the linestore memories 110 and 111 selected for reading. When the decoder 120 indicates that the non-active "retrace" portion of each horizontal scan line of NTSC is currently being received, the multiplexer 123 selects zero level to be applied as write input signal to the linestore memories 110 and 111 for temporary storage in the one of them selected for writing. So, there is no change in what is temporarily stored in the linestore memories 110 and 111.

The Y, U and V signals from the preceding scan line are each compressed in the horizontal dimension, appearing at a distance from the left hand side of the display screen determined by the prescribed offset value supplied to the digital adder 105 as its second addend input signal. If pix-in-pix is not used, this prescribed offset value is generally such as to center on the display screen the NTSC images appearing in the variant of letter-box form. Alternatively, if pix-in-pix is used, this prescribed offset value can be such as to move the NTSC images to one side of the screen so the pix-in-pix pictures can be time-division-multiplexed into portions of the signals containing the time-compressed Y, U and V signals. Preferably, the linestore memories 106–111 each contain enough storage locations to contain all the samples in the trace portions of a 16:9 aspect ratio field of view in order to accommodate such shifts in the position of NTSC images as presented on the screen.

It is advantageous to subsample the U and V signals respective to the Y signal, by decimating in the horizontal direction within the chroma separation filter 93. This saves multiplications in the filter 93 and allows the multiplications in the digital multipliers 97–99 to be carried out at lower rate. There is also a saving in the number of storage locations required in the linestore memories 108–111, the more sparsely linestores being addressed by the same addresses as the linestore memories 108–111, except for the less significant bits thereof not being used.

FIG. 6 shows circuitry for processing HDTV video signals from the FIG. 2 portion of an HDTV signal radio receiver to suit them for presentation on a display screen having a 16:9 aspect ratio and a 480 active scan lines per frame dot pitch. The MPEG-2 video decoder 50 decodes HDTV video signals and supplies horizontal sync and vertical sync signals for those HDTV video signals. The MPEG-2 video decoder 50 also supplies an HDTV MODE signal indicative of whether a 720 active lines per $\frac{1}{60}$ second frame signal without field interlace has been decoded or a 1080 active lines per $\frac{1}{30}$ second frame signal with 2:1 field interlace has been decoded. The HDTV MODE signal is preferably determined by decoding packet header information, but it can alternatively be generated in response to counting the number of horizontal sync signals occurring in each interval between consecutive vertical sync signals.

The Y, U and V decoded HDTV video signals are supplied as input signals to a set 124 of horizontal decimation filters suitable for 720 active lines per $\frac{1}{60}$ second frame signal without field interlace and are also supplied as input signals to a set 125 of horizontal decimation filters suitable for 1080 active lines per $\frac{1}{30}$ second frame signal with 2:1 field interlace. The sets 124 and 125 of horizontal decimation filters reduce the horizontal sample rates of the Y, U and V signals to the same or about the same numbers of samples per scan line as used for NTSC Y, U and V read out from the linestore memories 106–111. Horizontal decimation ultimately makes pixel rate more commensurate with dot pitch and dot size on the kinescope display screen, which are limiting factors on horizontal resolution. Dot size is chosen so that the scan line structure is not too apparent to the viewer and, supposing spot wobbling is not employed, has a direct effect on fine-line resolution in the horizontal scan direction. Spot wobbling in the "vertical" direction will allow smaller dot size without the scan line structure being as apparent to the viewer. Nevertheless, the reduction of the number of scan lines per frame is generally accompanied by a reduction in the fine-line resolution in the horizontal scan direction. Kinescope driver amplifiers are best limited in bandwidth to what can be displayed on the display screen, which establishes the bandwidth required from the digital-to-analog conversion circuitry used for originating the input signals for those driver amplifiers. This in turn establishes the digital pixel rate required by the digital-to-analog conversion circuitry. The reduced pixel rate saves a considerable amount of digital hardware in the sets 126 and 127 of vertical scan conversion filters.

The responses of the set 124 of horizontal decimation filters are supplied to a set 126 of vertical scan conversion filters for converting the horizontally decimated Y, U and V signals having 720 active lines per $\frac{1}{60}$ second frame without field interlace to horizontally decimated Y, U and V signals having 480 active lines per $\frac{1}{30}$ second frame signal with field interlace. The responses of the set 125 of horizontal decimation filters are supplied to a set 127 of vertical scan conversion filters for converting the horizontally decimated Y, U and V signals for 1080 active lines per $\frac{1}{30}$ second frame signal having field interlace to horizontally decimated Y, U and V signals having 480 active lines per $\frac{1}{30}$ second frame signal with field interlace.

Responsive to the HDTV MODE signal from the video decoder 50 and to indications from the FIG. 4 NTSC/HDTV detector 68, a video source selection multiplexer 128 selects one of three sets of digital Y, U and V signals as input signal for digital-to-analog conversion circuitry 129. If the NTSC/HDTV detector 68 indicates that an NTSC television signal is being received, the video source selection multiplexer 128 selects the time-compressed digital NTSC Y, U and V signals from the ones of linestore memories 106–111 currently being read from in the FIG. 5 portion of the television receiver. If the NTSC/HDTV detector 68 indicates that an NTSC television signal is not being received, the HDTV MODE signal from the video decoder 50 selects which one (if either) of the respective responses of the filters 124 and 125 is suitable for the type of HDTV signal being currently received.

DAC clock selection circuitry 130 responds to the HDTV MODE signal from the video decoder 50 and to indications from the FIG. 4 NTSC/HDTV detector 68 to select the appropriate clock signals for the digital-to-analog conversion circuitry 129. It is possible to design the sets 124 and 125 of horizontal decimation filters so that the clock rates for Y, U and V samples from the sets 126 and 127 of vertical scan conversion filters are the same as for time-compressed-NTSC Y, U and V samples from the FIG. 5 circuitry, in which case the DAC clock selection circuitry 130 will not be required. The horizontal decimation filters can become more complex than desired, however, so it can be simpler to limit the bandwidths of the analog Y, U and V signals by the analog lowpass filtering afforded those signals by the digital-to-analog conversion circuitry 129.

The digital-to-analog conversion circuitry 129 supplies analog Y, U and V signals to color matrix circuitry 131 for conversion to red (R), green (G) and blue (B) video signals that are amplified by the kinescope driver amplifier circuitry 1321 and thereafter applied to a color kinescope 133. The color kinescope 133 has a display screen 1331 having a 16:9 aspect ratio and a 480 active scan lines per frame dot pitch.

The MPEG-2 video decoder 50 forwards HDTV horizontal synchronizing pulses and HDTV vertical synchronizing pulses in response to synchronizing it receives from the data sync selector 46 shown in FIG. 2. The HDTV vertical sync pulses occur at the same rate as NTSC vertical sync pulses, but the HDTV horizontal sync pulses occur at higher rates than NTSC horizontal synchronizing pulses. Pulse rate divider circuitry 134 responds to the HDTV MODE signal from the MPEG-2 video decoder 50 to divide the rate of the HDTV horizontal sync pulses forwarded by the MPEG-2 video decoder 50 in such ratio as to generate rate-divided HDTV horizontal synchronizing pulses that occur at the same rate as NTSC horizontal sync pulses.

If the NTSC/HDTV detector 68 in FIG. 3 indicates that an NTSC television signal is being received, a sync source selection multiplexer 135 in FIG. 6 selects to kinescope deflection circuitry 135 the NTSC horizontal and vertical synchronizing pulses respectively supplied from the horizontal sync detector 84 and the vertical sync detector 86 of FIG. 4. If the NTSC/HDTV detector 68 indicates that an NTSC television signal is not being received, the sync source selection multiplexer 135 selects to kinescope deflection circuitry 136 the HDTV vertical synchronizing pulses supplied from the video decoder 50 and the rate divided horizontal synchronizing pulses supplied from the pulse rate divider circuitry 134. The kinescope deflection circuitry 136 includes the horizontal and vertical deflection coils for the kinescope 133 that deflect electron beams therein during their raster scanning of the display screen 1331, the horizontal deflection circuitry for driving the horizontal deflection coils as synchronized by the horizontal synchronizing pulses supplied by the sync source selection multiplexer 135, and vertical deflection circuitry for driving the vertical deflection coils as synchronized by the vertical synchronizing pulses supplied by the sync source selection multiplexer 135.

Rather than using the digital-to-analog conversion circuitry 129 to convert the one of three sets of digital Y, U and V signals selected by video source selection multiplexer 128 to analog form for application to color matrix circuitry 131 performing the conversion to R, G and B video signals, an television receiver that embodies the invention in alternative form uses digital circuitry for converting the selected set of digital Y, U and V signals to digital R, G and B video signals. These digital R, G and B video signals are then supplied to digital-to-analog conversion circuitry for conversion to analog R, G and B video signals to be amplified by the kinescope driver amplifier circuitry 132 and thereafter applied to a color kinescope 133.

Although not shown in the drawing, provisions are made in the television receiver for control of luminance (Y) gain (brightness), of chrominance (U, V) gain (color saturation), of luminance black level and of tint.

Brightness control is better done after digital-to-analog conversion, rather than before, so the conversion circuitry operates with greatest resolution and quantizing noise in the luminance signal is minimized. Brightness control can also be done using a digital-to-analog converter of multiplying type. If digital-to-analog conversion of Y signal is done before the color matrix circuitry 131, as shown in FIG. 6, potentiometric control of the Y signal provides brightness control in a simple and straightforward way. If the color matrix circuitry is digital, the digital-to-analog conversion of the R, G and B signals can be done using digital-to-analog converters of multiplying type; this provides brightness control with good tracking of R, G and B signal gains. This latter type of brightness control is interesting because there is automatic luma/chroma tracking.

Color saturation control is also better done after digital-to-analog conversion, rather than before, so the conversion circuitry operates with greatest resolution and quantizing noise in the luminance signal is minimized. If digital-to-analog conversion of U and V color-difference signals is done before the color matrix circuitry 131, as shown in FIG. 6, respective potentiometric controls of the analog U and V signals is possible. However, there is the problem of tracking the potentiometric controls. This problem can be avoided by using digital-to-analog converters of multiplying type for the U and V color-difference signals, but their design must take into account that the zero values of these signals are in the middle of the dynamic range of these converters.

Color saturation control is of greatest importance for NTSC and color saturation control just for NTSC can be simply effected by using a digital multiplier to adjust the amplitude of the chroma separation filter 96 response applied to the digital multipliers 97 and 98. The adjustment is made responsive to a digital multiplier signal that is controllable by the human viewer.

Luminance black level setting is best done before digital-to-analog conversion, so the dynamic range of the conversion circuitry can be best utilized. A simple way of implementing this is to combine a black level adjustment that is controllable by the human viewer with the Y signal using a digital adder, with the sum output signal of the adder being digitized by the digital-to-analog converter for luminance.

Tint control is of greatest importance for NTSC and tint control just for NTSC can be most simply effected by partitioning the ROM 96 into two separately addressed portions. A first portion of the ROM 96, which supplies the digital multipliers 97 and 98 with respective phases of color subcarrier that are orthogonal with each other, is addressed by the sum output of a digital adder that receives the count from the address counter 95 as a first summand and that receives a tint offset as a second summand. A second portion of the ROM 96, which supplies the digital multiplier 99 with quadrature-phase color subcarrier is addressed without offset by the count from the address counter 95. The tint offset is a binary digital number generated by a digitizer that is controllable by the human viewer. Supplemental tint control that will adjust tint for HDTV can be provided in the color matrix circuitry 130 or its counterpart when color matrixing is done digitally.

Pixel clocking for the sets of horizontal decimation filters 124 and 125 is the same as that used in the display buffer memory of the MPEG-2 video decoder 50. The methods of generating that pixel clocking are known to those skilled in the art and will not be particularly described here. Rate division procedures known to those skilled in the art of digital electronics systems design are used for generating the subsampling clocks for taking horizontally decimated Y, U and V signals from the set 124 of horizontal decimation filters for writing to linestore memories within the set 126 of vertical scan conversion filters. These subsampling clocks for Y signals are counted, thereby generating write addresses for those linestore memories. Further rate division in accordance with known procedures is used for generating the reduced-rate clocks employed for reading from the linestore memories within the set 126 of vertical scan conversion filters and for clocking the digital-to-analog conversion circuitry 129 when the data read from those linestore memories are selected for conversion by the multiplexer 128. These reduced-rate clocks for Y signals are counted for generating read addresses for those linestore memories.

Known rate division procedures are also used for generating the subsampling clocks for taking horizontally decimated Y, U and V signals from the set 125 of horizontal decimation filters for writing to linestore memories within the set 127 of vertical scan conversion filters. These subsampling clocks for Y signals are counted for generating write addresses for those linestore memories. Further rate division in accordance with known procedures is used for generating the reduced-rate clocks employed for reading from the linestore memories within the set 127 of vertical scan conversion filters and for clocking the digital-to-analog conversion circuitry 129 when the data read from those linestore memories are selected for conversion by the multiplexer 128. These reduced-rate clocks for Y signals are counted for generating read addresses for those linestore memories.

A field counter 137 counts HDTV vertical synchronizing pulses forwarded by the MPEG-2 video decoder 50 in order to furnish (at its complemented count output) a modulo-2 count of data fields. The modulo-2 data field count is supplied to the set 126 of vertical scan conversion filters to control the selection of filtering employed to generate alternate fields of the 480 active lines per $\frac{1}{30}$ second frame video signals in such way that they exhibit proper field interlace. The count from counter 137 corresponds to a count of data frames when 720 active lines per $\frac{1}{60}$ second frame video signals having no field interlace are being received, so there is then no need for synchronizing the count from counter 137 in order that the set 126 of vertical scan conversion filters can generate 480 active lines per $\frac{1}{30}$ second frame video signals having field interlace in which scan lines interlace in proper order.

When 1080 active lines per $\frac{1}{30}$ second frame video signals having field interlace are being received, the field count from counter 137 corresponds to a count of one-half data frames; and there is then a need for synchronizing the count from counter 137 in order that the set 127 of vertical scan conversion filters can generate 480 active lines per $\frac{1}{30}$ second frame video signals having field interlace in which scan lines interlace in proper order. The MPEG-2 video decoder 50 is constructed to furnish indications of whether current scan information is for an odd or an even field. The basis for generating such indications can be determining when HDTV sync pulses occur during the middles of horizontal scan lines to generate indications of even fields and determining when HDTV sync pulses occur near the ends of horizontal scan lines to generate indications of odd fields. An exclusive-OR gate 138 exclusively ORs these indications with single-bit modulo-2 field count from counter 137 to reset the counter 137 when the field count is out of synchronism. The exclusive-OR gate 138 response is preferably passed through a short-pulse suppressor 139 as shown in FIG. 6 to generate the reset pulses for the counter 137, so pulse timing is less critical.

A line counter 140 counts HDTV horizontal synchronizing pulses forwarded from the decoder 50 to generate modulo-6 and modulo-9 counts of scan lines supplied to the sets 126 and 127 of vertical scan conversion filters, respectively. The counter 140 comprises component counters 1401, 1402 and 1403. The counter 1401 counts HDTV horizontal sync pulses forwarded from the MPEG-2 video decoder 50 to generate a modulo-3 scan line count. The counter 1401 counts HDTV horizontal sync pulses forwarded from the MPEG-2 video decoder 50 to generate a modulo-3 scan line count. The counter 1402 counts carries from the counter 1401 modulo-2, which count is combined with the count of the counter to furnish a modulo-6 scan line count in a peculiar arithmetic, the most significant bit of which counts scan-line triples in binary arithmetic and the less significant bits count scan lines within the triple in binary-coded ternary arithmetic. The counter 1403 counts carries from the counter 1401 modulo-3, which count is combined with the count of the counter to furnish a modulo-9 scan line count in binary-coded ternary arithmetic. Other counting arrangements to count scan lines modulo-6 and modulo-9 can be used, but they generally employ more counter stages.

Figure 7:
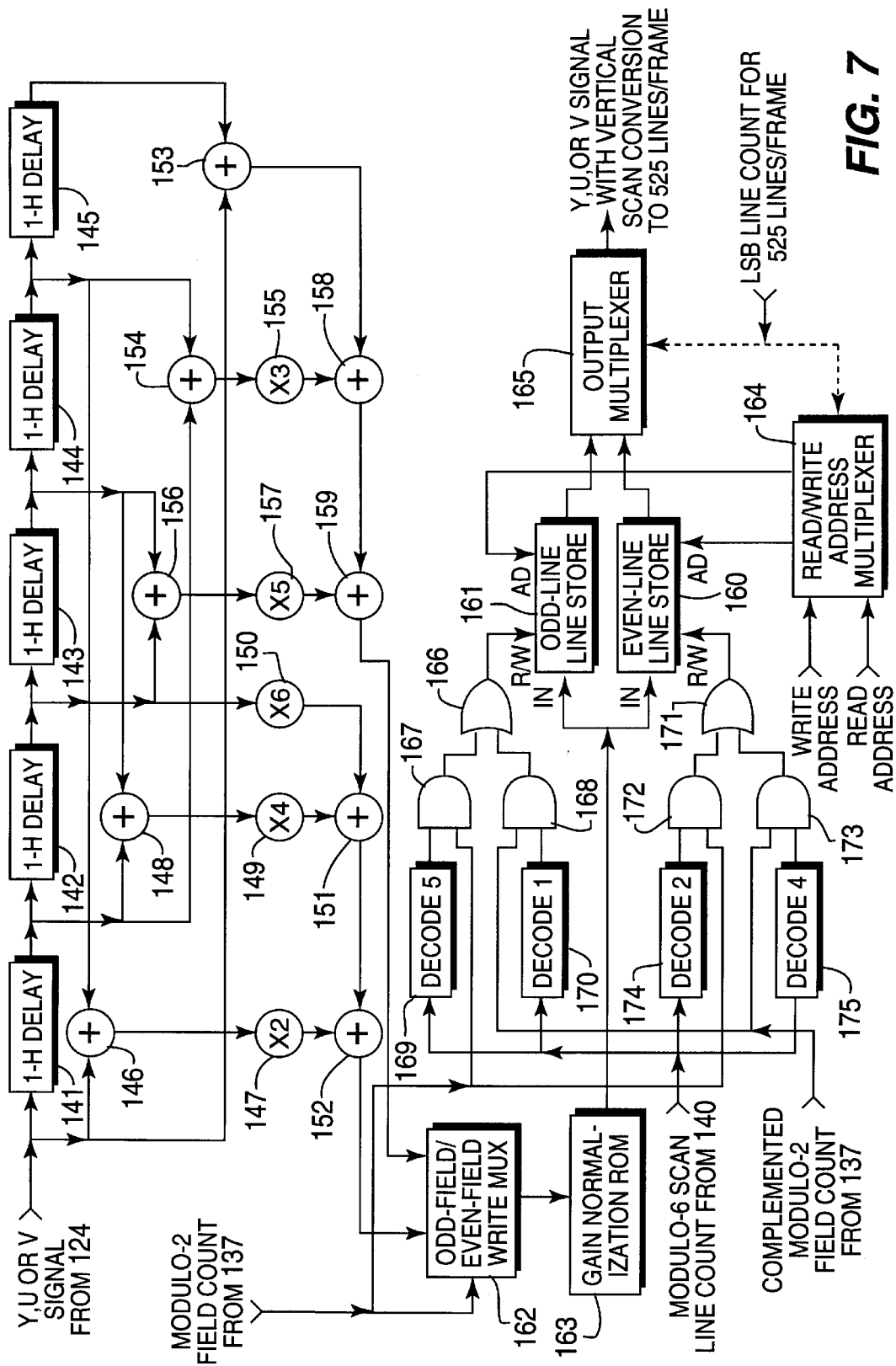
FIGS. 7 and 8 are block schematic diagrams of alternative forms of vertical scan conversion filter for HDTV signals having 720 active scan lines per 1/60 second frame and not employing field interlace, as can be used in a television receiver embodying the invention.

FIG. 7 shows a representative vertical scan conversion filter for processing of the horizontally decimated Y, U or V signal having 720 non-interlaced active lines per frame to suit that signal for raster scanning the 16:9-aspect-ratio display screen of a kinescope with interlaced 480 active lines per frame. The FIG. 6 set 126 of vertical scan conversion filters can include three of the FIG. 7 filters, alike except that the clock rate for U and V signals is normally one-quarter of that for the Y signal.

A first vertical lowpass filter response, certain scan lines of which are selected and re-timed to provide display scan lines in odd-numbered fields, additively combines the horizontally decimated Y, U or V signal supplied as response by one of the set 124 of decimation filters response and that response as delayed by one, two, three, and four scan lines in ($\frac{1}{9}$):($\frac{2}{9}$): ($\frac{1}{3}$):($\frac{2}{9}$):($\frac{1}{9}$) ratio. Except for finally applying a normalizing factor of ($\frac{1}{18}$), which is done further on in the circuitry as part of an overall amplitude normalizing procedure using a look-up table (LUT) stored in a read-only memory (ROM) 163, this first vertical LPF response is generated as follows. The horizontally decimated response to Y, U or V signal and that response as delayed by four scan lines in cascaded FIFO linestores 141–144 are summed in a digital adder 146. The resulting sum is multiplied by two in a digital multiplier 147, which multiplier 147 can be simply realized by a wired single-bit-place shift. The horizontally decimated response to Y, U or V signal as delayed one scan line by FIFO linestore 141 and that response as delayed three scan lines by FIFO linestores 141–143 are summed in a digital adder 148. The resulting sum is multiplied by four in a digital multiplier 149, which multiplier 149 can be simply realized by a wired two-bit-place shift. The horizontally decimated response to Y, U or V signal as delayed two scan lines by FIFO linestores 141 and 142 is multiplied by six in a digital multiplier 150. The products from the multipliers 149 and 150 are summed in a digital adder 151, the sum from which is summed with the product from the multiplier 147 in a further digital adder 152.

A second vertical lowpass filter response, certain scan lines of which are selected and re-timed to provide display scan lines in even-numbered fields, additively combines the horizontally decimated response to Y, U or V signal and that response as delayed by one, two, three, four and five scan lines in (1/18): (1/6):(5/18):(5/18): (1/6):(1/18) ratio. Except for finally applying a normalizing factor of (1/18), which is done further on in the circuitry using a look-up table (LUT) stored in the ROM 163, this second vertical LPF is constructed as follows. The horizontally decimated response to Y, U or V signal and that response as delayed by five scan lines in cascaded FIFO linestores 141–145 are summed in a digital adder 153. The horizontally decimated response to Y, U or V signal as delayed one scan line by FIFO linestore 1141 and that response as delayed four scan lines by FIFO linestores 141–144 are summed in a digital adder 154; and the resulting sum is multiplied by three in a digital multiplier 155. The horizontally decimated response to Y, U or V signal as delayed two scan lines by FIFO linestores 141, 142 and that response as delayed three scan lines by FIFO linestores 141–143 are summed in a digital adder 156; and the resulting sum is multiplied by five in a digital multiplier 157. The sum from the adder 153 and the product from the multiplier 155 are summed in a digital adder 158, the sum from which is summed with the product from the multiplier 157 in a further digital adder 159.

An odd-field/even-field write multiplexer 162 responds to the least significant bit of VSB frame count being a ONE to select the sum from the adder 152 as an address for the ROM 163 used for gain normalization of the first vertical LPF response. The odd-field/even-field write multiplexer 162 responds to the modulo-2 field count from the field counter 137 in FIG. 6 being a ZERO to select the sum from the adder 159 as an address for the ROM 163 used for gain normalization of the second vertical LPF response. ROM 163 responds to each binary-number address supplied thereto with a binary number proportional thereto which is supplied as write input to an odd-line linestore memory 161 and to an even-line linestore memory 160. This gain normalization by ROM 161 is part of the procedures followed to keep video intensity the same no matter whether NTSC, VSB or QAM video signals are being displayed on the kinescope display screen.

The least significant bit of scan line count for 525-interleaved-lines-per-frame display is supplied as control signal to a read/write address multiplexer 164 and to an output multiplexer 165. Responsive to that modulo-2 scan line count being a ONE, the multiplexer 164 applies a reduced-rate subsample-per-line count to the linestore memory 161 as read addressing and applies the subsample-per-line count to the linestore memory 160 as write address-ing. Responsive to the modulo-2 scan line count being a ZERO, the multiplexer 164 applies the reduced-rate subsample-per-line count to the linestore memory 160 as read addressing and applies the subsample-per-line count to the linestore memory 161 as write addressing. Responsive to the modulo-2 scan line count being a ONE, the multiplexer 165 selects read-out from the linestore memory 161 as the output signal from the FIG. 7 vertical scan conversion filter. Responsive to the modulo-2 scan line count being a ZERO, the multiplexer 165 selects read-out from the linestore memory 160 as the output signal from the FIG. 7 vertical scan conversion filter.

The linestore memory 161 receives the response of an OR gate 166 as its read/write command, is conditioned for writing by the OR gate 166 response being a ONE, and is conditioned for reading by the OR gate 166 response being a ZERO. The OR gate 166 receives the responses of AND gates 167 and 168 as its two input signals.

A decoder 169 furnishes the AND gate 167 the first of its two input signals, decoding the modulo-6 scan-line count from the FIG. 6 scan line counter circuitry 140 being five to generate a ONE as its decoder response, which otherwise is a ZERO. The AND gate 167 receives the modulo-2 field count from the FIG. 6 field counter 137 as the second of its two input signals and is conditioned by the field count being ONE, indicative of the field being an odd field, to repeat the decoder 169 response as its own response, which is in turn repeated in the OR gate 166 response applied to the linestore memory 161 as its read/write command. When the field count is ZERO, indicative of the field being an even field, the AND gate 167 response is ZERO and the decoder 169 can no longer selectively condition the linestore memory 161 for being written into.

A decoder 170 furnishes the AND gate 168 the first of its two input signals, decoding the modulo-6 scan-line count from the FIG. 6 scan line counter circuitry 140 being one to generate a ONE as its decoder response, which otherwise is a ZERO. The AND gate 168 receives the one's complement of modulo-2 field count from the FIG. 6 field counter 137 as the second of its two input signals and is conditioned by the complemented field count being ONE, indicative of the field being an even field, to repeat the decoder 170 response as its own response, which is in turn repeated in the OR gate 166 response applied to the linestore memory 161 as its read/write command. When the complemented field count is ZERO, indicative of the field being an odd field, the AND gate 168 response is ZERO and the decoder 170 can no longer selectively condition the linestore memory 161 for being written into.

The linestore memory 160 receives the response of an OR gate 171 as its read/write command, is conditioned for writing by the OR gate 171 response being a ONE, and is conditioned for reading by the OR gate 171 response being a ZERO. The OR gate 171 receives the responses of AND gates 172 and 173 as its two input signals.

A decoder 174 furnishes the AND gate 172 the first of its two input signals, decoding the modulo-6 scan-line count from the FIG. 6 scan line counter circuitry 140 being two to generate a ONE as its decoder response, which otherwise is a ZERO. The AND gate 172 receives the modulo-2 field count from the FIG. 6 field counter 137 as the second of its two input signals and is conditioned by the field count being ONE, indicative of the field being an odd field, to repeat the decoder 174 response as its own response, which is in turn repeated in the OR gate 171 response applied to the linestore memory 160 as its read/write command. When the field count is ZERO, indicative of the field being an even field, the AND gate 172 response is ZERO and the decoder 174 can no longer selectively condition the linestore memory 160 for being written into.

A decoder 175 furnishes the AND gate 173 the first of its two input signals, decoding the modulo-6 scan-line count from the FIG. 6 scan line counter circuitry 140 being four to generate a ONE as its decoder response, which otherwise is a ZERO. The AND gate 173 receives the one's complement of modulo-2 field count from the FIG. 6 field counter 137 as the second of its two input signals and is conditioned by the complemented field count being ONE, indicative of the field being an even field, to repeat the decoder 175 response as its own response, which is in turn repeated in the OR gate 171 response applied to the linestore memory 160 as its read/write command. When the complemented field count is ZERO, indicative of the field being an odd field, the AND gate 173 response is ZERO and the decoder 175 can no longer selectively condition the linestore memory 160 for being written into.

The elements 141–152 (and elements 162 and 163) form a first finite-impulse-response vertical lowpass filter (LPF) for generating a first vertical LPF response to the Y, U or V video signal during odd fields in raster scan, which first vertical LPF response is lowpass in at least the direction perpendicular to line scan, is written to the odd-line linestore memory 161 during the last third of each even line of each odd field of raster scan, and is written to the even-line linestore memory 160 during the last third of each odd line of each odd field of raster scan. The elements 153–159 (and elements 162 and 163) form a second finite-impulse-response vertical lowpass filter (LPF) for generating a second vertical LPF filter response to the Y, U or V video signal during even fields in raster scan, which second filter response is lowpass in at least the direction perpendicular to line scan, is written to the odd-line linestore memory 161 during the last third of each even line of each even field of raster scan, and is written to said even-line linestore memory 160 during the last third of each odd line of each even field of raster scan.

Figure 8:
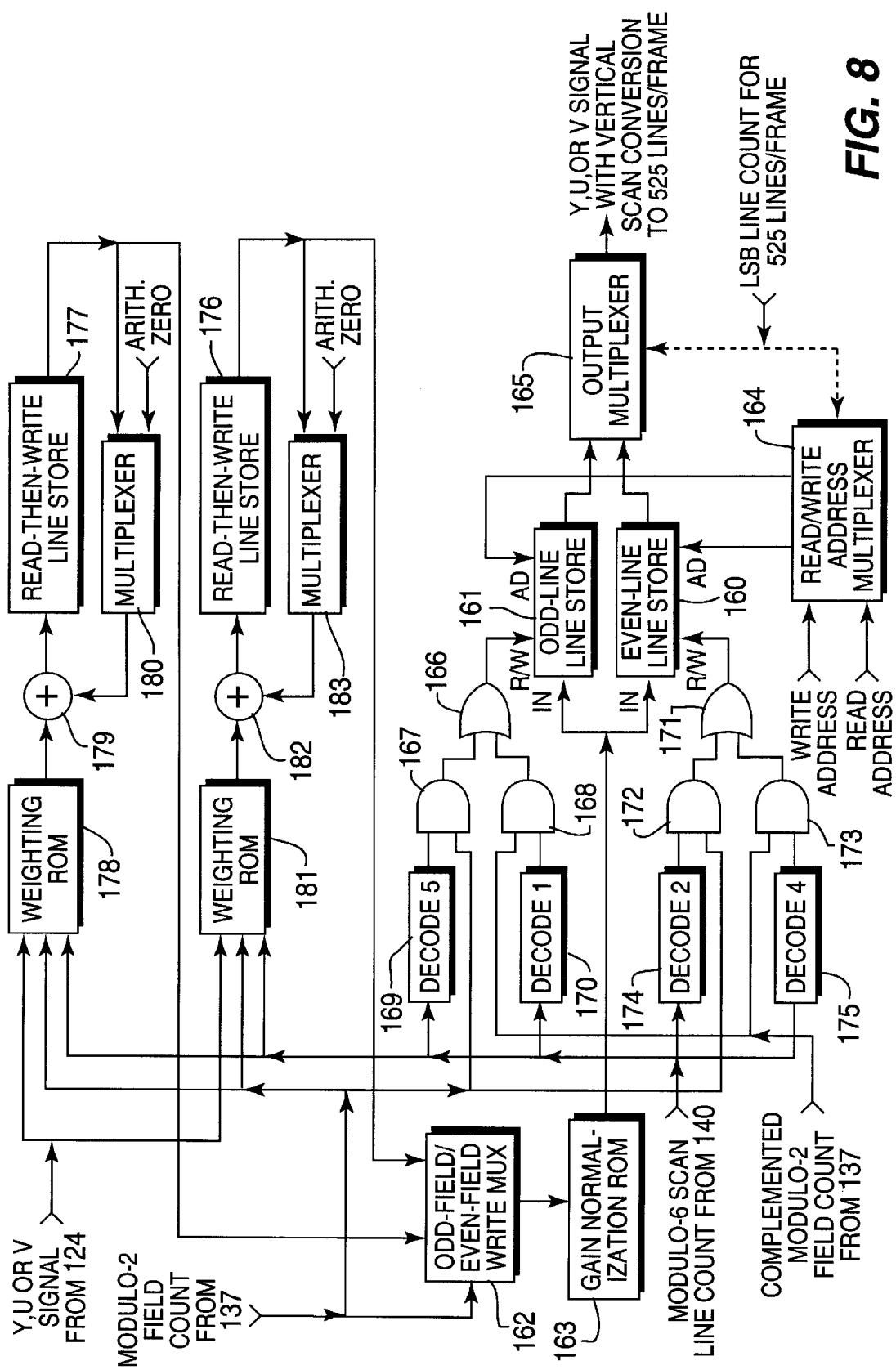

FIG. 8 shows a modification of the FIG. 7 vertical scan conversion filter for HDTV signals having 720 active scan lines per ⅟₆₀ second frame and not employing field interlace, which uses fewer line stores. In the FIG. 7 vertical scan conversion filter the first and second vertical LPFs contained as components therein are of output weighted type and supply low pass filtered response for each of the 720 active scan lines per ⅟₆₀ second frame. In a 3:1 vertical decimation filter, however, low pass filtered response is required only every third scan line. This permits vertical LPF designs that use input weighting and that accumulate lines of weighted samples using only a pair of linestore memories 176 and 177, each of which will have to accommodate samples with an additional few bits.

In FIG. 8 the elements 141–163 that implemented the first and second vertical LPFs in FIG. 7 are dispensed with. The horizontally decimated response to Y, U or V signal from one of the FIG. 6 set 124 of horizontal decimation filters, the modulo-6 scan line count from the FIG. 6 scan line counter circuitry 140, and the modulo-2 field count from the FIG. 6 field counter 140 are used to address a read-only memory 178 that weights each of the 720-active-lines-per-field scan lines for inclusion in an odd one of the 240-active-lines-per-field scan lines. The weighted samples of this 720-active-lines-per-field scan line are supplied as first summands to a digital adder 179 that supplies its sum output samples for writing the linestore memory 177, which is arranged for read-and-then-write-over operation. The read-out from the linestore memory 177 is applied as a first input signal to a two-input multiplexer 180, which receives a wired arithmetic zero as its second input signal. The samples of the multiplexer 180 output signal are applied to the digital adder 179 as second summands. The multiplexer 180 receives the read/write signal of the odd linestore memory 161 as its control signal. Except when the odd linestore memory 161 is conditioned for writing, the multiplexer 180 reproduces in its output signal the read-out from the linestore memory 177, so the linestore memory 177, adder 179 and multiplexer 180 operate to accumulate successive lines of weighted samples supplied from the ROM 178. When the odd linestore memory 161 is conditioned for writing, the multiplexer 180 reproduces in its output signal the wired arithmetic zero, so accumulation starts over.

The horizontally decimated response to Y, U or V signal from one of the FIG. 6 set 124 of horizontal decimation filters, the modulo-6 scan line count from the FIG. 6 scan line counter circuitry 140, and the modulo-2 field count from the FIG. 6 field counter 140 are also used to address a read-only memory 181 that weights each of the 720-active-lines-per-field scan lines for inclusion in an even one of the 240-active-lines-per-field scan lines. The weighted samples of this 720-active-lines-per-field scan line are supplied as first summands to a digital adder 182 that supplies its sum output samples for writing the linestore memory 176, which is arranged for read-and-then-write-over operation. The read-out from the linestore memory 176 is applied as a first input signal to a two-input multiplexer 183, which receives a wired arithmetic zero as its second input signal. The samples of the multiplexer 183 output signal are applied to the digital adder 182 as second summands. The multiplexer 183 receives the read/write signal of the even linestore memory 160 as its control signal. Except when the even linestore memory 160 is conditioned for writing, the multiplexer 183 reproduces in its output signal the read-out from the linestore memory 176, so the linestore memory 176, adder 182 and multiplexer 183 operate to accumulate successive lines of weighted samples supplied from the ROM 181. When the even linestore memory 160 is conditioned for writing, the multiplexer 183 reproduces in its output signal the wired arithmetic zero, so accumulation starts over.

The twenty-two lines of vertical retrace in a field-interlaced 480-active-scan-lines-per-frame display should be the same time duration as sixty-six lines of progressive-scan 720-active-scan-lines-per-frame HDTV signal. Accordingly, the MPEG-2 video decoder 50 display buffer clocking is arranged to include a vertical retrace interval extending for sixty-six HDTV scan line periods between every odd field and the succeeding even field when 720-active-scan-lines-per-frame progressive-scan HDTV signal is being regenerated.

Figure 9:
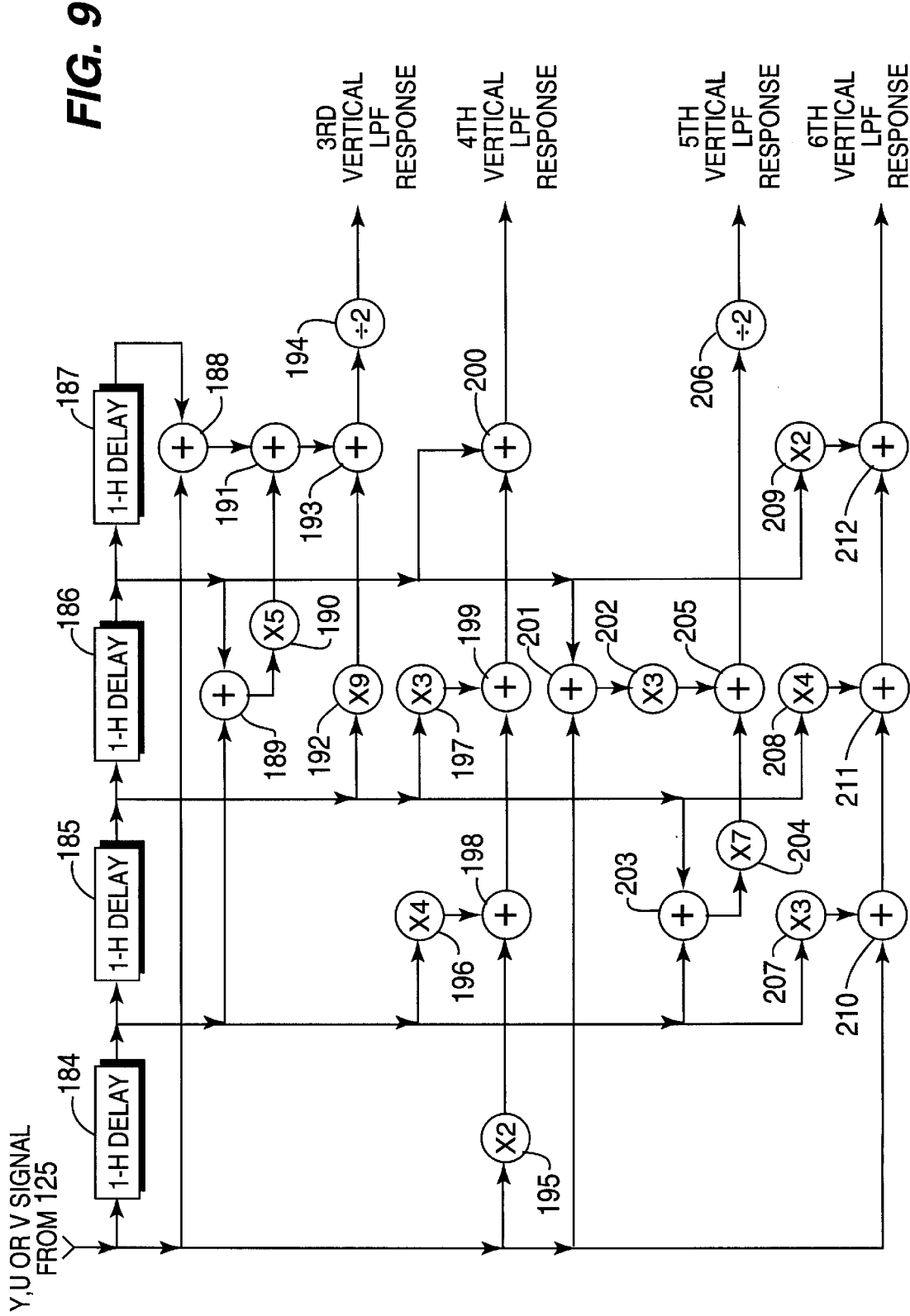
FIGS. 9 and 10 together are a block schematic diagram of one form of vertical scan conversion filter for HDTV signals having 1080 active scan lines per 1/30 second frame and employing field interlace, as can be used in a television receiver embodying the invention.
Figure 10:
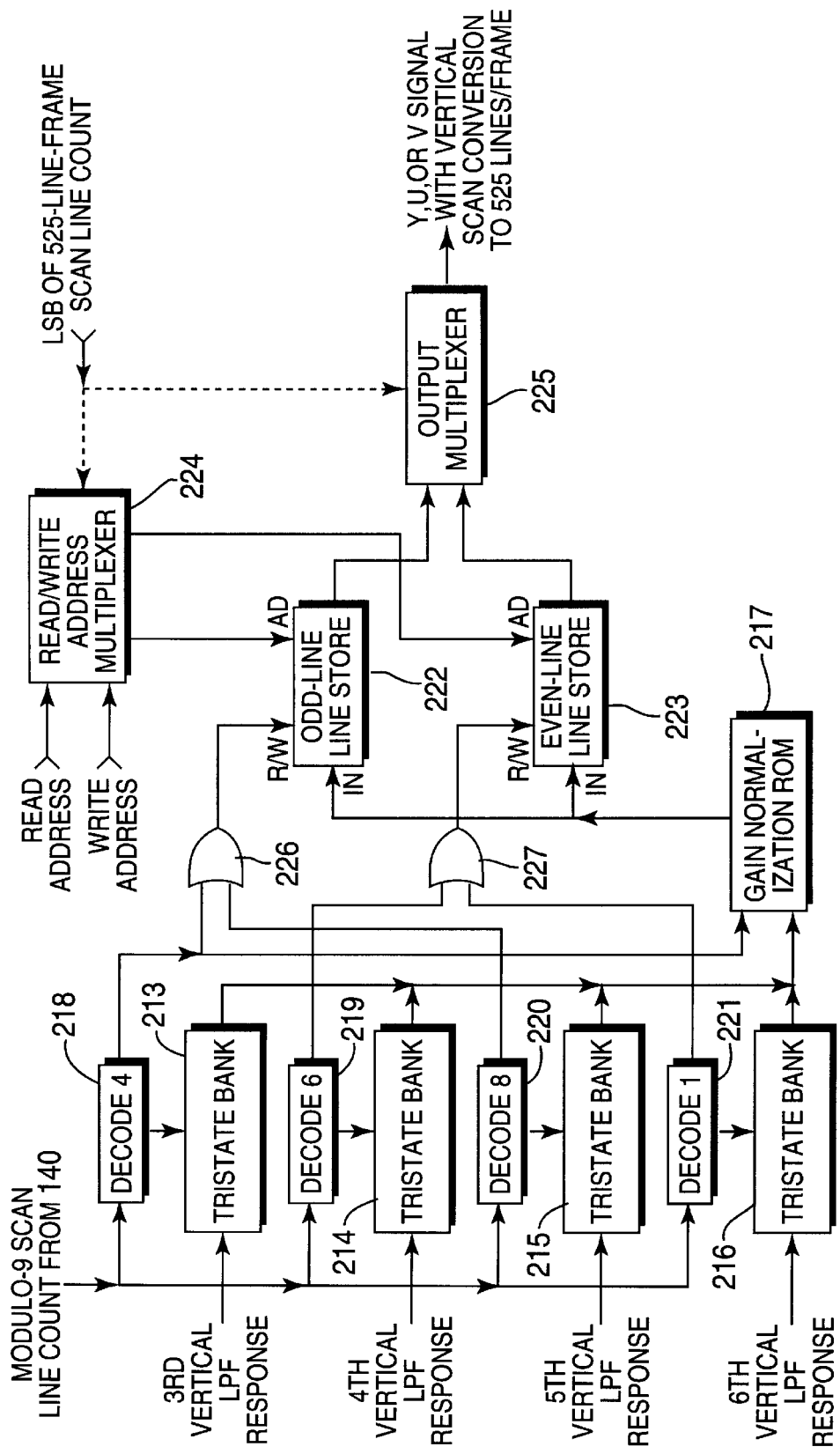

FIGS. 9 and 10 together show a representative vertical scan conversion filter for processing of the horizontally decimated Y, U or V signal having 1080 interlaced active lines per frame to suit that signal for raster scanning the 16:9-aspect-ratio display screen of a kinescope with interlaced 480 active lines per frame. The FIG. 6 set 127 of vertical scan conversion filters can include three of the FIGURE filters shown in FIGS. 9 and 10, which filters are alike, except that the clock rate for U and V signals is normally one-quarter of that for the Y signal. The 540 active lines in each ⅟₆₀th-second field of the digital HDTV signal are subsampled to 240 active lines for display. This means that, within each field, four scan lines of display are generated each nine lines of digital HDTV signal. There are differences in the spatial phasing of the nine scan lines of digital HDTV signal subsampled to form each of these four scan lines of display, so four finite-impulse-response transversal lowpass filters are required for vertical scan conversion of a field of digital HDTV signal. If the vertical retrace intervals inserted into the reading of the display buffer in the MPEG-2 video decoder 50 are properly designed, the same four FIR transversal lowpass filters can be used for vertical scan conversion during even-numbered fields of digital HDTV signal as during odd-numbered fields.

HDTV video signal having 1125 interlaced lines per frame, 1080 of which are active, has a time offset between each odd field and the succeeding even field equal to the duration of half a scan line, because of the interleaving of the HDTV lines. So, if the vertical retrace interval inserted into the reading of the display buffer in the MPEG-2 video decoder 50 is chosen to be 4.5 HDTV scan line intervals plus a multiple of nine HDTV scan line intervals, the vertical scan conversion can be performed with the same four FIR transversal lowpass filters in all fields. The twenty-two lines of vertical retrace in a 480-active-scan-lines-per-frame field-interlaced NTSC signal is of the same time duration as 49.5 lines of 1080-active-scan-lines-per-frame field-interlaced HDTV signal, which is 4.5 HDTV scan line intervals plus five times nine HDTV scan line intervals. The active scan lines in the raster defined by the output signals from the MPEG-2 video decoder 50 are presumed all to be full lines of video samples, rather than there being half lines of video samples at the conclusion of each odd field and at the beginning of each even field. So, MPEG-2 video decoder 50 display buffer clocking can be arranged to include a "vertical retrace interval" extending for fifty HDTV scan line periods between every odd field and the succeeding even field when 1080-active-scan-lines-per-frame field-interlaced HDTV signal is being regenerated. The MPEG-2 video decoder 50 display buffer clocking can further arranged to include a "vertical retrace interval" extending for forty-nine HDTV scan line periods between every even field and the succeeding odd field when field-interlaced 1080-active-scan-lines-per-frame HDTV signal is being regenerated. Insofar as the MPEG-2 video decoder 50 display buffer clocking is concerned, the field-interlaced 1080-active-scan-lines-per-frame HDTV signal as displayed has 1179 scan lines per frame. The time required for scanning this expanded raster is in accordance with the horizontal and vertical sweeps of the viewing screen 1331 of the kinescope 133. The vertical retrace interval for the field-interlaced 1080-active-scan-lines-per-frame HDTV signal is lengthened, better to correspond with the vertical retrace intervals of the field-interlaced 525-scan-lines-per-frame NTSC signal and of the progressive-scan 720-active-scan-lines-per-frame HDTV signal. This lengthening of the vertical retrace interval conserves appreciable vertical deflection power. The ratio of the number of scan lines during which vertical retrace occurs to the number of active lines per field during which vertical trace occurs is increased from 1:24 to about 45:480 (i.e., 1:12), essentially doubling the ratio. This can reduce vertical deflection power consumption about 4:1, presuming the vertical deflection system not to recover appreciable trace energy during retrace by resorting to resonance methods. (Such adjustment of the ratio of the number of scan lines during which vertical retrace occurs to the number of active lines per field during which vertical trace occurs advantageously conserves vertical deflection power consumption even when a kinescope is arranged to display more than 240 active lines per field.)

The four FIR transversal lowpass filters used for vertical scan conversion of field-interlaced 1080-active-scan-lines-per-frame HDTV signal will be invariably referred to as third, fourth, fifth and sixth FIR vertical lowpass filters in this specification and in the claims following this specification. This is done to promote definition and clarity, by avoiding the same elements being referred to by different ordinal numbers in the specification and various ones of the claims. In construing any claim following this specification, the use of first and second FIR vertical lowpass filters for vertical scan conversion of progressive 720-active-scan-lines-per-frame HDTV signal is not to be inferred from recitation of the third, fourth, fifth or sixth FIR vertical lowpass filter. Further, the component elements in these filters will be referred to by the same ordinal numbers throughout the specification and the claims. In construing any claim following this specification, no inference is to be drawn from this ordinal numbering that elements other than those specifically set forth in the claims are included in the combination being claimed.

According to FIG. 9 the third, fourth, fifth and sixth FIR vertical lowpass filters in the set 127 of vertical scan conversion filters share a common delay structure comprising cascaded FIFO linestores 184, 185, 186 and 187. Any one of these vertical scan conversion filters can be arranged to be supplied differentially delayed signals from its own respective delay structure, rather than from a shared delay structure, in various modifications of the set 127 of vertical scan conversion filters as specifically described with reference to FIG. 9.

The third vertical lowpass filter response additively combines the horizontally decimated Y, U or V signal supplied as response by one of the set 125 of decimation filters response and that response as delayed by one, two, three and four scan lines in ($1/21$):($5/21$):($9/21$):($5/21$): ($1/21$) ratio. Except for finally applying a normalizing factor of ($2/21$), which is done further on in the circuitry as part of an overall amplitude normalizing procedure using a look-up table (LUT) stored in a gain normalization ROM 217, this third vertical LPF is constructed as follows. A digital adder 186 additively combines the horizontally decimated response to Y, U or V signal and that horizontally decimated response as delayed by four scan lines in the cascaded FIFO linestores 184–187. A digital adder 187 additively combines the horizontally decimated response to Y, U or V signal as delayed by one scan line in the FIFO linestore 184 and that horizontally decimated response as delayed by three scan lines in the cascaded FIFO linestores 184–186, and the resulting sum is multiplied by five in a digital multiplier 190. A digital adder 191 additively combines the sum generated by the adder 188 and the product generated by the multiplier 190. The horizontally decimated response to Y, U or V signal as delayed by two scan lines in the cascaded FIFO linestores 184 and 185 is multiplied by nine in a digital multiplier 192.which can be provided by a wired two-bit place shift. A digital adder 193 additively combines the sum generated by the adder 191 and the product generated by the multiplier 192. The sum from the adder 193 is halved in a digital divider 194, which can be provided by a wired single-bit place shift, to normalize the gain of the third filter response as thusfar derived and subsequently applied to the gain normalization ROM 217 to more closely approximate the gains of the fourth, fifth and sixth filter responses as supplied to the gain normalization ROM 217. As one skilled in the art of digital filter design will appreciate, the latencies associated with the multipliers 190 and 191 and with the adders 188, 189, 191 and 193 can be compensated for by adjusting the times for reading from the FIFO linestore FIFO linestores 184–186 and by inserting shimming delay elements.

The fourth vertical lowpass filter response additively combines the horizontally decimated Y, U or V signal supplied as response by one of the set 125 of decimation filters response and that response as delayed by one, two, and three scan lines in (⅕):(⅖):(³⁄₁₀):(¹⁄₁₀) ratio. Except for finally applying a normalizing factor of (¹⁄₁₀), which is done further on in the FIG. 10 circuitry as part of an overall amplitude normalizing procedure using a LUT stored in the ROM 217, this fourth FIR LPF response is generated by elements 195–200 as follows. The horizontally decimated response to Y, U or V signal is multiplied by two in a digital multiplier 195, which can be provided by a wired single-bit place shift. The horizontally decimated response to Y, U or V signal as delayed by one scan line in FIFO linestore 184 is multiplied by four in a digital multiplier 196, which can be provided by a wired two-bit place shift. The horizontally decimated response to Y, U or V signal as delayed by two scan lines in FIFO linestores 184 and 185 is multiplied by three in a digital multiplier 197. The latency associated with such multiplication can be compensated for by arranging to read from the FIFO linestore 185 somewhat earlier in time. The horizontally decimated response to Y, U or V signal as delayed by three scan lines in FIFO linestores 184–186 is additively combined with the products from the digital multipliers 195–197 to generate the fourth vertical LPF response. FIG. 8 shows this additive combination being done using a digital adder 198 to add the products from the multipliers 195 and 196, a digital adder 199 to add the sum from the digital adder 198 with the product from the multiplier 197, and a digital adder 200 to add the sum from the digital adder 1199 with the response of FIFO linestore 186.

The fifth vertical lowpass filter response additively combines the horizontally decimated Y, U or V signal supplied as response by one of the set 125 of decimation filters response and that response as delayed by one, two, and three scan lines in (³⁄₁₀):(⁷⁄₁₀):(⁷⁄₁₀):(³⁄₁₀) ratio. Except for finally applying a normalizing factor of (¹⁄₁₀), which is done further on in the FIG. 10 circuitry as part of an overall amplitude normalizing procedure using a LUT stored in the ROM 217, this fifth vertical LPF response is generated by elements 201–206 as follows. A digital adder 201 additively combines the horizontally decimated response to Y, U or V signal and that horizontally decimated response as delayed by three scan lines in the cascaded FIFO linestores 184–186, and the resulting sum is multiplied by three in a digital multiplier 202. A digital adder 203 additively combines the horizontally decimated response to Y, U or V signal as delayed by one scan line in the FIFO linestore 184 and that horizontally decimated response as delayed by two scan lines in the cascaded FIFO linestores 184 and 185, and the resulting sum is multiplied by seven in a digital multiplier 204. A digital adder 205 additively combines the respective products generated by the multipliers 202 and 204. The sum from the adder 205 is halved in a digital divider 206, which can be provided by a wired single-bit place shift, to normalize the gain of the fifth filter response as thusfar derived and subsequently applied to the gain normalization ROM 217 to be the same as the gains of the fourth and sixth filter responses as supplied to the gain normalization ROM 217. As one skilled in the art of digital filter design will appreciate, the latencies associated with the multipliers 202 and 204 and with the adders 201, 203 and 205 can be compensated for by adjusting the times for reading from the FIFO linestore FIFO linestores 184–185 and by inserting shimming delay elements.

The sixth vertical lowpass filter response additively combines the horizontally decimated Y, U or V signal supplied as response by one of the set 125 of decimation filters response and that response as delayed by one, two, and three scan lines in (¹⁄₁₀):(³⁄₁₀):(⅖):(⅕) ratio. Except for finally applying a normalizing factor of (¹⁄₁₀), which is done further on in the FIG. 10 circuitry as part of an overall amplitude normalizing procedure using a LUT stored in the ROM 217, this sixth vertical LPF response is generated by elements 207–212 as follows. The horizontally decimated response to Y, U or V signal as delayed by one scan line in FIFO linestore 184 is multiplied by three in a digital multiplier 207. The horizontally decimated response to Y, U or V signal as delayed by two scan lines in FIFO linestores 184 and 185 is multiplied by four in a digital multiplier 208. The horizontally decimated response to Y, U or V signal as delayed by three scan lines in FIFO linestores 184–186 is multiplied by two in a digital multiplier 209. The horizontally decimated response to Y, U or V signal is additively combined with the products from the digital multipliers 207–209 to generate the sixth vertical LPF response. FIG. 8 shows this additive combination being done using a digital adder 210 to add the horizontally decimated response to Y, U or V signal to the product from the multiplier 207, a digital adder 211 to add the sum from the adder 210 with the product from the multiplier 208, and a digital adder 212 to add the sum from the adder 210 with the product from the multiplier 209.

FIG. 10 shows banks 213, 214, 215 and 216 of tristates that form a 4:1 multiplexer that selectively applies to the ROM 217 as a first part of its input addressing the bits of one of the third, fourth, fifth and sixth vertical LPF responses from relatively low source impedances. A decoder 218 supplies a single bit as a second part of the ROM 217 input addressing. The ROM 217 stores a first look-up table (LUT) for final normalization of the gain of the third vertical LPF response and a second LUT for final normalization of the gains of the fourth, fifth and sixth vertical LPF responses. The decoder 218 decodes the modulo-9 scan line count from the FIG. 6 scan line counter circuitry 140 being four to generate a ONE as its decoder response, which conditions the bank 213 of tristates to apply the bits of the third vertical LPF response from relatively low source impedances to the ROM 217 as the first part of its input addressing. The decoder 218 response completes the input addressing of the ROM 217, selecting the first LUT for gain normalization of the third vertical LPF response when it is being selected by the bank 213 of tristates as the first part of the ROM 217 input addressing. When the modulo-9 scan line count from the FIG. 6 scan line counter circuitry 140 is other than four, the decoder 218 response is a ZERO, which ZERO conditions the bank 213 of tristates to apply the bits of the third vertical LPF response from relatively high source impedances to the ROM 217 as part of its input addressing. This ZERO applied to the ROM 217 selects the second LUT for gain normalization of the first part of the ROM 217 input addressing to generate the ROM 217 output signal.

A decoder 219 decodes the modulo-9 scan line count from the FIG. 6 scan line counter circuitry 140 being six to generate a ONE as its decoder response, which conditions the bank 214 of tristates to apply the bits of the fourth vertical LPF response from relatively low source impedances to the ROM 217 as the first part of its input addressing. When the modulo-9 scan line count from the FIG. 6 scan line counter circuitry 140 is other than six, the decoder 219 response is a ZERO, which conditions the bank 214 of tristates to apply the bits of the fourth vertical LPF response from relatively high source impedances to the ROM 217.

A decoder 220 decodes the modulo-9 scan line count from the FIG. 6 scan line counter circuitry 140 being eight to generate a ONE as its decoder response, which conditions the bank 215 of tristates to apply the bits of the fifth vertical LPF response from relatively low source impedances to the ROM 217 as the first part of its input addressing. When the modulo-9 scan line count from the FIG. 6 scan line counter circuitry 140 is other than eight, the decoder 220 response is a ZERO, which conditions the bank 215 of tristates to apply the bits of the fifth vertical LPF response from relatively high source impedances to the ROM 217.

A decoder 221 decodes the modulo-9 scan line count from the FIG. 6 scan line counter circuitry 140 being one to generate a ONE as its decoder response, which conditions the bank 216 of tristates to apply the bits of the sixth vertical LPF response from relatively low source impedances to the ROM 217 as the first part of its input addressing. When the modulo-9 scan line count from the FIG. 6 scan line counter circuitry 140 is other than one, the decoder 221 response is a ZERO, which conditions the bank 216 of tristates to apply the bits of the sixth vertical LPF response from relatively high source impedances to the ROM 217.

The ROM 217 responds to the first part of each binary-number input address supplied thereto with a binary number proportional thereto that is supplied as write input to an odd-line linestore memory 222 and to an even-line linestore memory 223.

This normalization by ROM 217 is a further part of the procedures followed to keep video intensity the same no matter whether NTSC, VSB or QAM video signals are being displayed on the kinescope display screen.

The least significant bit of scan line count for 525-interleaved-lines-per-frame display is supplied as control signal to a read/write address multiplexer 224 and to an output multiplexer 225. Responsive to that modulo-2 scan line count being a ONE, the multiplexer 224 applies the reduced-rate subsample-per-line count to the linestore memory 222 as read addressing and applies the subsample-per-line count to the linestore memory 223 as write addressing. Responsive to the modulo-2 scan line count being a ZERO, the multiplexer 224 applies the reduced-rate subsample-per-line count to the linestore memory 223 as read addressing and applies the subsample-per-line count to the linestore memory 222 as write addressing. Responsive to the modulo-2 scan line count being a ONE, the multiplexer 225 selects read-out from the linestore memory 222 as the output signal from the vertical scan conversion filter of FIGS. 9 and 10. Responsive to the modulo-2 scan line count being a ZERO, the multiplexer 225 selects read-out from the linestore memory 223 as the output signal from the vertical scan conversion filter of FIGS. 9 and 10.

The response of an OR gate 226 is applied to the linestore memory 222 as its read/write command. The linestore memory 222 is conditioned to be written by output signal from the gain-normalization ROM 217 when and only when the OR gate 226 response is ONE. The OR gate 226 response is ONE when the decoder 218 response is a ONE, indicative of the selection of the third vertical LPF response to the ROM 217 as the first part of its input addressing. The OR gate 226 response is also ONE when the decoder 220 response is a ONE, indicative of the selection of the fifth vertical LPF response to the ROM 217 as the first part of its input addressing. Otherwise, the OR gate 226 response is a ZERO, and the linestore memory 222 is conditioned for being read from.

The response of an OR gate 227 is applied to the linestore memory 223 as its read/write command. The linestore memory 223 is conditioned to be written by output signal from the gain-normalization ROM 217 when and only when the OR gate 227 response is ONE. The OR gate 227 response is ONE when the decoder 219 response is a ONE, indicative of the selection of the fourth vertical LPF response to the ROM 217 as the first part of its input addressing. The OR gate 227 response is also ONE when the decoder 221 response is a ONE, indicative of the selection of the sixth vertical LPF response to the ROM 217 as the first part of its input addressing. Otherwise, the OR gate 227 response is a ZERO, and the linestore memory 223 is conditioned for being read from.

One skilled in the art of digital filter design will appreciate that the commutative and associative properties of addition and multiplication permit a number of alternative configurations for carrying out the weighted summation procedures used to generate the third, fourth, fifth and sixth vertical lowpass filter responses. Equivalent digital filters are readily generated using known digital filter design procedures. The order of performing addition and multiplication operations are preferably chosen for minimizing latency and for avoiding shimming delay inasmuch as possible. One skilled in the art of digital design will also understand that certain of the operations such as multiplication by numbers that are not integral powers of two may be implemented using ROM rather than digital multipliers using shift-and-add construction, which reduces the latencies associated with such multiplications. Alternatively, the samples of HDTV video signal used to generate the sixth vertical LPF response can be taken from the cascaded linestore memories 184–187 a scan line later in time, taking the weighted summation of scan lines from the output connections of linestore memories 185–187 rather than the output connections of linestore memories 184–186, and the decoder 221 can be modified to generate a ONE when the modulo-9 scan line count is two, rather than one. The HDTV scan line counts associated with vertical retrace intervals can be altered slightly, which will affect the modulo-9 HDTV scan line counts decoded by the decoders 218–221; these are minor design variations within the knowledge of digital television engineers of ordinary skill to make, and this should be taken into account when construing the scope of the claims following this specification.

Figure 11:
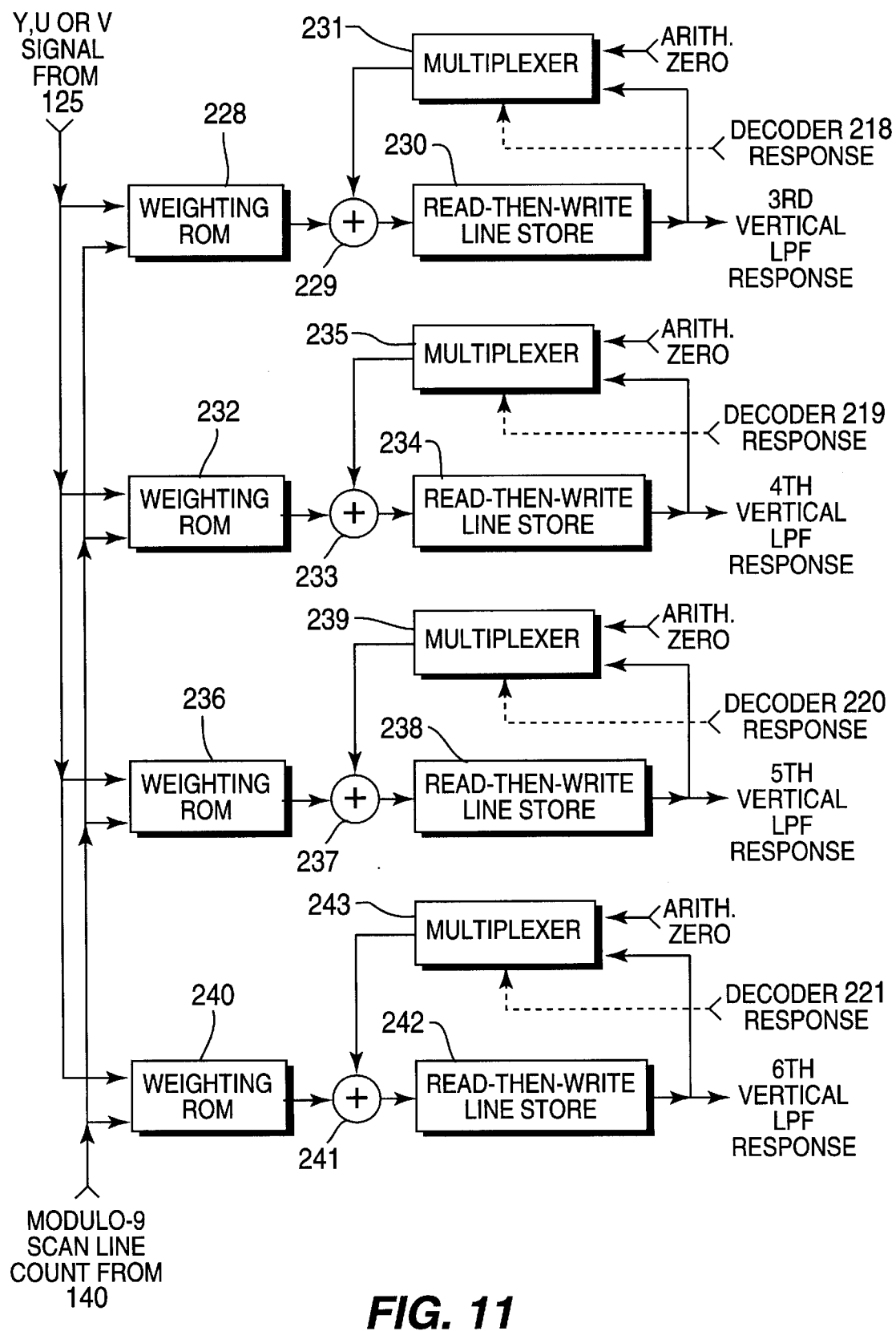
FIG. 11 is a block schematic diagram of a modification to replace the FIG. 9 digital circuitry in an alternative form of vertical scan conversion filter for HDTV signals having 1080 active scan lines per 1/30 second frame and employing field interlace, as can be used in a television receiver embodying the invention.

FIG. 11 shows a modification of the vertical scan conversion filter shown in FIGS. 9 and 10 for HDTV signals having 1080 active scan lines per ⅓₀ second frame and employing field interlace. The vertical lowpass filters of FIG. 9, which weight output signals read from cascaded FIFO linestores are replaced in FIG. 11 by vertical lowpass filters which weight input signals written into linestores operated as accumulators.

The horizontally decimated response to Y, U or V signal from one of the FIG. 6 set 125 of horizontal decimation filters and the modulo-9 scan line count from the FIG. 6 scan line counter circuitry 140 are used to address a read-only memory 228 that weights each of the 540-active-lines-per-field scan lines for inclusion in the third vertical LPF response. The weighted samples of this 540-active-lines-per-field scan line are supplied as first summands to a digital adder 229 that supplies its sum output samples for writing a linestore memory 230, which is arranged for read-and-then-write-over operation. The read-out from the linestore memory 230 is applied as a first input signal to a two-input multiplexer 231, which receives a wired arithmetic zero as its second input signal. The samples of the multiplexer 231 output signal are applied to the digital adder 229 as second summands. The multiplexer 231 receives the decoder 218 response as its control signal. Except when the decoder 218 response is ONE, the multiplexer 231 reproduces in its output signal the read-out from the linestore memory 230, so the linestore memory 230, adder 229 and multiplexer 231 operate to accumulate successive lines of weighted samples supplied from the ROM 228. When the decoder 218 response is ONE, the multiplexer 231 reproduces in its output signal the wired arithmetic zero, so accumulation starts over.

The horizontally decimated response to Y, U or V signal from one of the FIG. 6 set 125 of horizontal decimation filters and the modulo-9 scan line count from the FIG. 6 scan line counter circuitry 140 are used to address a read-only memory 232 that weights each of the 540-active-lines-per-field scan lines for inclusion in the fourth vertical LPF response. The weighted samples of this 540-active-lines-per-field scan line are supplied as first summands to a digital adder 233 that supplies its sum output samples for writing a linestore memory 234, which is arranged for read-and-then-write-over operation. The read-out from the linestore memory 234 is applied as a first input signal to a two-input multiplexer 235, which receives a wired arithmetic zero as its second input signal. The samples of the multiplexer 235 output signal are applied to the digital adder 233 as second summands. The multiplexer 235 receives the decoder 219 response as its control signal. Except when the decoder 219 response is ONE, the multiplexer 235 reproduces in its output signal the read-out from the linestore memory 234, so the linestore memory 234, adder 233 and multiplexer 235 operate to accumulate successive lines of weighted samples supplied from the ROM 232. When the decoder 219 response is ONE, the multiplexer 235 reproduces in its output signal the wired arithmetic zero, so accumulation starts over.

The horizontally decimated response to Y, U or V signal from one of the FIG. 6 set 125 of horizontal decimation filters and the modulo-9 scan line count from the FIG. 6 scan line counter circuitry 140 are used to address a read-only memory 236 that weights each of the 540-active-lines-per-field scan lines for inclusion in the fifth vertical LPF response. The weighted samples of this 540-active-lines-per-field scan line are supplied as first summands to a digital adder 237 that supplies its sum output samples for writing a linestore memory 238, which is arranged for read-and-then-write-over operation. The read-out from the linestore memory 238 is applied as a first input signal to a two-input multiplexer 239, which receives a wired arithmetic zero as its second input signal. The samples of the multiplexer 239 output signal are applied to the digital adder 237 as second summands. The multiplexer 239 receives the decoder 220 response as its control signal. Except when the decoder 220 response is ONE, the multiplexer 239 reproduces in its output signal the read-out from the linestore memory 238, so the linestore memory 238, adder 237 and multiplexer 239 operate to accumulate successive lines of weighted samples supplied from the ROM 236. When the decoder 220 response is ONE, the multiplexer 239 reproduces in its output signal the wired arithmetic zero, so accumulation starts over.

The horizontally decimated response to Y, U or V signal from one of the FIG. 6 set 125 of horizontal decimation filters and the modulo-9 scan line count from the FIG. 6 scan line counter circuitry 140 are used to address a read-only memory 240 that weights each of the 540-active-lines-per-field scan lines for inclusion in the sixth vertical LPF response. The weighted samples of this 540-active-lines-per-field scan line are supplied as first summands to a digital adder 241 that supplies its sum output samples for writing a linestore memory 242, which is arranged for read-and-then-write-over operation. The read-out from the linestore memory 242 is applied as a first input signal to a two-input multiplexer 243, which receives a wired arithmetic zero as its second input signal. The samples of the multiplexer 243 output signal are applied to the digital adder 241 as second summands. The multiplexer 243 receives the decoder 221 response as its control signal. Except when the decoder 221 response is ONE, the multiplexer 243 reproduces in its output signal the read-out from the linestore memory 242, so the linestore memory 242, adder 241 and multiplexer 243 operate to accumulate successive lines of weighted samples supplied from the ROM 240. When the decoder 221 response is ONE, the multiplexer 243 reproduces in its output signal the wired arithmetic zero, so accumulation starts over.

In a further modification of the vertical scan conversion filter shown in FIGS. 11 and 10, the weighting in the weighting ROM 228 can be scaled to allow for the gain-normalization ROM 217 being modified, so as to store only a single gain-normalization LUT, and so as to have its input addressing shortened to eliminate the bit from the decoder 218. The use of non-integral weights in the output signal from the weighting ROM 228 increases the bit width of the signals processed by elements 229–231, however. In other modifications of the vertical scan conversion filters for field-interlaced 1080-active-scan-lines-per-frame signals that have been already described, the slightly higher gain for third vertical LPF response may be accepted as a shortcoming not requiring correction, with the gain-normalization ROM 217 being modified so as to store only a single gain-normalization LUT and so as to have its input addressing shortened to eliminate the bit from the decoder 218.

Figure 12:
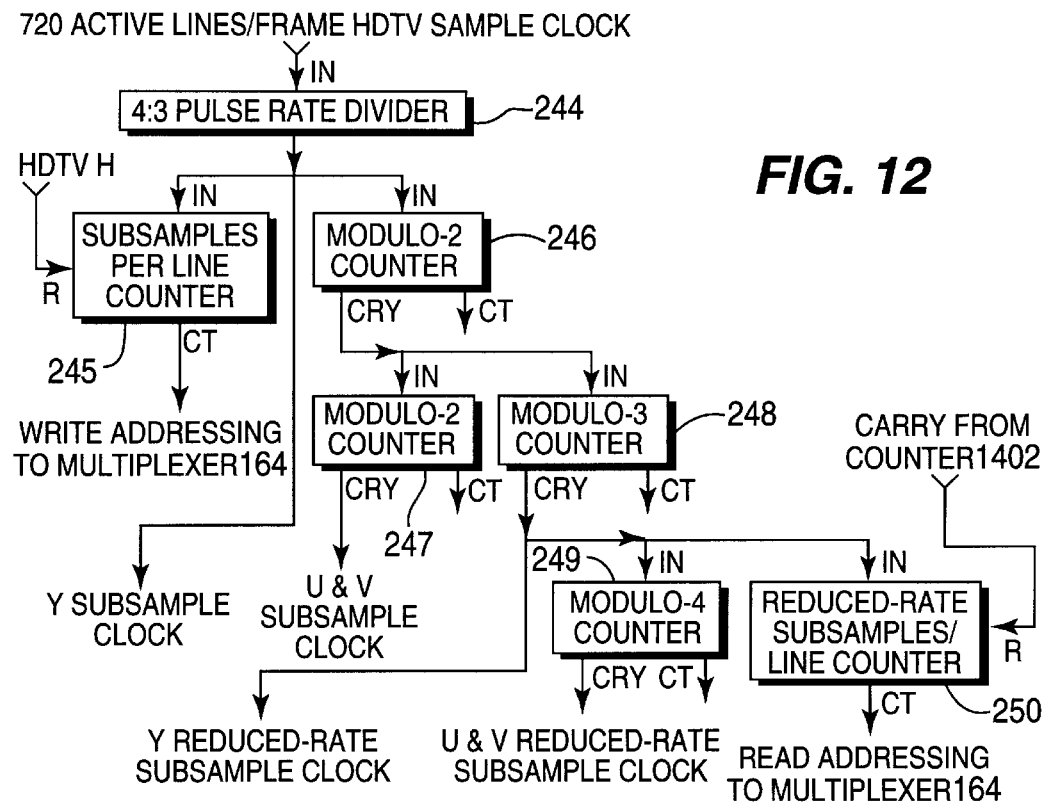
FIG. 12 is a block schematic diagram of clocking circuitry for vertical scan conversion filters as shown in FIG. 7 or in FIG. 8.

FIG. 12 shows representative clocking circuitry for vertical scan conversion filters as shown in FIG. 7 or in FIG. 8. The 720 active lines per one-sixtieth second progressive-scan frame sample clock used for display buffer memory in the MPEG-2 video decoder 50 is supplied to a pulse rate divider 244 that generates the subsample clock for 720-active-lines-per-frame progressively-scanned Y signal. There are 1280 Y samples per line in the 720 active lines per one-sixtieth second progressive-scan frame standard that has been proposed. Therefore, a 4:3 decimation to 960 samples per scan line of 16:9 aspect-ratio Y signal corresponds to the 720 samples per scan line of 4:3-aspect-ratio Y signal in the 480 active line per one-thirtieth second field-interlaced frame standard that has been proposed.

These carries are also counter input to counters 245 and 246. The counter 245, which is periodically reset by HDTV horizontal synchronizing pulses, counts the number of subsample clocks for 720-active-lines-per-frame progressively-scanned Y signal that occur in each HDTV scan line. Count from the counter 245 is supplied to the FIG. 7 (or 8) read/write address multiplexer 164 as write addressing for the FIG. 7 (or 8) odd-line and even-line linestore memories 161 and 160.

The counter 246 counts the counter 244 carries modulo-2 to generate its own carries, which are counter input to a modulo-2 counter 247 and to a modulo-3 counter 248. The carries from the modulo-2 counter 247 are used as the subsample clock for 720-active-lines-per-frame progressively-scanned U and V signals.

The carries from the modulo-3 counter 248 are supplied to the FIG. 6 DAC clock selection circuitry 130 as the reduced-rate subsample clock for 720-active-lines-per-frame progressively-scanned Y signal, which reduced-rate subsample clock is. The carries from the modulo-3 counter 248 are also counter input for a modulo-4 counter 249. The carries from the counter 249 are supplied to the FIG. 6 DAC clock selection circuitry 130 as the reduced-rate subsample clock for 720-active-lines-per-frame progressively-scanned U and V signals. These reduced-rate subsample clocks are preferably applied to respective pulse stretching circuitry (not shown) to permit operating speed requirements on the FIG. 6 digital-to-analog conversion circuitry 129 being eased.

The carries from the modulo-3 counter 248 are counted by a counter 250, which is periodically reset every six lines of HDTV raster scan by carries from the FIG. 6 counter 1402. Accordingly, the counter 250 counts the number of subsamples in one line of 480 active-lines-per-frame raster scan. Count from the counter 250 is supplied to the FIG. 7 (or 8) read/write address multiplexer 164 as read addressing for the FIG. 7 (or 8) odd-line and even-line linestore memories 161 and 160.

Figure 13:
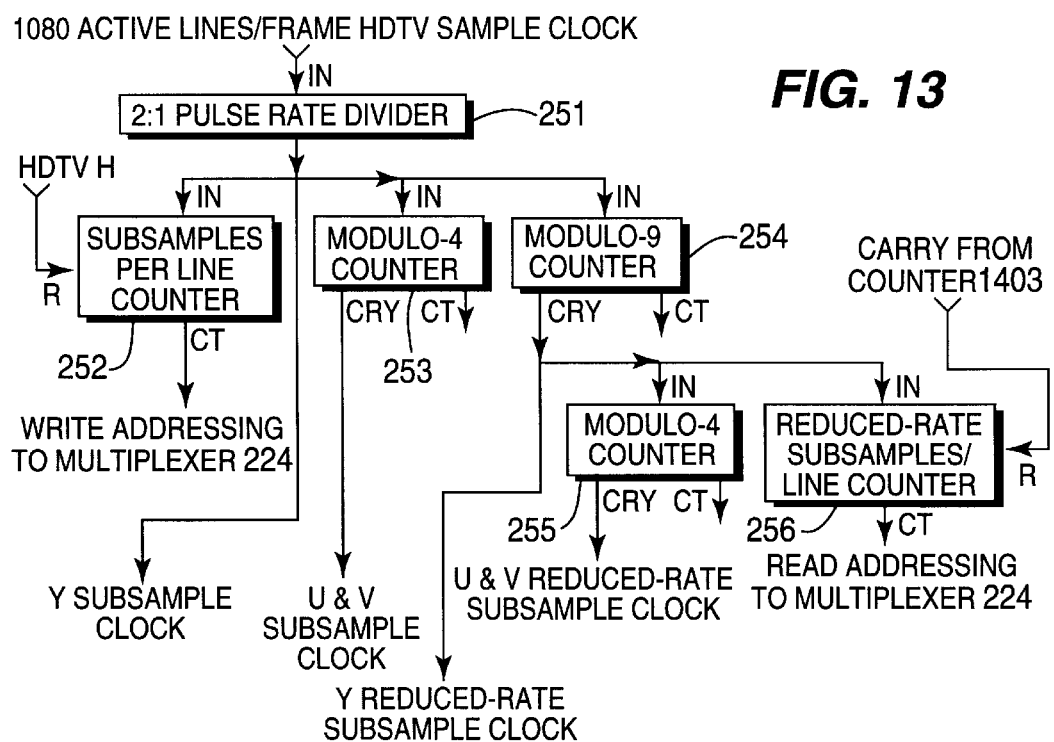
FIG. 13 is a block schematic diagram of clocking circuitry for vertical scan conversion filters as shown in FIGS. 9 and 10, or as shown in FIGS. 11 and 9.

FIG. 13 shows representative clocking circuitry for vertical scan conversion filters as shown in FIGS. 9 and 10 or in FIGS. 11 and 10. The 1080 active line per one-thirtieth second field-interlaced frame sample clock used for display buffer memory in the MPEG-2 video decoder 50 is supplied to a pulse rate divider 251 that generates the subsample clock for the field-interlaced 1080-active-lines-per-frame Y signal. There are 1920 Y samples per line in the 1080 active line per one-thirtieth second field-interlaced frame standard that has been proposed. Therefore, a 2:1 decimation to 960 samples per scan line of 16:9-aspect-ratio Y signal corresponds to the 720 samples per scan line of 4:3-aspect-ratio Y signal in the 480 active line per one-thirtieth second field-interlaced frame standard that has been proposed. This means that the pulse rate divider 251 can simply comprise a modulo-2 counter for receiving the sample clock rate from the MPEG-2 video decoder 50 as counter input and supplying output carries at half sample clock rate to generate the Y subsample clock.

The half sample clocks from the pulse rate divider 251 are also counter input to counters 252, 253 and 254. The counter 252, which is periodically reset by HDTV horizontal synchronizing pulses, counts the number of subsample clocks for field-interlaced 1080-active-lines-per-frame Y signal that occur in each HDTV scan line. Count from the counter 252 is supplied to supplied to the FIG. 10 read/write address multiplexer 197 as write addressing for the FIG. 10 odd-line and even-line linestore memories 195 and 196.

The counter 253 counts the half sample clocks from the pulse rate divider 251 modulo-4. The carries from the counter 253 are used as the subsample clock for used as the subsample clock for field-interlaced 1080-active-lines-per-frame U and V signals.

The counter 254 counts the half sample clocks from the pulse rate divider 251 modulo-9. The carries from the counter 254 are supplied to the FIG. 6 DAC clock selection circuitry 130 as the reduced-rate subsample clock for field-interlaced 1080-active-lines-per-frame Y signal. A counter 255 counts the counter 254 carries modulo-4 to generate its own carries, which are supplied to the FIG. 6 DAC clock selection circuitry 130 as the reduced-rate subsample clock for 1080-active-lines-per-frame field-interlaced U and V signals. These reduced-rate subsample clocks are preferably applied to respective pulse stretching circuitry (not shown) to permit operating speed requirements on the FIG. 6 digital-to-analog conversion circuitry 129 being eased.

The carries from the modulo-9 counter 254 are also counted by a counter 256, which is periodically reset every nine lines of HDTV raster scan by carries from the FIG. 6 counter 1403. Accordingly, the counter 256 counts the number of subsamples in one line of 480 active-lines-per-frame raster scan. Count from the counter 256 is supplied to the to supply the FIG. 10 read/write address multiplexer 197 read addressing for the FIG. 10 odd-line and even-line linestore memories 195 and 196.

Figure 14:
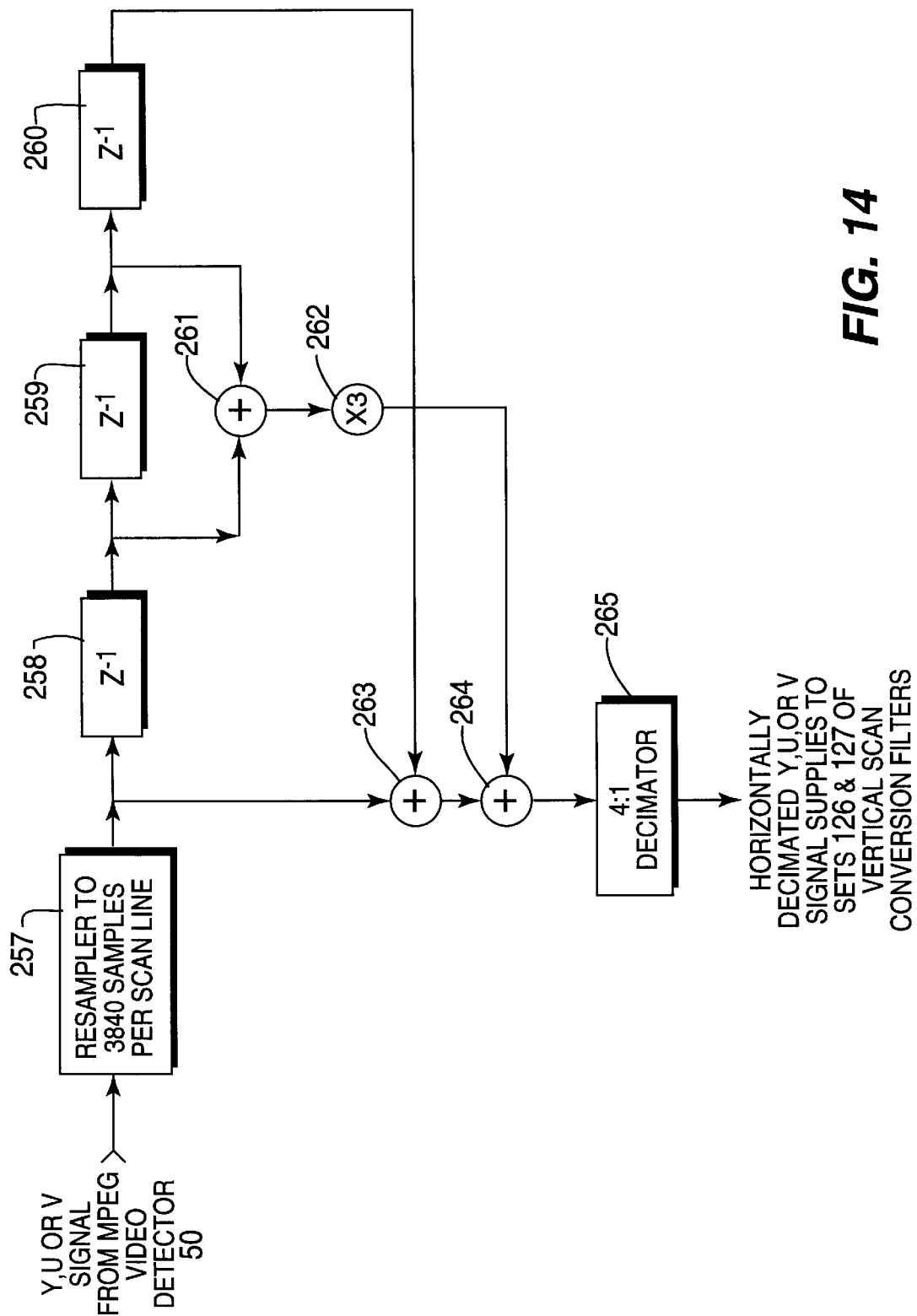
FIG. 14 is a block schematic diagram of a modification to the FIG. 6 circuitry that eliminates having to have separate horizontal decimation filters for HDTV signals having 720 active scan lines per 1/60 second frame with progressive scan and for HDTV signals having 1080 active scan lines per 1/30 second frame with field interlace.

FIG. 14 shows how to construct a horizontal decimation filter that generates 960 samples per line decimated response both for HDTV signals having 720 active scan lines per ⅟60 second frame with progressive scan and for HDTV signals having 1080 active scan lines per ⅟30 second frame with field interlace, which horizontal decimation filter can replace a pair of separate horizontal decimation filters in the FIG. 6 sets 124 and 125 of horizontal decimation filters. A Y, U or V signal is resampled to 3840 samples per HDTV scan line by resampling circuitry 257 in an oversampling procedure. That is, each sample of a Y signal for the 720 active scan lines per ⅟60 second frame with progressive scan is twice repeated in the resampling circuitry 257 output signal; and each sample of a U or V signal for that standard is eight times repeated, supposing its sample rate from the MPEG-2 video decoder 50 is one quarter that of Y signals. Each sample of a Y signal for the 720 active scan lines per ⅟60 second frame with progressive scan is thrice repeated in the resampling circuitry 257 output signal; and each sample of a U or V signal for that standard is twelve times repeated, supposing its sample rate from the MPEG-2 video decoder 50 to be one quarter that of Y signals. The resampling circuitry 257 output signal is then supplied to a 4:1 decimation filter to recover the decimated response. If a U or V signal is being decimated the output of the 4:1 decimation filter is preferably supplied to another 4:1 decimation filter to reduce its sampling rate to one-fourth that of the Y signal.

FIG. 14 shows the (earlier) 4:1 decimation filter as comprising a cascade of one-sample delay elements 258–260 as can be provided by respective clocked latches. The resampling circuitry 257 output signal, that signal as delayed one sample, that signal as delayed two samples and that signal as delayed three samples are weighted in 1:3:3:1 ratio and then summed. FIG. 14 shows this weighted summation being carried out, using a digital adder 261 to sum the resampling circuitry 257 output signal as delayed one sample by delay element 258 and as delayed two samples by cascaded delay elements 258 and 259, using a digital multiplier 262 to triple the sum from the digital adder 261, using a digital adder 263 to sum the resampling circuitry 257 output signal and that signal as delayed three samples by cascaded delay elements 258–260, and using a digital adder 264 to sum the sum output from the digital adder 261 with the product output from the digital multiplier 262 to supply the weighted summation as its sum output signal. The weighted summation is then supplied to a 4:1 decimator 265 for generating a horizontally decimated signal with 960 samples per HDTV scan line.

In other embodiments of the invention the sets 124 and 125 of horizontal decimation filters are not used before the sets 126 and 127 of vertical scan conversion filters, and the more densely sampled responses of the sets 126 and 127 of the vertical scan conversion filters are converted to analog signals by respective analog-to-digital converters operated at appropriate sampling rates. This better preserves edge definition and reduces need for horizontal peaking, but is more costly in terms of hardware.

In still further embodiments of the invention the FIG. 7 vertical scan conversion filter is modified to eliminate the need for the linestore memories 141–145 by banking the display buffer memory in the MPEG-2 video decoder 50 so that six consecutive scan lines of video signal samples can be read out concurrently in parallel data streams. And in yet further embodiments of the invention the vertical scan conversion filter shown in FIGS. 9 and 10 is modified to eliminate the need for the linestore memories 184–187 by banking the display buffer memory in the MPEG-2 video decoder 50 so that four consecutive scan lines of video signal samples can be read out concurrently in parallel data streams. It is somewhat cumbersome to implement both banking schemes, however, and the possibility of saving much digital hardware over vertical scan conversion filters as shown in FIG. 8 or in FIGS. 11 and 10 is dubious.

The scan conversions of received television transmissions to provide a 480-active-scan-line frame with field interlace and with a 16:9 aspect ratio have been described for the HDTV transmission standards currently proposed insofar as that information is publicly known and for the NTSC TV transmission standard. Other scan conversions of received television transmissions to provide a 480-active-scan-line frame with field interlace and with a 16:9 aspect ratio are possible and are within the contemplation of the inventor. For example, the time compression of each line of NTSC signal can be reduced during the NTSC transmission of widescreen movies.

This can be done pursuant to viewer control, but it is believed to be in the interest of the broadcaster to signal the transmission of such widescreen material (e.g., by a signal transmitted during vertical retrace interval) so that commercial advertising would appear in correct aspect ratio. As a further example, the digital transmission of normal-definition TV by digital methods is currently being contemplated in the television industry.

The vertical scan converter filters that have been particularly described use linear interpolation. Cubic or higher order interpolation functions can alternatively be used. The vertical scan converter filters that have been particularly described presume that the MPEG-2 video decoder 50 is arranged to supply the two digital color difference signals (U, V) in respective rasters each with the same number of scan lines as in the raster of the digital luminance signal (Y) the decoder 50 also supplies. The MPEG-2 video decoder 50 is usually constructed to supply U and V each with the same number of scan lines as Y in their respective rasters by interpolating from rasters with fewer scan lines.

Where the MPEG-2 video decoder is especially designed for use with HDTV receivers having only 480 active lines in each frame of display, the vertical interpolation filters can be simplified merely to repeat U and V lines subsampled in the vertical direction, to generate the progressive-scan U and V signals with 720 active lines per field or the field-interlaced U and V signals with 540 active lines per field, with respective ones of the set 126 or 127 of vertical scan conversion filters thereafter being used to define vertical aperture for the U and V signals. In other embodiments of the invention, the scan conversion of the U and V lines subsampled in the vertical direction to 480 active lines in each frame of display can be carried out using vertical scan conversion filters with kernels that sample more sparsely than the vertical scan conversion filters used for luminance signals.

In the claims which follow, the word "said" is used whenever reference is made to an antecedent, and the word "the" is used for grammatical purposes other than to refer back to an antecedent. In construing any claim following this specification and describing a combination, the identification of an element by a higher ordinal number is not to be used as a basis for inferring the inclusion in the claimed combination of a similar element identified by a lower ordinal number. Ordinal numbering is solely for differentiating similar elements in the claims.

What is claimed is:

1. A television receiver comprising:

a kinescope, having a display screen with a 16:9 aspect ratio, having phosphors arranged on the back of said display screen with a dot pitch for displaying a 480 scan line frame, and having at least one electron gun for projecting a respective electron beam on the back of said display screen;

a respective kinescope drive amplifier for each said electron gun;

deflection circuitry for scanning each said electron beam across the back of said display screen of said kinescope in a raster scanning pattern with a 16:9 aspect ratio having substantially 240 active lines per field of a two-field frame with the scan lines of the two fields being interlaced with each other;

a tuner for receiving high-definition television signals;

high-definition television signal detection circuitry for detecting digitally encoded signals from the modulation of digital high-definition television signals received by said tuner;

high-definition television signal decoder circuitry for decoding the digitally encoded signals to supply raster-scanned video signals, for providing high-definition-television horizontal synchronizing pulses, and for providing high-definition-television vertical synchronizing pulses for application to said deflection circuitry to control the beginning of vertical scanning in said raster scanning pattern;

pulse rate divider circuitry for dividing the rate of said high-definition-television horizontal synchronizing pulses to generate rate-divided high-definition-television horizontal synchronizing pulses, occurring at substantially the same rate as normal-definition horizontal synchronizing pulses, for application to said deflection circuitry to control the beginning of horizontal scanning in said raster scanning pattern; and scan converter circuitry responsive to the video signals decoded by said high-definition television signal decoder circuitry to generate a respective scan-converted video signal for application to each said kinescope drive amplifier.

2. A television receiver as set forth in claim 1; wherein said high-definition television signal decoder circuitry is of a type for supplying indications of which of a plurality of digital television standards said received high-definition television signal was transmitted in accordance with; wherein said pulse rate divider circuitry is of a type for dividing the rate of said high-definition-television horizontal synchronizing pulses by one of a plurality of prescribed factors, as selected responsive to said indications of which of said plurality of digital television standards a received high-definition television signal was transmitted in accordance with, to generate said rate-divided high-definition-television horizontal synchronizing pulses; and wherein said high-definition-television scan converter circuitry includes:

a respective set of vertical scan conversion filters for each of said plurality of digital television standards; and selection circuitry, responsive to said indications of which of said plurality of digital television standards said received high-definition television signal was transmitted in accordance with, for selecting the responses from an appropriate one of said set of vertical scan conversion filters to implement the generation of said respective scan-converted video signal for application to each said kinescope drive amplifier.

3. A television receiver as set forth in claim 2, wherein each said vertical scan conversion filter is in cascade connection with a horizontal decimation filter for the same one of said plurality of digital television standards.

4. A television receiver as set forth in claim 1, wherein said high-definition television scan converter circuitry includes means for converting a prescribed one of said video signals decoded by said high-definition television signal decoder circuitry when progressive-scan digital high-definition television signals having 720 active lines per frame are decoded by said high-definition television signal decoder circuitry, which means comprises:

a counter for counting high-definition-television vertical synchronizing pulses modulo two to furnish indications of which frames of said progressive-scan digital high-definition television signals with 720 active lines per frame are to be used for controlling the energy of each said electron beam during odd fields in said raster scanning pattern and which of those frames are to be used for controlling the energy of each said electron beam during even fields in said raster scanning pattern;

a first odd-line linestore memory read from to generate input signal for a first said kinescope drive amplifier when odd lines of said raster scanning pattern are being scanned;

a first even-line linestore memory read from to generate input signal for said first kinescope drive amplifier when even lines of said raster scanning pattern are being scanned;

a first read/write address multiplexer, for applying read addresses at a first address rate to said first odd-line linestore memory and write addresses at a second address rate to said first even-line linestore memory when odd lines of said raster scanning pattern are being scanned, and for applying read addresses at said first address rate to said first even-line linestore memory and write addresses at said second address rate to said first odd-line linestore memory when even lines of said raster scanning pattern are being scanned, said second address rate being three times said first address rate;

a first vertical lowpass filter for generating, during odd fields in said raster scanning pattern, a first filter response to said prescribed video signal that is lowpass in at least the direction perpendicular to line scan, which said first filter response is written to said first odd-line linestore memory during the last third of each of said even lines of said odd fields of said raster scanning pattern being scanned and is written to said first even-line linestore memory during the last third of each of said odd lines of said odd fields of said raster scanning pattern being scanned; and a second vertical lowpass filter for generating, during even fields in said raster scanning pattern, a second filter response to said prescribed video signal that is lowpass in at least the direction perpendicular to line scan, which said second filter response is written to said first odd-line linestore memory during the last third of each of said even lines of said even fields of said raster scanning pattern being scanned and is written to said first even-line linestore memory during the last third of each of said odd lines of said even fields of said raster scanning pattern being scanned.

5. A television receiver as set forth in claim 4, wherein said first and second vertical lowpass filters together include:

first delay circuitry for delaying said progressive-scan digital high-definition television signals with 720 active lines per frame by one, two, three, four and five scan lines thereof;

first weighted summation circuitry for generating said first filter response as a weighted summation of said progressive-scan digital high-definition television signals with 720 active lines per frame and those said progressive-scan digital high-definition television signals as delayed by one, two, three, four and five scan lines thereof by said first delay circuitry; and second weighted summation circuitry for generating said second filter response as a weighted summation of said progressive-scan digital high-definition television signals with 720 active lines per frame and those said progressive-scan digital high-definition television signals as delayed by one, two, three, and four scan lines thereof by said first delay circuitry.

6. A television receiver as set forth in claim 4, wherein said first vertical lowpass filter includes:

a first adder for combining respective first and second summand signals thereto for generating a respective sum output signal;

a first multiplexer having a first input for receiving arithmetic zero, having a second input, and having an output connected for supplying said first adder its respective first summand signal;

a first read-only memory weighting said prescribed video signal in accordance with a first of two vertically interleaving kernel patterns for odd fields of said raster scanning pattern and in accordance with a first of two vertically interleaving kernel patterns for even fields of said raster scanning pattern, for supplying said first adder its respective second summand input signal; and a first read-and-then-rewrite linestore memory, supplying its read-out to said first odd-line linestore memory for writing during the last third of each of said even lines of said raster scanning pattern being scanned, supplying its read-out to the second input of said first multiplexer for application to said first adder as its respective first summand signal except during the last third of each of said even lines of said raster scanning pattern being scanned, and being re-written by said respective sum output signal of said first adder.

7. A television receiver as set forth in claim 6, wherein said second vertical lowpass filter includes:

a second adder for combining respective first and second summand signals thereto for generating a respective sum output signal;

a second multiplexer having a first input for receiving arithmetic zero, having a second input, and having an output connected for supplying said second adder its respective first summand signal;

a second read-only memory weighting said prescribed video signal in accordance with a second of two vertically interleaving kernel patterns for odd fields of said raster scanning pattern and in accordance with a second of two vertically interleaving kernel patterns for even fields of said raster scanning pattern, for supplying said second adder its respective second summand input signal; and a second read-and-then-rewrite linestore memory, supplying its read-out to said first even-line linestore memory for writing during the last third of each of said odd lines of said raster scanning pattern being scanned, supplying its read-out to the second input of said second multiplexer for application to said second adder as its respective first summand signal except during the last third of each of said odd lines of said raster scanning pattern being scanned, and being re-written by said respective sum output signal of said second adder.

8. A television receiver as set forth in claim 7, wherein said high-definition television scan converter circuitry includes means for converting a prescribed one of said video signals decoded by said high-definition television signal decoder circuitry when field-interlaced digital high-definition television signals having 1080 active lines per frame are decoded by said high-definition television signal decoder circuitry, which means comprises:

a second odd-line linestore memory read from to generate input signal for a first said kinescope drive amplifier when odd lines of said raster scanning pattern are being scanned;

a second even-line linestore memory read from to generate input signal for said first kinescope drive amplifier when even lines of said raster scanning pattern are being scanned;

a second read/write address multiplexer, for applying read addresses at said first address rate to said second odd-line linestore memory and write addresses at a third address rate to said second even-line linestore memory when odd lines of said raster scanning pattern are being scanned, and for applying read addresses at said first address rate to said second even-line linestore memory and write addresses at said third address rate to said second odd-line linestore memory when even lines of said raster scanning pattern are being scanned, said third address rate being 9/4 times said first address rate;

a third vertical lowpass filter for generating a third filter response to said prescribed video signal that is lowpass in at least the direction perpendicular to line scan, which said third filter response is written to said second odd-line linestore memory during a fourth of each cycle of nine scan lines of said field-interlaced digital high-definition television signals with 1080 active lines per frame;

a fourth vertical lowpass filter for generating a fourth filter response to said prescribed video signal that is lowpass in at least the direction perpendicular to line scan, which said fourth filter response is written to said second even-line linestore memory during a sixth of each cycle of nine scan lines of said field-interlaced digital high-definition television signals with 1080 active lines per frame;

a fifth vertical lowpass filter for generating a fifth filter response to said prescribed video signal that is lowpass in at least the direction perpendicular to line scan, which said fifth filter response is written to said second odd-line linestore memory during an eighth of each cycle of nine scan lines of said field-interlaced digital high-definition television signals with 1080 active lines per frame; and a sixth vertical lowpass filter for generating a sixth filter response to said prescribed video signal that is lowpass in at least the direction perpendicular to line scan, which said sixth filter response is written to said second even-line linestore memory during a prescribed one of a first and a second of each cycle of nine scan lines of said field-interlaced digital high-definition television signals with 1080 active lines per frame.

9. A television receiver as set forth in claim 8, wherein said third, fourth, fifth and sixth vertical lowpass filters together include:

delay circuitry for delaying said field-interlaced digital high-definition television signals with 1080 active lines per frame by one, two, three and four of those field-interlaced scan lines;

third weighted summation circuitry for generating said third filter response as a weighted summation of said field-interlaced digital high-definition television signals with 1080 active lines per frame and those said field-interlaced digital high-definition television signals as delayed by one, two, three and four of those field-interlaced scan lines by said second delay circuitry;

fourth weighted summation circuitry for generating said fourth filter response as a weighted summation of said field-interlaced digital high-definition television signals with 1080 active lines per frame and those said field-interlaced digital high-definition television signals as delayed by one, two and three of those progressive-scan scan lines by said second delay circuitry;

fifth weighted summation circuitry for generating said fifth filter response as a weighted summation of said field-interlaced digital high-definition television signals with 1080 active lines per frame and those said field-interlaced digital high-definition television signals as delayed by one, two and three of those progressive-scan scan lines by said second delay circuitry; and sixth weighted summation circuitry for generating said sixth filter response as a weighted summation of said field-interlaced digital high-definition television signals with 1080 active lines per frame and those said field-interlaced digital high-definition television signals as delayed by one, two and three of those progressive-scan scan lines by said second delay circuitry.

10. A television receiver as set forth in claim 8, wherein said third vertical lowpass filter includes:

a third adder for combining respective first and second summand signals thereto for generating a respective sum output signal;

a third multiplexer having a first input for receiving arithmetic zero, having a second input, and having an output connected for supplying said third adder its respective first summand signal;

a third read-only memory weighting said prescribed video signal in accordance with a first of four kernel patterns, for supplying said third adder its respective second summand input signal; and a third read-and-then-rewrite linestore memory, supplying its read-out to said second odd-line linestore memory for writing during said fourth of each cycle of nine scan lines of said field-interlaced digital high-definition television signals with 1080 active lines per frame, supplying its read-out to the second input of said third multiplexer for application to said third adder as its respective first summand signal except during said fourth of each cycle of nine scan lines of said field-interlaced digital high-definition television signals with 1080 active lines per frame, and being re-written by said respective sum output signal of said third adder.

11. A television receiver as set forth in claim 8, wherein said fourth vertical lowpass filter includes:
- a fourth adder for combining respective first and second summand signals thereto for generating a respective sum output signal;
- a fourth multiplexer having a first input for receiving arithmetic zero, having a second input, and having an output connected for supplying said fourth adder its respective first summand signal;
- a fourth read-only memory weighting said prescribed video signal in accordance with a second of said four kernel patterns, for supplying said fourth adder its respective second summand input signal; and
- a fourth read-and-then-rewrite linestore memory, supplying its read-out to said second even-line linestore memory for writing during said sixth of each cycle of nine scan lines of said field-interlaced digital high-definition television signals with 1080 active lines per frame, supplying its read-out to the second input of said fourth multiplexer for application to said fourth adder as its respective first summand signal except during said sixth of each cycle of nine scan lines of said field-interlaced digital high-definition television signals with 1080 active lines per frame, and being re-written by said respective sum output signal of said fourth adder.

12. A television receiver as set forth in claim 8, wherein said fifth vertical lowpass filter includes:
- a fifth adder for combining respective first and second summand signals thereto for generating a respective sum output signal;
- a fifth multiplexer having a first input for receiving arithmetic zero, having a second input, and having an output connected for supplying said fifth adder its respective first summand signal;
- a fifth read-only memory weighting said prescribed video signal in accordance with a third of four kernel patterns, for supplying said fifth adder its respective second summand input signal; and
- a fifth read-and-then-rewrite linestore memory, supplying its read-out to said second odd-line linestore memory for writing during said eighth of each cycle of nine scan lines of said field-interlaced digital high-definition television signals with 1080 active lines per frame, supplying its read-out to the second input of said fifth multiplexer for application to said third adder as its respective first summand signal except during said eighth of each cycle of nine scan lines of said field-interlaced digital high-definition television signals with 1080 active lines per frame, and being re-written by said respective sum output signal of said fifth adder.

13. A television receiver as set forth in claim 8, wherein said sixth vertical lowpass filter includes:
- a sixth adder for combining respective first and second summand signals thereto for generating a respective sum output signal;
- a sixth multiplexer having a first input for receiving arithmetic zero, having a second input, and having an output connected for supplying said sixth adder its respective first summand signal;
- a sixth read-only memory weighting said prescribed video signal in accordance with a fourth of said four kernel patterns, for supplying said sixth adder its respective second summand input signal; and
- a sixth read-and-then-rewrite linestore memory, supplying its read-out to said second even-line linestore memory for writing during said prescribed one of the first and second lines of each cycle of nine scan lines of said field-interlaced digital high-definition television signals with 1080 active lines per frame, supplying its read-out to the second input of said sixth multiplexer for application to said sixth adder as its respective first summand signal except during said prescribed one of the first and second lines of each cycle of nine scan lines of said field-interlaced digital high-definition television signals with 1080 active lines per frame, and being re-written by said respective sum output signal of said sixth adder.

14. A television receiver as set forth in claim 4, wherein said high-definition television scan converter circuitry includes
- means for converting a prescribed one of said video signals decoded by said high-definition television signal decoder circuitry when progressive-scan digital high-definition television signals having 1080 active lines per frame are decoded by said high-definition television signal decoder circuitry, which means comprises:
  - a second odd-line linestore memory read from to generate input signal for a first said kinescope drive amplifier when odd lines of said raster scanning pattern are being scanned;
  - a second even-line linestore memory read from to generate input signal for said first kinescope drive amplifier when even lines of said raster scanning pattern are being scanned;
  - a second read/write address multiplexer, for applying read addresses at said first address rate to said second odd-line linestore memory and write addresses at a third address rate to said second even-line linestore memory when odd lines of said raster scanning pattern are being scanned, and for applying read addresses at said first address rate to said second even-line linestore memory and write addresses at said third address rate to said second odd-line linestore memory when even lines of said raster scanning pattern are being scanned, said third address rate being 9/4 times said first address rate;
  - a third vertical lowpass filter for generating a third filter response to said prescribed video signal that is lowpass in at least the direction perpendicular to line scan, which said third filter response is written to said second odd-line linestore memory during a fourth of each cycle of nine scan lines of said field-interlaced digital high-definition television signals with 1080 active lines per frame;
  - a fourth vertical lowpass filter for generating a fourth filter response to said prescribed video signal that is lowpass in at least the direction perpendicular to line scan, which said fourth filter response is written to said second even-line linestore memory during a sixth of each cycle of nine scan lines of said field-interlaced digital high-definition television signals with 1080 active lines per frame;
  - a fifth vertical lowpass filter for generating a fifth filter response to said prescribed video signal that is lowpass in at least the direction perpendicular to line scan, which said fifth filter response is written to said second odd-line linestore memory during an eighth of each cycle of nine scan lines of said field-interlaced digital high-definition television signals with 1080 active lines per frame; and a sixth vertical lowpass filter for generating a sixth filter response to said prescribed video signal that is lowpass in at least the direction perpendicular to line scan, which said sixth filter response is written to said second even-line linestore memory during a prescribed one of a first and a second of each cycle of nine scan lines of said field-interlaced digital high-definition television signals with 1080 active lines per frame.

15. A television receiver as set forth in claim 1, wherein said scan converter circuitry includes means for converting to 480 active lines per frame with field interlace a prescribed one of said video signals detected by said high-definition television signal detection circuitry when digital high-definition television signals with 1080 active lines per frame with field interlace are decoded by said high-definition television signal decoder circuitry, said means for converting comprising:

an odd-line linestore memory read from to generate input signal for a first said kinescope drive amplifier when odd lines of said raster scanning pattern are being scanned;

an even-line linestore memory read from to generate input signal for said first kinescope drive amplifier when even lines of said raster scanning pattern are being scanned;

a read/write address multiplexer, for applying read addresses at a first address rate to said odd-line linestore memory and write addresses at a second address rate to said even-line linestore memory when odd lines of said raster scanning pattern are being scanned, and for applying read addresses at said first address rate to said even-line linestore memory and write addresses at said second address rate to said odd-line linestore memory when even lines of said raster scanning pattern are being scanned, said second address rate being 9/4 times said first address rate;

a third vertical lowpass filter for generating a third filter response to said prescribed video signal that is lowpass in at least the direction perpendicular to line scan, which said third filter response is written to said second odd-line linestore memory during a fourth of each cycle of nine scan lines of said field-interlaced digital high-definition television signals with 1080 active lines per frame;

a fourth vertical lowpass filter for generating a fourth filter response to said prescribed video signal that is lowpass in at least the direction perpendicular to line scan, which said fourth filter response is written to said second even-line linestore memory during a sixth of each cycle of nine scan lines of said field-interlaced digital high-definition television signals with 1080 active lines per frame;

a fifth vertical lowpass filter for generating a fifth filter response to said prescribed video signal that is lowpass in at least the direction perpendicular to line scan, which said fifth filter response is written to said second odd-line linestore memory during an eighth of each cycle of nine scan lines of said field-interlaced digital high-definition television signals with 1080 active lines per frame; and a sixth vertical lowpass filter for generating a sixth filter response to said prescribed video signal that is lowpass in at least the direction perpendicular to line scan, which said sixth filter response is written to said second even-line linestore memory during a prescribed one of a first and a second of each cycle of nine scan lines of said field-interlaced digital high-definition television signals with 1080 active lines per frame.

16. A television receiver as set forth in claim 15, wherein said third, fourth, fifth and sixth vertical lowpass filters together include:

delay circuitry for delaying said field-interlaced digital high-definition television signals with 1080 active lines per frame by one, two, three and four of those field-interlaced scan lines;

third weighted summation circuitry for generating said third filter response as a weighted summation of said field-interlaced digital high-definition television signals with 1080 active lines per frame and those said field-interlaced digital high-definition television signals as delayed by one, two, three and four of those field-interlaced scan lines by said second delay circuitry;

fourth weighted summation circuitry for generating said fourth filter response as a weighted summation of said field-interlaced digital high-definition television signals with 1080 active lines per frame and those said field-interlaced digital high-definition television signals as delayed by one, two and three of those progressive-scan scan lines by said second delay circuitry;

fifth weighted summation circuitry for generating said fifth filter response as a weighted summation of said field-interlaced digital high-definition television signals with 1080 active lines per frame and those said field-interlaced digital high-definition television signals as delayed by one, two and three of those progressive-scan scan lines by said second delay circuitry; and sixth weighted summation circuitry for generating said sixth filter response as a weighted summation of said field-interlaced digital high-definition television signals with 1080 active lines per frame and those said field-interlaced digital high-definition television signals as delayed by one, two and three of those progressive-scan scan lines by said second delay circuitry.

17. A television receiver as set forth in claim 15, wherein said third vertical lowpass filter includes:

a third adder for combining respective first and second summand signals thereto for generating a respective sum output signal;

a third multiplexer having a first input for receiving arithmetic zero, having a second input, and having an output connected for supplying said third adder its respective first summand signal;

a third read-only memory weighting said prescribed video signal in accordance with a first of four kernel patterns, for supplying said third adder its respective second summand input signal; and a third read-and-then-rewrite linestore memory, supplying its read-out to said second odd-line linestore memory for writing during said fourth of each cycle of nine scan lines of said field-interlaced digital high-definition television signals with 1080 active lines per frame, supplying its read-out to the second input of said third multiplexer for application to said third adder as its respective first summand signal except during said fourth of each cycle of nine scan lines of field-interlaced digital high-definition television signals with 1080 active lines per frame, and being re-written by said respective sum output signal of said third adder.

18. A television receiver as set forth in claim 15, wherein said fourth vertical lowpass filter includes:
   a fourth adder for combining respective first and second summand signals thereto for generating a respective sum output signal;
   a fourth multiplexer having a first input for receiving arithmetic zero, having a second input, and having an output connected for supplying said fourth adder its respective first summand signal;
   a fourth read-only memory weighting said prescribed video signal in accordance with a second of said four kernel patterns, for supplying said fourth adder its respective second summand input signal; and
   a fourth read-and-then-rewrite linestore memory, supplying its read-out to said second even-line linestore memory for writing during said sixth of each cycle of nine scan lines of said field-interlaced digital high-definition television signals with 1080 active lines per frame, supplying its read-out to the second input of said fourth multiplexer for application to said fourth adder as its respective first summand signal except during said sixth of each cycle of nine scan lines of said field-interlaced digital high-definition television signals with 1080 active lines per frame, and being re-written by said respective sum output signal of said fourth adder.

19. A television receiver as set forth in claim 15, wherein said fifth vertical lowpass filter includes:
   a fifth adder for combining respective first and second summand signals thereto for generating a respective sum output signal;
   a fifth multiplexer having a first input for receiving arithmetic zero, having a second input, and having an output connected for supplying said fifth adder its respective first summand signal;
   a fifth read-only memory weighting said prescribed video signal in accordance with a third of four kernel patterns, for supplying said fifth adder its respective second summand input signal; and
   a fifth read-and-then-rewrite linestore memory, supplying its read-out to said second odd-line linestore memory for writing during said eighth of each cycle of nine scan lines of said field-interlaced digital high-definition television signals with 1080 active lines per frame, supplying its read-out to the second input of said fifth multiplexer for application to said third adder as its respective first summand signal except during said eighth of each cycle of nine scan lines of said field-interlaced digital high-definition television signals with 1080 active lines per frame, and being re-written by said respective sum output signal of said fifth adder.

20. A television receiver as set forth in claim 15, wherein said sixth vertical lowpass filter includes:
   a sixth adder for combining respective first and second summand signals thereto for generating a respective sum output signal;
   a sixth multiplexer having a first input for receiving arithmetic zero, having a second input, and having an output connected for supplying said sixth adder its respective first summand signal;
   a sixth read-only memory weighting said prescribed video signal in accordance with a fourth of said four kernel patterns, for supplying said sixth adder its respective second summand input signal; and
   a sixth read-and-then-rewrite linestore memory, supplying its read-out to said second even-line linestore memory for writing during said prescribed one of the first and second lines of each cycle of nine scan lines of said field-interlaced digital high-definition television signals with 1080 active lines per frame, supplying its read-out to the second input of said sixth multiplexer for application to said sixth adder as its respective first summand signal except during said prescribed one of the first and second lines of each cycle of nine scan lines of said field-interlaced digital high-definition television signals with 1080 active lines per frame, and being re-written by said respective sum output signal of said sixth adder.

21. A television receiver comprising:
   a kinescope, having a display screen with a 16:9 aspect ratio, having phosphors arranged on the back of said display screen with a dot pitch for displaying a 480 scan line frame, and having at least one electron gun for projecting a respective electron beam on the back of said display screen;
   a respective kinescope drive amplifier for each said electron gun;
   deflection circuitry for scanning each said electron beam across the back of said display screen of said kinescope in a raster scanning pattern with a 16:9 aspect ratio having substantially 240 active lines per field of a two-field frame with the scan lines of the two fields being interlaced with each other;
   a tuner for receiving high-definition television signals;
   high-definition television signal detection circuitry for detecting digitally encoded signals from the modulation of digital high-definition television signals received by said tuner;
   high-definition television signal decoder circuitry for decoding the digitally encoded signals to supply raster-scanned video signals, for providing high-definition-television horizontal synchronizing pulses, and for providing high-definition-television vertical synchronizing pulses for application to said deflection circuitry to control the beginning of vertical scanning in said raster scanning pattern;
   pulse rate divider circuitry for dividing the rate of said high-definition-television horizontal synchronizing pulses to generate rate-divided high-definition-television horizontal synchronizing pulses, occurring at substantially the same rate as normal-definition horizontal synchronizing pulses, for application to said deflection circuitry to control the beginning of horizontal scanning in said raster scanning pattern; and
   means responsive to the video signals decoded by said high-definition television signal decoder circuitry for generating a respective scan-converted video signal for application to each said kinescope drive amplifier, including
      means for converting said video signals decoded by said high-definition television signal decoder circuitry to field-interlaced video signals with 480 active lines per frame when progressive-scan digital high-definition television signals with 720 active lines per frame are decoded by said high-definition television signal decoder circuitry, the frame rate of said field-interlaced video signals being half the frame rate of said progressive-scan digital high-definition television signals.

22. A television receiver as set forth in claim 21, adapted for receiving a progressive-scan luminance signal with 720 active lines per frame as a first of said video signals decoded by said high-definition television signal decoder circuitry, wherein said means for converting said video signals decoded by said high-definition television signal decoder circuitry to field-interlaced video signals includes:

first scan converter circuitry for converting said progressive-scan luminance signal with 720 active lines per frame to a field-interlaced luminance signal with 480 active lines per frame.

23. A television receiver as set forth in claim 21, adapted for respectively receiving a progressive-scan first color-difference signal and a progressive-scan second color-difference signal as a second and a third of said video signals decoded by said high-definition television signal decoder circuitry, wherein said means for converting said video signals decoded by said high-definition television signal decoder circuitry to field-interlaced video signals further includes:

second scan converter circuitry for converting said progressive-scan first color-difference signal to a line-interlaced first color-difference signal with 480 active lines per frame; and third scan converter circuitry for converting said progressive-scan second color-difference signal to a line-interlaced second color-difference signal with 480 active lines per frame.

24. A television receiver comprising:

a kinescope, having a screen with a 16:9 aspect ratio, having phosphors arranged on the back of said screen with a dot pitch for displaying a 480 scan line frame, and having at least one electron gun for projecting a respective electron beam on the back of said display screen;

a respective kinescope drive amplifier for each said electron gun;

deflection circuitry for scanning each said electron beam across the back of said display screen of said kinescope in a raster scanning pattern with a 16:9 aspect ratio having substantially 240 active lines per field of a two-field frame with the scan lines of the two fields being interlaced with each other;

a tuner capable of receiving normal-definition television signals at first times;

normal-definition television signal detection circuitry for detecting the video signals contained in the modulation of normal-definition television signals received by said tuner during said first times;

a horizontal sync separator for separating normal-definition horizontal synchronizing pulses from video signals detected by said normal-definition television signal detector, for application to said deflection circuitry to control the beginning of horizontal scanning in said raster scanning pattern during said first times;

a vertical sync separator for separating normal-definition vertical synchronizing pulses from video signals detected by said normal-definition television signal detector, for application to said deflection circuitry to control the beginning of vertical scanning in said raster scanning pattern during said first times;

time compression circuitry for time compressing the normal-definition video signals detected by said normal-definition television signal detection circuitry to generate a respective time-compressed normal-definition video signal for application to each said kinescope drive amplifier during each said first time;

high definition television signal detection circuitry for detecting digitally encoded signals from the modulation of digital high-definition television signals received by said tuner during second times;

high-definition television signal decoder circuitry for decoding the digitally encoded signals during said second times, for providing high-definition-television horizontal synchronizing pulses during said second times, and for providing high-definition-television vertical synchronizing pulses for application to said deflection circuitry to control the beginning of vertical scanning in said raster scanning pattern during said second times;

pulse rate divider circuitry for dividing the rate of said high-definition-television horizontal synchronizing pulses to generate rate-divided high-definition-television horizontal synchronizing pulses, occurring at substantially the same rate as normal-definition horizontal synchronizing pulses, for application to said deflection circuitry to control the beginning of horizontal scanning in said raster scanning pattern during said second times; and scan converter circuitry responsive to the video signals decoded by said high-definition television signal decoder circuitry to generate a respective scan-converted video signal for application to each said kinescope drive amplifier during said second times.

25. A television receiver as set forth in claim 24; wherein said high-definition television signal decoder circuitry is of a type for supplying indications of which of a plurality of digital television standards said received high-definition television signal was transmitted in accordance with; wherein said pulse rate divider circuitry is of a type for dividing the rate of said high-definition-television horizontal synchronizing pulses by one of a plurality of prescribed factors, as selected responsive to said indications of which of said plurality of digital television standards a received high-definition television signal was transmitted in accordance with, to generate said rate-divided high-definition-television horizontal synchronizing pulses; and wherein said high-definition-television scan converter circuitry includes:

a respective set of vertical scan conversion filters for each of said plurality of digital television standards; and selection circuitry, responsive to said indications of which of said plurality of digital television standards said received high-definition television signal was transmitted in accordance with, for selecting the responses from an appropriate one of said set of vertical scan conversion filters to implement the generation of said respective scan-converted video signal for application to each said kinescope drive amplifier.

26. A television receiver as set forth in claim 25, wherein each said vertical scan conversion filter is in cascade connection with a horizontal decimation filter for the same one of said plurality of digital television standards.

27. A television receiver comprising:

a kinescope, having a display screen with a 16:9 aspect ratio and having at least one electron gun for projecting a respective electron beam on the back of said display screen;

a respective kinescope drive amplifier for each said electron gun;

deflection circuitry for scanning each said electron beam across the back of said display screen of said kinescope in a raster scanning pattern with a 16:9 aspect ratio having, in a two-field frame with the scan lines of the two fields being interlaced with each other, a first prescribed number of scan lines per field during which vertical trace occurs and having a second prescribed number of scan lines per field during which vertical retrace occurs, the ratio of said second prescribed number to said first prescribed number being substantially more than 1:24;

a tuner for receiving high-definition television signals having 540 active lines;

high-definition television signal detection circuitry for detecting digitally encoded signals from the modulation of digital high-definition television signals received by said tuner;

high-definition television signal decoder circuitry for decoding the digitally encoded signals to supply raster-scanned video signals, for providing high-definition-television horizontal synchronizing pulses, and for providing high-definition-television vertical synchronizing pulses for application to said deflection circuitry to control the beginning of vertical scanning in said raster scanning pattern;

pulse rate divider circuitry for dividing the rate of said high-definition-television horizontal synchronizing pulses to generate rate-divided high-definition-television horizontal synchronizing pulses, occurring at substantially the same rate as normal-definition horizontal synchronizing pulses, for application to said deflection circuitry to control the beginning of horizontal scanning in said raster scanning pattern; and means responsive to the video signals decoded by said high-definition television signal decoder circuitry for generating a respective scan-converted video signal for application to each said kinescope drive amplifier, including means for converting said video signals decoded by said high-definition television signal decoder circuitry to field-interlaced video signals for display, with said first prescribed number of scan lines per field during which vertical trace occurs and said second prescribed number of scan lines per field during which vertical retrace occurs, when field-interlaced luminance signals with 1080 active lines per frame are decoded by said high-definition television signal decoder circuitry.

28. A television receiver as set forth in claim 27, wherein said means for converting said video signals decoded by said high-definition television signal decoder circuitry to field-interlaced video signals for display is of a type that subsamples said field-interlaced luminance signals with 1080 active lines per frame in the vertical trace direction for generating four scan lines for display from each successive set of nine scan lines of said field-interlaced luminance signals decoded by said high-definition television signal decoder circuitry, and further is of a type for inserting additional scan lines per field during which vertical retrace occurs, so said ratio of said first prescribed number of scan lines per field during which vertical trace occurs to said second prescribed number of scan lines per field during which vertical retrace occurs is of the order of 1:12.

29. A television receiver as set forth in claim 27, wherein said means for converting said video signals decoded by said high-definition television signal decoder circuitry to field-interlaced video signals for display is of a type that includes:

first scan converter circuitry that subsamples said field-interlaced luminance signals with 1080 active lines per frame in the vertical trace direction for generating a field-interlaced luminance signal with 480 active lines per frame.

30. A television receiver as set forth in claim 29, adapted for respectively receiving a field-interlaced first color-difference signal and a field-interlaced second color-difference signal as a second and a third of said video signals decoded by said high-definition television signal decoder circuitry, wherein said means for converting said video signals decoded by said high-definition television signal decoder circuitry to field-interlaced video signals further includes:

second scan converter circuitry for converting said field-interlaced first color-difference signal decoded by said high-definition television signal decoder circuitry to a line-interlaced first color-difference signal with 480 active lines per frame; and third scan converter circuitry for converting said line-interlaced second color-difference signal decoded by said high-definition television signal decoder circuitry to a line-interlaced second color-difference signal with 480 active lines per frame.

31. A television receiver comprising:

a kinescope, having a display screen with a width-to-height aspect ratio of appreciably more than 4:3, having phosphors arranged on the back of said display screen with a dot pitch for displaying a frame of substantially 480 scan lines occupying substantially the full height of said display screen, and having at least one electron gun for projecting a respective electron beam on the back of said display screen;

a respective kinescope drive amplifier for each said electron gun, each which respective kinescope drive amplifier receives a respective analog drive signal to be amplified;

deflection circuitry for scanning each said electron beam across the back of said display screen of said kinescope in a raster scanning pattern having a vertical sweep component, having a horizontal sweep component, having said width-to-height aspect ratio of appreciably more than 4:3, and having a prescribed number substantially 240 of active lines in each field of each two-field frame, with the scan lines of the two fields being interlaced with each other;

a tuner for receiving high-definition television signals;

high-definition television signal detection circuitry for detecting digitally encoded signals from the modulation of digital high-definition television signals received by said tuner;

television signal decoder circuitry for decoding portions of the digitally encoded signals to generate digital signals representative of video images; and analog drive signal generation circuitry for converting said digital signals representative of video images to said respective analog drive signal for each said kinescope drive amplifier.

32. A television receiver as set forth in claim 31, wherein the height-to-width aspect ratio of said display screen is substantially 16:9.

33. A television receiver as set forth in claim 31, wherein said kinescope has a first electron gun arranged for projecting its respective electron beam to phosphors on the back of said display screen which emit red light in response thereto, has a second electron gun for projecting its respective electron beam to phosphors on the back of said display screen which emit green light in response thereto, and has a third electron gun for projecting its respective electron beam to phosphors on the back of said display screen which emit blue light in response thereto; wherein there is a first kinescope drive amplifier for said first electron gun, which said first kinescope drive amplifier receives for amplification a red analog drive signal from said analog drive signal generation circuitry; wherein there is a second kinescope drive amplifier for said second electron gun, which said second kinescope drive amplifier receives for amplification a green analog drive signal from said analog drive signal generation circuitry; and wherein there is a third kinescope drive amplifier for said third electron gun, which said third kinescope drive amplifier receives for amplification a blue analog drive signal from said analog drive signal generation circuitry.

34. A television receiver as set forth in claim 33, wherein said analog drive signal generation circuitry comprises:

circuitry for converting said digital descriptions of video images to a digital luminance signal having said prescribed number of active lines in each field, a digital first color difference signal having said prescribed number of active lines in each field, and a digital second color difference signal having said prescribed number of active lines in each field;

digital-to-analog conversion circuitry for converting said digital luminance signal, said digital first color difference signal, and said digital second color difference signal to an analog luminance signal, an analog first color difference signal, and an analog second color difference signal, respectively; and color matrixing circuitry responsive to said analog luminance signal, said analog first color difference signal, and said analog second color difference signal for generating said red analog drive signal, said green analog drive signal, and said blue analog drive signal.

35. A television receiver as set forth in claim 34, wherein said television signal decoder circuitry operates substantially in accordance with the MPEG-2 standard.

36. A television receiver as set forth in claim 35, wherein said circuitry for converting said digital descriptions of video images to a digital luminance signal having said prescribed number of active lines in each field, a digital first color difference signal having said prescribed number of active lines in each field, and a digital second color difference signal having said prescribed number of active lines in each field comprises:

a first vertical scan conversion filter, for reducing the number of scan lines in portions of said digital descriptions of video images descriptive of said digital luminance signal to said prescribed number of active lines in each field;

a second vertical scan conversion filter, for reducing the number of scan lines in portions of said digital descriptions of video images descriptive of said digital first color difference signal to said prescribed number of active lines in each field; and a third vertical scan conversion filter for reducing the number of scan lines in portions of said digital descriptions of video images descriptive of said digital second color difference signal to said prescribed number of active lines in each field.

37. A television receiver as set forth in claim 36, wherein said circuitry for converting said digital descriptions of video images to a digital luminance signal having said prescribed number of active lines in each field, a digital first color difference signal having said prescribed number of active lines in each field, and a digital second color difference signal having said prescribed number of active lines in each field further comprises:

a first horizontal scan conversion filter in cascade connection with said first vertical scan conversion filter;

a second horizontal scan conversion filter in cascade connection with said second vertical scan conversion filter; and a third horizontal scan conversion filter in cascade connection with said third vertical scan conversion filter.

38. A television receiver as set forth in claim 37, wherein said television signal decoder circuitry provides data field synchronizing pulses applied to said deflection circuitry as vertical synchronizing pulses for controlling the vertical sweep component of said raster scanning pattern; wherein said television signal decoder circuitry provides data line synchronizing pulses; and wherein pulse rate divider circuitry divides the rate of said data line synchronizing pulses to generate horizontal synchronizing pulses applied to said deflection circuitry for controlling the horizontal sweep component of said raster scanning pattern.

39. A television receiver comprising:

a tuner for receiving high-definition television signals;

high-definition television signal detection circuitry for detecting digitally encoded signals from the modulation of digital high-definition television signals received by said tuner;

high-definition television signal decoder circuitry for decoding the digitally encoded signals to supply raster-scanned video signals, for providing high-definition-television horizontal synchronizing pulses, and for providing high-definition-television vertical synchronizing pulses;

scan converter circuitry responsive to the video signals decoded by said high-definition television signal decoder circuitry, to generate scan-converted video signals in a raster scanning pattern having substantially 240 active scan lines per field interlaced with the scan lines of each field preceding or succeeding that field.

40. A television receiver as set forth in claim 39, wherein said raster-scanned video signals have substantially 720 active lines in each progressively scanned frame, and wherein said scan converter circuitry comprises:

circuitry for defining alternate ones of said progressively scanned frames as odd ones of said frames and for defining the other intervening ones of said progressively scanned frames as even ones of said frames; and vertical scan conversion filters for generating said scan-converted video signals, each active scan line of each odd field of each of said scan-converted video signals being generated from a weighted summation of scan lines in an odd one of said progressively scanned frames, and each active scan line of each even field of each of said scan-converted video signals being generated from a weighted summation of scan lines in an even one of said progressively scanned frames.

41. A television receiver as set forth in claim 40, wherein each active scan line of each odd field of each of said scan-converted video signals is generated as a weighted summation of six successive scan lines in an odd one of said progressively scanned frames, and wherein each active scan line of each even field of each of said scan-converted video signals is generated as a weighted summation of five successive scan lines in an odd one of said progressively scanned frames.

42. A television receiver as set forth in claim 41, wherein each said active scan line of each odd field of each of said scan-converted video signals is generated as said weighted summation of said six successive scan lines in ($1/18$):($1/6$): ($5/18$):($5/18$):($1/6$):($1/18$) ratio, and wherein each said active scan line of each even field of each of said scan-converted video signals is generated as said weighted summation of said five successive scan lines in ($1/9$):($2/9$): ($1/3$):($2/9$):($1/9$) ratio.

43. A television receiver as set forth in claim 40, wherein said circuitry for defining alternate ones of said progressively scanned frames as odd ones of said frames and for defining the other intervening ones of said progressively scanned frames as even ones of said frames comprises
   a modulo-2 counter for the high-definition-television vertical synchronizing pulses generated for said progressively scanned frames, the count from said modulo-2 counter indicating by a first state thereof that the current one of said progressively scanned frames is an odd one of said frames, and the count from said modulo-2 counter indicating by a second state thereof that the current one of said progressively scanned frames is an even one of said frames.

44. A television receiver as set forth in claim 39, wherein said raster-scanned video signals have substantially 720 active lines in each progressively scanned frame, and wherein said scan converter circuitry comprises:
   circuitry for defining alternate ones of said progressively scanned frames as odd ones of said frames and for defining the other intervening ones of said progressively scanned frames as even ones of said frames;
   horizontal decimation filters for each of said raster-scanned video signals; and
   vertical scan conversion filters for generating said scan-converted video signals from the responses of said horizontal decimation filters, each active scan line of each odd field of each of said scan-converted video signals being from a weighted summation of scan lines in an odd one of said progressively scanned frames, and each active scan line of each even field of each of said scan-converted video signals being from a weighted summation of scan lines in an even one of said progressively scanned frames.

45. A television receiver as set forth in claim 44, wherein each active scan line of each odd field of each of said scan-converted video signals is generated as a weighted summation of six successive scan lines in an odd one of said progressively scanned frames, and wherein each active scan line of each even field of each of said scan-converted video signals is generated as a weighted summation of five successive scan lines in an odd one of said progressively scanned frames.

46. A television receiver as set forth in claim 44, wherein each said active scan line of each odd field of each of said scan-converted video signals is generated as said weighted summation of said six successive scan lines in ($1/18$):($1/6$): ($5/18$):($5/18$):($1/6$):($1/18$) ratio, and wherein each said active scan line of each even field of each of said scan-converted video signals is generated as said weighted summation of said five successive scan lines in ($1/9$):($2/9$): ($1/3$):($2/9$):($1/9$) ratio.

47. A television receiver as set forth in claim 39, wherein said scan converter circuitry comprises, for a first said raster-scanned video signal being scan converted to a first said scan-converted video signal:
   a first odd-line linestore memory read from to supply said first scan-converted video signal when odd lines of said raster scanning pattern are being scanned;
   a first even-line linestore memory read from to supply said first scan-converted video signal when even lines of said raster scanning pattern are being scanned;
   a first read/write address multiplexer, for applying read addresses at a first address rate to said first odd-line linestore memory and write addresses at a second address rate to said first even-line linestore memory when odd lines of said raster scanning pattern are being generated, and for applying read addresses at said first address rate to said first even-line linestore memory and write addresses at said second address rate to said first odd-line linestore memory when even lines of said raster scanning pattern are being generated, said second address rate being three times said first address rate;
   a first vertical lowpass filter for generating, during odd fields in said raster scanning pattern, a first filter response to said first raster-scanned video signal that is lowpass in at least the direction perpendicular to line scan, which said first filter response is written to said first odd-line linestore memory during the last third of each of said even lines of said odd fields of said raster scanning pattern being generated and is written to said first even-line linestore memory during the last third of each of said odd lines of said odd fields of said raster scanning pattern being generated; and
   a second vertical lowpass filter for generating, during even fields in said raster scanning pattern, a second filter response to said first raster-scanned video signal that is lowpass in at least the direction perpendicular to line scan, which said second filter response is written to said first odd-line linestore memory during the last third of each of said even lines of said even fields of said raster scanning pattern being scanned and is written to said first even-line linestore memory during the last third of each of said odd lines of said even fields of said raster scanning pattern being scanned.

48. A television receiver as set forth in claim 47, wherein said first and second finite-impulse-response filters together include:
   first delay circuitry for delaying said said first raster-scanned video signal by one, two, three, four and five scan lines thereof;
   first weighted summation circuitry for generating said first filter response as a weighted summation of said said first raster-scanned video signal and said first raster-scanned video signal as delayed by one, two, three, four and five scan lines thereof by said first delay circuitry; and
   second weighted summation circuitry for generating said second filter response as a weighted summation of said first raster-scanned video signal and said first raster-scanned video signal as delayed by one, two, three, and four scan lines thereof by said first delay circuitry.

49. A television receiver as set forth in claim 47, wherein said first finite-impulse-response filter includes:
   a first adder for combining respective first and second summand signals thereto for generating a respective sum output signal;
   a first multiplexer having a first input for receiving arithmetic zero, having a second input, and having an output connected for supplying said first adder its respective first summand signal;
   a first read-only memory weighting said first raster-scanned video signal accordance with a first of two vertically interleaving kernel patterns for odd fields of said raster scanning pattern and in accordance with a first of two vertically interleaving kernel patterns for even fields of said raster scanning pattern, for supplying said first adder its respective second summand input signal; and a first read-and-then-rewrite linestore memory, supplying its read-out to said first odd-line linestore memory for writing during the last third of each of said even lines of said raster scanning pattern being scanned, supplying its read-out to the second input of said first multiplexer for application to said first adder as its respective first summand signal except during the last third of each of said even lines of said raster scanning pattern being scanned, and being re-written by said respective sum output signal of said first adder.

50. A television receiver as set forth in claim 49, wherein said second finite-impulse-response filter includes:

a second adder for combining respective first and second summand signals thereto for generating a respective sum output signal;

a second multiplexer having a first input for receiving arithmetic zero, having a second input, and having an output connected for supplying said second adder its respective first summand signal;

a second read-only memory weighting said first raster-scanned video signal in accordance with a second of two vertically interleaving kernel patterns for odd fields of said raster scanning pattern and in accordance with a second of two vertically interleaving kernel patterns for even fields of said raster scanning pattern, for supplying said second adder its respective second summand input signal; and a second read-and-then-rewrite linestore memory, supplying its read-out to said first even-line linestore memory for writing during the last third of each of said odd lines of said raster scanning pattern being scanned, supplying its read-out to the second input of said second multiplexer for application to said second adder as its respective first summand signal except during the last third of each of said odd lines of said raster scanning pattern being scanned, and being re-written by said respective sum output signal of said second adder.

51. A television receiver as set forth in claim 39, wherein said raster-scanned video signals have substantially 540 active lines in each field interlaced with the scan lines of each field preceding or succeeding that field, wherein said high-definition television signal decoder circuitry supplies field numbers indicative of the current field is odd or is even, and wherein said scan converter circuitry comprises:

vertical scan conversion filters for generating said scan-converted video signals, each active scan line of each odd field of each of said scan-converted video signals being generated from a weighted summation of scan lines in an odd field of said raster-scanned video signals, and each active scan line of each even field of each of said scan-converted video signals being generated from a weighted summation of scan lines in an even field of said raster-scanned video signals.

52. A television receiver as set forth in claim 51, wherein a first type of weighted summation of five successive scan lines in a field of said raster-scanned video signals is made for generating the first of each cycle of four scan lines of said first scan-converted video signal, wherein a second type of weighted summation of four successive scan lines in a field of said raster-scanned video signals is made for generating the second of each cycle of four scan lines of said first scan-converted video signal, wherein a third type of weighted summation of four successive scan lines in a field of said raster-scanned video signals is made for generating the third of each cycle of four scan lines of said first scan-converted video signal, and wherein a fourth type of weighted summation of four successive scan lines in a field of said raster-scanned video signals is made for generating the fourth of each cycle of four scan lines of said first scan-converted video signal.

53. A television receiver as set forth in claim 52, wherein said first type of weighted summation weighs five successive raster-scanned video signal scan lines in $(1/21):(5/21):(9/21):(5/21):(1/21)$ ratio, wherein said second type of weighted summation weighs four successive raster-scanned video signal scan lines in $(1/5):(2/5):(3/10):(1/10)$ ratio, wherein said third type of weighted summation weighs four successive raster-scanned video signal scan lines in $(3/10):(7/10):(7/10):(3/10)$ ratio, and wherein said fourth type of weighted summation of four weighs four successive raster-scanned video signal scan lines in $(1/10):(3/10):(2/5):(1/5)$ ratio.

54. A television receiver as set forth in claim 39, wherein said raster-scanned video signals have substantially 540 active lines in each field interlaced with the scan lines of each field preceding or succeeding that field, wherein said high-definition television signal decoder circuitry supplies field numbers indicative of the current field is odd or is even, and wherein said scan converter circuitry comprises:

horizontal decimation filters for each of said raster-scanned video signals; and vertical scan conversion filters for generating said scan-converted video signals, each active scan line of each odd field of each of said scan-converted video signals being generated from a weighted summation of scan lines in an odd field of said raster-scanned video signals, and each active scan line of each even field of each of said scan-converted video signals being generated from a weighted summation of scan lines in an even field of said raster-scanned video signals.

55. A television receiver as set forth in claim 54, wherein a first type of weighted summation of five successive scan lines in a field of said raster-scanned video signals is made for generating the first of each cycle of four scan lines of said first scan-converted video signal, wherein a second type of weighted summation of four successive scan lines in a field of said raster-scanned video signals is made for generating the second of each cycle of four scan lines of said first scan-converted video signal, wherein a third type of weighted summation of four successive scan lines in a field of said raster-scanned video signals is made for generating the third of each cycle of four scan lines of said first scan-converted video signal, and wherein a fourth type of weighted summation of four successive scan lines in a field of said raster-scanned video signals is made for generating the fourth of each cycle of four scan lines of said first scan-converted video signal.

56. A television receiver as set forth in claim 54, wherein said first type of weighted summation weighs five successive raster-scanned video signal scan lines in $(1/21):(5/21):(9/21):(5/21):(1/21)$ ratio, wherein said second type of weighted summation weighs four successive raster-scanned video signal scan lines in $(1/5):(2/5):(3/10):(1/10)$ ratio, wherein said third type of weighted summation weighs four successive raster-scanned video signal scan lines in $(3/10):(7/10):(7/10):(3/10)$ ratio, and wherein said fourth type of weighted summation of four weighs four successive raster-scanned video signal scan lines in $(1/10):(3/10):(2/5):(1/5)$ ratio.

57. A television receiver as set forth in claim 51, wherein said scan converter circuitry comprises, for a first said raster-scanned video signal being scan converted to a first said scan-converted video signal:

a second odd-line linestore memory read from to generate input signal for a first said kinescope drive amplifier when odd lines of said raster scanning pattern are being generated;

a second even-line linestore memory read from to generate input signal for said first kinescope drive amplifier when even lines of said raster scanning pattern are being generated;

a second read/write address multiplexer, for applying read addresses at said first address rate to said second odd-line linestore memory and write addresses at a third address rate to said second even-line linestore memory when odd lines of said raster scanning pattern are being generated, and for applying read addresses at said first address rate to said second even-line linestore memory and write addresses at said third address rate to said second odd-line linestore memory when even lines of said raster scanning pattern are being generated, said third address rate being 9/4 times said first address rate;

a third finite-impulse-response filter for generating, during odd lines in said raster scanning pattern, a third filter response to said first raster-scanned video signal that is lowpass in at least the direction perpendicular to line scan, which said third filter response is written to said second odd-line linestore memory during a fourth of each cycle of nine scan lines of said first raster-scanned video signal; and a fourth finite-impulse-response filter for generating, during even lines in said raster scanning pattern, a fourth filter response to said prescribed video signal that is lowpass in at least the direction perpendicular to line scan, which said fourth filter response is written to said second even-line linestore memory during an eighth of each cycle of nine scan lines of said first raster-scanned video signal.

58. A television receiver as set forth in claim 57, wherein said third and fourth finite-impulse-response filters together include:

delay circuitry for delaying said first raster-scanned video signal by one, two and three of those field-interlaced scan lines;

third weighted summation circuitry for generating said third filter response as a weighted summation of said first raster-scanned video signal and said first raster-scanned video signal as delayed by one, two and three of those progressive-scan scan lines by said second delay circuitry; and fourth weighted summation circuitry for generating said fourth filter response as a weighted summation of said first raster-scanned video signal and said first raster-scanned video signal as delayed by one and two of those progressive-scan scan lines by said second delay circuitry.

59. A television receiver as set forth in claim 58, wherein said third finite-impulse-response filter includes:

a third adder for combining respective first and second summand signals thereto for generating a respective sum output signal;

a third multiplexer having a first input for receiving arithmetic zero, having a second input, and having an output connected for supplying said third adder its respective first summand signal;

a third read-only memory weighting said prescribed video signal in accordance with a first of two vertically interleaving kernel patterns, for supplying said third adder its respective second summand input signal; and a third read-and-then-rewrite linestore memory, supplying its read-out to said second odd-line linestore memory for writing during said fourth of each cycle of nine scan lines of said first raster-scanned video signal, supplying its read-out to the second input of said third multiplexer for application to said third adder as its respective first summand signal except during said fourth of each cycle of nine scan lines of said first raster-scanned video signal, and being re-written by said respective sum output signal of said third adder.

60. A television receiver as set forth in claim 59, wherein said fourth finite-impulse-response filter includes:

a fourth adder for combining respective first and second summand signals thereto for generating a respective sum output signal;

a fourth multiplexer having a first input for receiving arithmetic zero, having a second input, and having an output connected for supplying said fourth adder its respective first summand signal;

a fourth read-only memory weighting said first raster-scanned video signal in accordance with a second of two vertically interleaving kernel patterns, for supplying said fourth adder its respective second summand input signal; and a fourth read-and-then-rewrite linestore memory, supplying its read-out to said second even-line linestore memory for writing during said eighth of each cycle of nine scan lines of said first raster-scanned video signal, supplying its read-out to the second input of said fourth multiplexer for application to said fourth adder as its respective first summand signal except during said eighth of each cycle of nine scan lines of said first raster-scanned video signal, and being re-written by said respective sum output signal of said fourth adder.

61. A television receiver comprising:

a tuner for receiving high-definition television signals;

high-definition television signal detection circuitry for detecting digitally encoded signals from the modulation of digital high-definition television signals received by said tuner;

television signal decoder circuitry for decoding portions of the digitally encoded signals to generate digital signals representative of video images;

sync signal generation circuitry for generating a sync signal at substantially the same rate as a normal-definition horizontal synchronizing pulse; and scan converter circuitry responsive to the video signals decoded by said high-definition television signal decoder circuitry to generate a respective scan-converted video signal having a width-to-height ratio of more than 4:3.

62. A television receiver as set forth in claim 61, wherein said television signal decoder circuitry is operative to supply indications of which of a plurality of digital television standards said received high-definition television signal was transmitted in accordance with; wherein said sync signal generation circuitry is operative to divide a rate of high-definition-television horizontal synchronizing pulses by one of a plurality of prescribed factors as selected responsive to said indications of which of said plurality of digital television standards a received high-definition television signal was transmitted in accordance with, to generate rate-divided high-definition-television horizontal synchronizing pulses; and wherein said scan converter circuitry includes:

a respective set of vertical scan conversion filters for each of said plurality of digital television standards; and selection circuitry responsive to said indications of which of said plurality of digital television standards said received high-definition television signal was transmitted in accordance with, for selecting the responses from an appropriate one of said set of vertical scan conversion filters to implement the generation of said respective scan converted video signal.

63. A television receiver as set forth in claim 62, wherein each said vertical scan conversion filter is in cascade connection with a horizontal decimation filter for the same one of said plurality of digital television standards.

* * * * *